(12) United States Patent
Nakajima

(10) Patent No.: US 7,749,124 B2
(45) Date of Patent: Jul. 6, 2010

(54) VEHICLE DIFFERENTIAL GEAR DEVICE, VEHICLE COMBINED DIFFERENTIAL GEAR DEVICE AND VEHICLE DIFFERENTIAL CASE

(75) Inventor: Shinichiro Nakajima, Niiza (JP)

(73) Assignee: JTEKT Corporation, Osaka-shi (JP)

( * ) Notice: Subject to any disclaimer, the term of this patent is extended or adjusted under 35 U.S.C. 154(b) by 494 days.

(21) Appl. No.: 11/551,521

(22) Filed: Oct. 20, 2006

(65) Prior Publication Data

US 2007/0095167 A1    May 3, 2007

(30) Foreign Application Priority Data

Oct. 21, 2005 (JP) ............................. 2005-307736

(51) Int. Cl.
*F16H 48/06* (2006.01)
*F16H 48/20* (2006.01)

(52) U.S. Cl. ........................... 475/221; 475/231
(58) Field of Classification Search ................. 475/221, 475/231
See application file for complete search history.

(56) References Cited

U.S. PATENT DOCUMENTS

| | | | | |
|---|---|---|---|---|
| 1,654,623 | A | * | 1/1928 | Weir ........................... 475/221 |
| 1,686,431 | A | * | 10/1928 | Wyman ........................ 475/221 |
| 2,126,960 | A | * | 8/1938 | Higbee ..................... 180/24.03 |
| 2,200,153 | A | * | 5/1940 | Bush ........................... 475/221 |
| 4,182,201 | A | | 1/1980 | Mayhew et al. |
| 4,520,690 | A | * | 6/1985 | Dangel ........................ 475/221 |
| 4,645,029 | A | * | 2/1987 | Sasaki et al. ................. 180/249 |
| 5,507,702 | A | * | 4/1996 | Joachim et al. ............. 475/233 |
| 5,980,416 | A | * | 11/1999 | Gafvert ....................... 475/230 |
| 6,689,009 | B1 | * | 2/2004 | Fett ............................. 475/230 |
| 6,699,154 | B2 | * | 3/2004 | Orr et al. ..................... 475/230 |
| 6,840,883 | B2 | * | 1/2005 | Orr et al. ..................... 475/230 |

FOREIGN PATENT DOCUMENTS

| | | |
|---|---|---|
| DE | 198 20 206 A1 | 11/1998 |
| EP | 1 555 459 A1 | 7/2005 |
| EP | 1 734 288 A2 | 12/2006 |
| GB | 2 311 103 | 9/1997 |
| JP | 2520728 | 10/1996 |

OTHER PUBLICATIONS

U.S. Appl. No. 12/262,688, filed Oct. 31, 2008, Nakajima.
U.S. Appl. No. 11/845,443, filed Aug. 27, 2007, Nakajima, et al.

* cited by examiner

*Primary Examiner*—Tisha D Lewis
(74) *Attorney, Agent, or Firm*—Oblon, Spivak, McClelland, Maier & Neustadt, L.L.P.

(57) ABSTRACT

A vehicle differential gear device has: a differential case having a plurality of pinion gear insertion holes and a side gear passage hole; a plurality of shaftless type pinion gears that are rotatably supported in the plurality of pinion gear insertion holes formed in the differential case; and a pair of side gears that are rotatably supported in the differential case, engage with the plurality of shaftless type pinion gears, and has an outer diameter greater than that of the plurality of shaftless type pinion gears, the side gear passage hole allowing passage of the pair of side gears.

17 Claims, 45 Drawing Sheets

VEHICLE DIFFERENTIAL GEAR DEVICE, VEHICLE COMBINED DIFFERENTIAL GEAR DEVICE AND VEHICLE DIFFERENTIAL CASE

The present application is based on Japanese patent application Nos. 2005-307736 and 2005-178579 (=U.S. Ser. No. 11/424,588) filed on Oct. 21, 2005 and Jun. 17, 2005, respectively, the entire contents of which are incorporated herein by reference.

BACKGROUND OF THE INVENTION

1. Field of the Invention

This invention relates to a vehicle differential gear device, a vehicle combined differential gear device and a vehicle differential case, each of which comprises plural pinion gears to receive a rotational driving force from the driving side and a pair of side gears to engage with the plural pinion gears.

2. Description of the Related Art

FIG. 46 shows a conventional vehicle differential gear device (e.g., Japanese utility model registration No. 2520728 (FIG. 1)). As shown in FIG. 46, the vehicle differential gear device 461 comprises a differential case 462 to be rotated by engine torque, side gears 463L, 463R that are disposed parallel to each other along a rotation axis line, and pinion gears 464 to engage with the side gears 463L, 463R.

The differential case 462 comprises a pinion gear insertion hole 465 and axle shaft insertion holes 466L, 466R, wherein their axis lines are at right angles to each other. The differential case 462 further comprises a concave groove 468 that is provided on the inside of the pinion gear insertion hole 465 to allow a snap ring 467 to be fitted inside there.

The side gears 463L, 463R are formed with bottomless and cylindrical bevel gears that comprise bosses 469L, 469R and gear portions 470L, 470R. They are disposed movably in the direction of the rotation axis line of the differential case 462 and are installed rotatably in the differential case 462 while keeping the bosses 469L, 469R placed in the axle shaft insertion holes 466L, 466R. Inside the side gears 463L, 463R, a part of axle shafts 471L, 471R is positioned and splined in the axle shaft insertion holes 466L, 466R. Annular sliding members 472L, 472R are disposed on the periphery of the bosses 469L, 469R, and between the gear portions 470L, 470R (backside thereof) of the side gears 463L, 463R and the periphery of the inside opening of the axle shaft insertion holes 466L, 466R.

The pinion gear 464 is formed with a bottomless and cylindrical gear, retained by a pinion gear retaining plate 473 disposed between the snap ring 467 and the pinion gear 464, and rotatably installed in the pinion gear insertion hole 465. A pinion gear shaft 474 is attached to the center of the pinion gear 464 to prevent the slanting of the gear.

The vehicle differential gear device 461 is assembled such that the sliding members 472L, 472R and the side gears 463L, 463R are first inserted in the pinion gear insertion hole 465 to be installed in the differential case 462, the pinion gear 464 is then inserted in the pinion gear insertion hole 465 to engage with the side gears 463L, 463R and to be fitted to the pinion gear shaft 474 previously placed in the differential case 462, the pinion gear retaining plate 473 is disposed on the back side of the pinion gear 464, and the snap ring 467 is fitted into the concave groove 468.

However, the conventional vehicle differential gear device of Japanese utility model registration No. 2520728 has problems as described below (1) to (4).

(1) Since the pinion gear shaft is attached to the center of the pinion gear, the outer diameter of the pinion gear needs to be relatively large. Therefore, the outer diameter of the side gear is reduced to cause an increase in rotation backlash $\tan^{-1}(b/r)$ which is determined by a backlash b defined between the pinion gear and the side gear and a radius r of the side gear. As a result, the transmission of driving force will deteriorate.

(2) As the outer diameter of the pinion gear increases, distance between the side gears is extended. Thus, the differential case cannot be downsized.

(3) As the outer diameter of the pinion gear increases, the sliding diameter of the pinion gear increases. Due to expansion caused by the sliding of the pinion gear, a proper clearance between the pinion gear and the pinion gear insertion hole becomes difficult to secure As a result, the pinion gear may be seized.

(4) As the outer diameter of the pinion gear increases, the mass of the pinion gear increases so that the pinion gear can be influenced by centrifugal force. This allows a variation in differential limiting force generated at a pinion gear support portion (not shown) located outside of the pinion gear. Thus, the vehicle differential gear device cannot have a stable performance.

SUMMARY OF THE INVENTION

It is an object of the invention to provide a vehicle differential gear device, a vehicle combined differential gear device and a vehicle differential case that are capable of having the good transmission of driving force, being downsized in the direction of the rotation axis line, enhancing the seize resistance, and having the stable performance.

(1) According to one embodiment of the invention, a vehicle differential case comprises:

an integral structure comprising: a plurality of pinion gear insertion holes to rotatably support a plurality of shaftless type pinion gears; and a side gear passage hole that allows passage of a side gear comprising an outer diameter greater than that of the plurality of shaftless (i.e., without a shaft) type pinion gears.

In the above embodiment (1), the following modifications and changes can be made.

(i) The plurality of pinion gear insertion holes comprise a top portion to support the plurality of shaftless type pinion gears being subjected to centrifugal force.

(ii) The plurality of pinion gear insertion holes are formed such that a narrow interval region and a wide interval region are generated between two neighboring holes thereof, and the side gear passage hole is formed in the wide interval region.

(iii) The plurality of pinion gear insertion holes comprise an extended portion extending inside, outside or inside and outside the case.

(2) According to another embodiment of the invention, a vehicle differential gear device comprises:

a differential case comprising a plurality of pinion gear insertion holes and a side gear passage hole;

a plurality of shaftless (i.e., without a shaft) type pinion gears that are rotatably supported in the plurality of pinion gear insertion holes formed in the differential case; and a pair of side gears that Are rotatably supported in the differential case, engage with the plurality of shaftless type pinion gears, and comprise an outer diameter greater than that of the plurality of shaftless type pinion gears, the side gear passage hole allowing passage of the pair of side gears.

In the above embodiment (2), the following modifications and changes can be made.

(iv) The differential case further comprises an integral structure.

(v) The plurality of pinion gear insertion holes comprise a top portion to support the plurality of shaftless type pinion gears being subjected to centrifugal force generated by a rotation of the differential case.

(3) According to another embodiment of the invention, a vehicle combined differential gear device comprises:

a first differential gear device comprising a first rotatable input member, and first and second output members for a front axle and a rear axle, respectively, to be rotated by a rotation of the first input member;

a second differential gear device comprising a second input member to be rotated by a rotation of the first or second output member, and third and fourth output members for a left axle shaft and a right axle shaft, respectively, of the front axle or the rear axle to be rotated by a rotation of the second input member; and a casing that houses the first and second differential gear devices and is operable to rotate the first input member;

wherein the first differential gear device comprises: a differential case comprising a plurality of pinion gear insertion holes and a side gear passage hole; the first input member comprising a plurality of shaftless type pinion gears that are rotatably supported in the plurality of pinion gear insertion holes formed in the differential case; and the first and second output members comprising a pair of side gears that are rotatably supported in the differential case, engage with the plurality of shaftless type pinion gears, and comprise an outer diameter greater than that of the plurality of shaftless type pinion gears, the side gear passage hole allowing passage of the pair of side gears.

(4) According to another embodiment of the invention, a vehicle combined differential gear device comprises:

a first differential gear device comprising a first rotatable input member, and first and second output members for a front axle and a rear axle, respectively, to be rotated by a rotation of the first input member;

a second differential gear device comprising a second input member to be rotated by a rotation of the first or second output member, and third and fourth output members for a left axle shaft and a right axle shaft, respectively, of the front axle or the rear axle to be rotated by a rotation of the second input member; and a casing that houses the first and second differential gear devices and is operable to rotate the first input member;

wherein the second differential gear device comprises: a differential case comprising a plurality of pinion gear insertion holes and a side gear passage hole; the second input member comprising a plurality of shaftless type pinion gears that are rotatably supported in the plurality ox pinion gear insertion holes formed in the differential case; and the third and fourth output members comprising a pair of side gears that are rotatably supported in the differential case, engage with the plurality of shaftless type pinion gears, and comprise an outer diameter greater than that of the plurality of shaftless type pinion gears, the side gear passage hole allowing passage of the pair of side gears.

(5) According to another embodiment of the invention, a vehicle combined differential gear device comprises:

a first differential gear device comprising a first rotatable input member, and first and second output members for a front axle and a rear axle, respectively, to be rotated by a rotation of the first input member;

a second differential gear device comprising a second input member to be rotated by a rotation of the first or second output member, and third and fourth output members for a left axle shaft and a right axle shaft, respectively, of the front axle or the rear axle to be rotated by a rotation of the second input member; and a casing that houses the first and second differential gear devices and is operable to rotate the first input member;

wherein the first and second differential gear devices each comprise: a differential case comprising a plurality of pinion gear insertion holes and a side gear passage hole; the first and second input members each comprising a plurality of shaftless type pinion gears that are rotatably supported in the plurality of pinion gear insertion holes formed in the differential case; and the first and second output means and the third and fourth output members each comprising a pair of side gears that are rotatably supported in the differential case, engage with the plurality of shaftless type pinion gears, and comprise an outer diameter greater than that of the plurality of shaftless type pinion gears, the side gear passage hole allowing passage of the pair of side gears.

In the above embodiments (3)-(5), the following modifications and changes can be made.

(vi) The first input member of the first differential gear device inputs, when a rotational driving force of any one of wheels lowers, a rotational driving force determined by multiplying a torque bias ratio of the first and second output members and a torque bias ratio of the third and fourth output members, and the second input member of the second differential gear device inputs a rotational driving force determined by the torque bias ratio of the third and fourth output members.

<Advantages of the Invention>

According to the embodiments of the invention, a vehicle differential gear device, a vehicle combined differential gear device and a vehicle differential case can be provided that are capable of having the good transmission of driving force, being downsized in the direction of the rotation axis line, enhancing the seize resistance, and having the stable performance.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Embodiment

Figure 1:
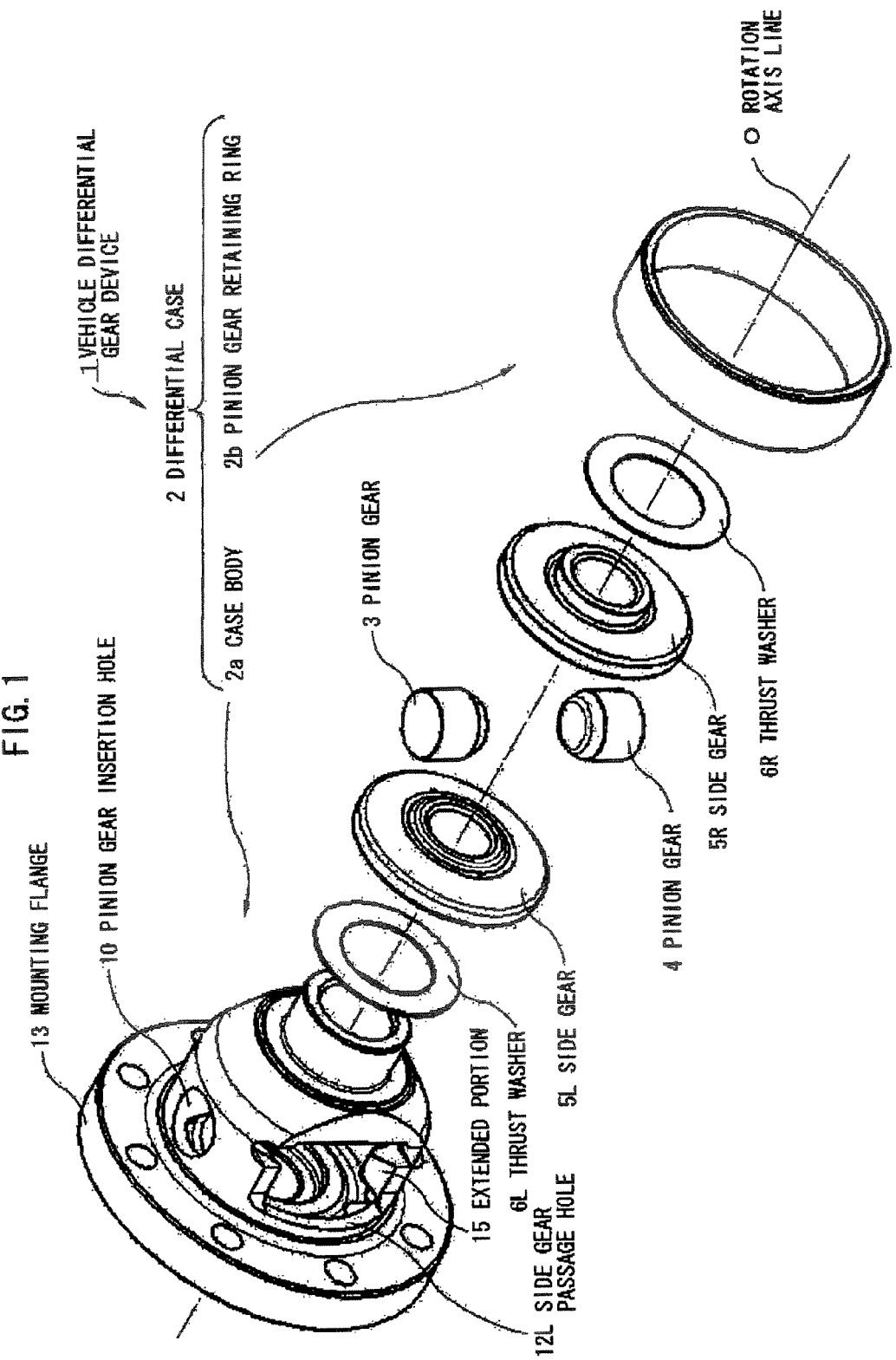
FIG. 1 is an exploded perspective view showing a vehicle differential gear device in a first preferred embodiment according to the invention.
Figure 2:
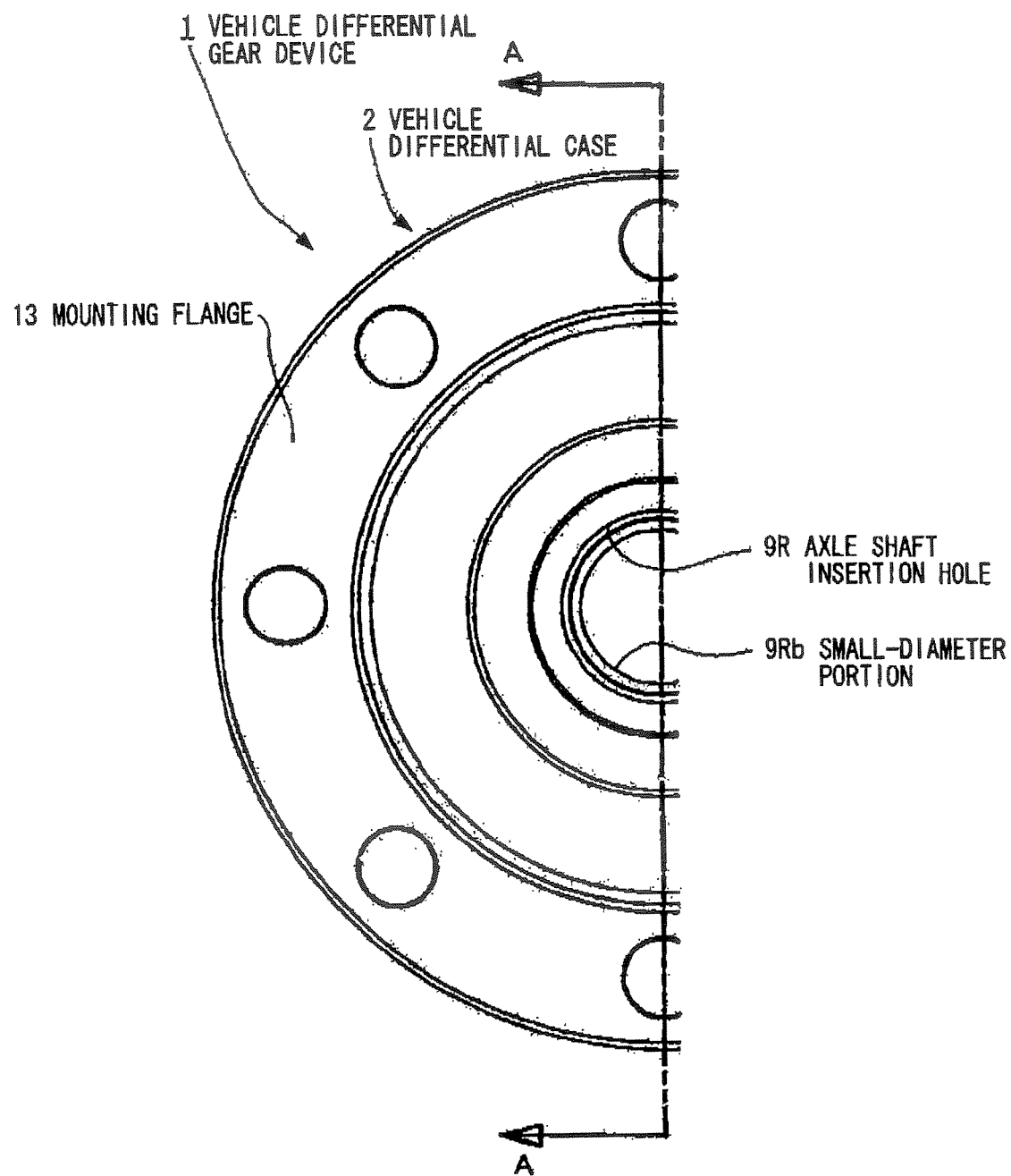
FIG. 2 is a front view showing a vehicle differential gear device omitted a part thereof in a first preferred embodiment according to the invention.
Figure 3:
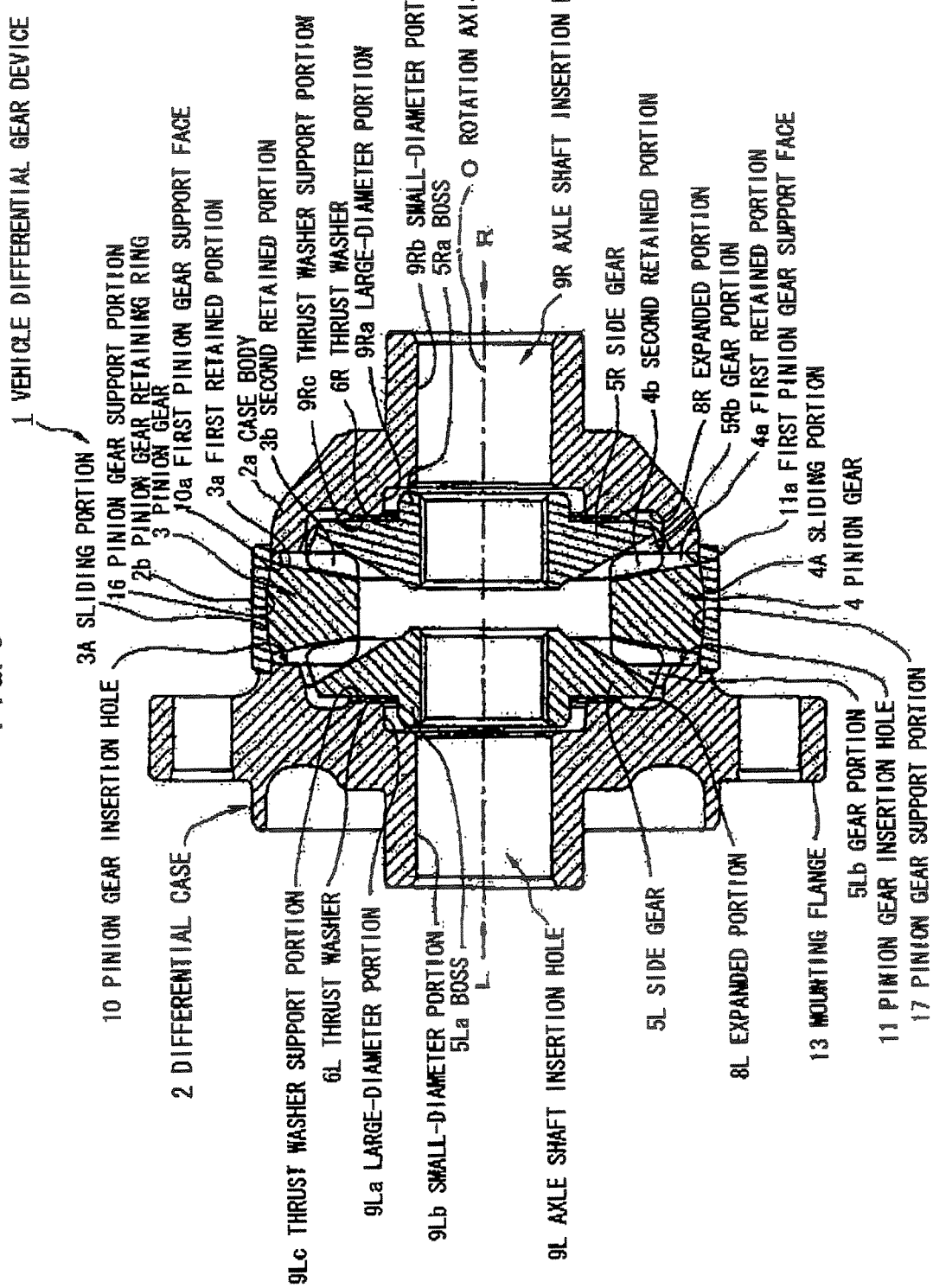
FIG. 3 is a cross sectional view taken along the line A-A in FIG. 2.
Figure 4:
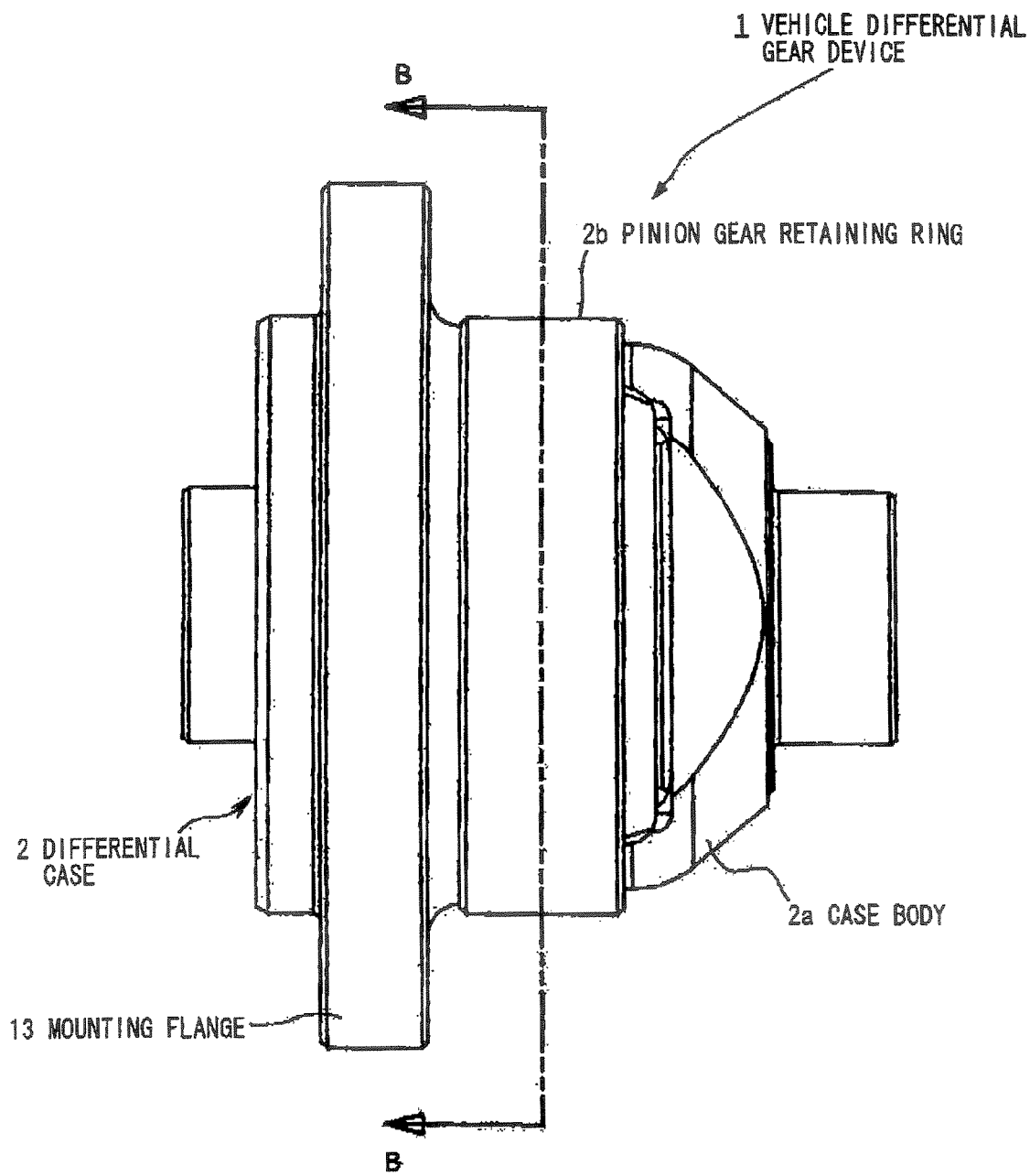
FIG. 4 is a side view showing a vehicle differential gear device in a first preferred embodiment according to the invention.
Figure 5:
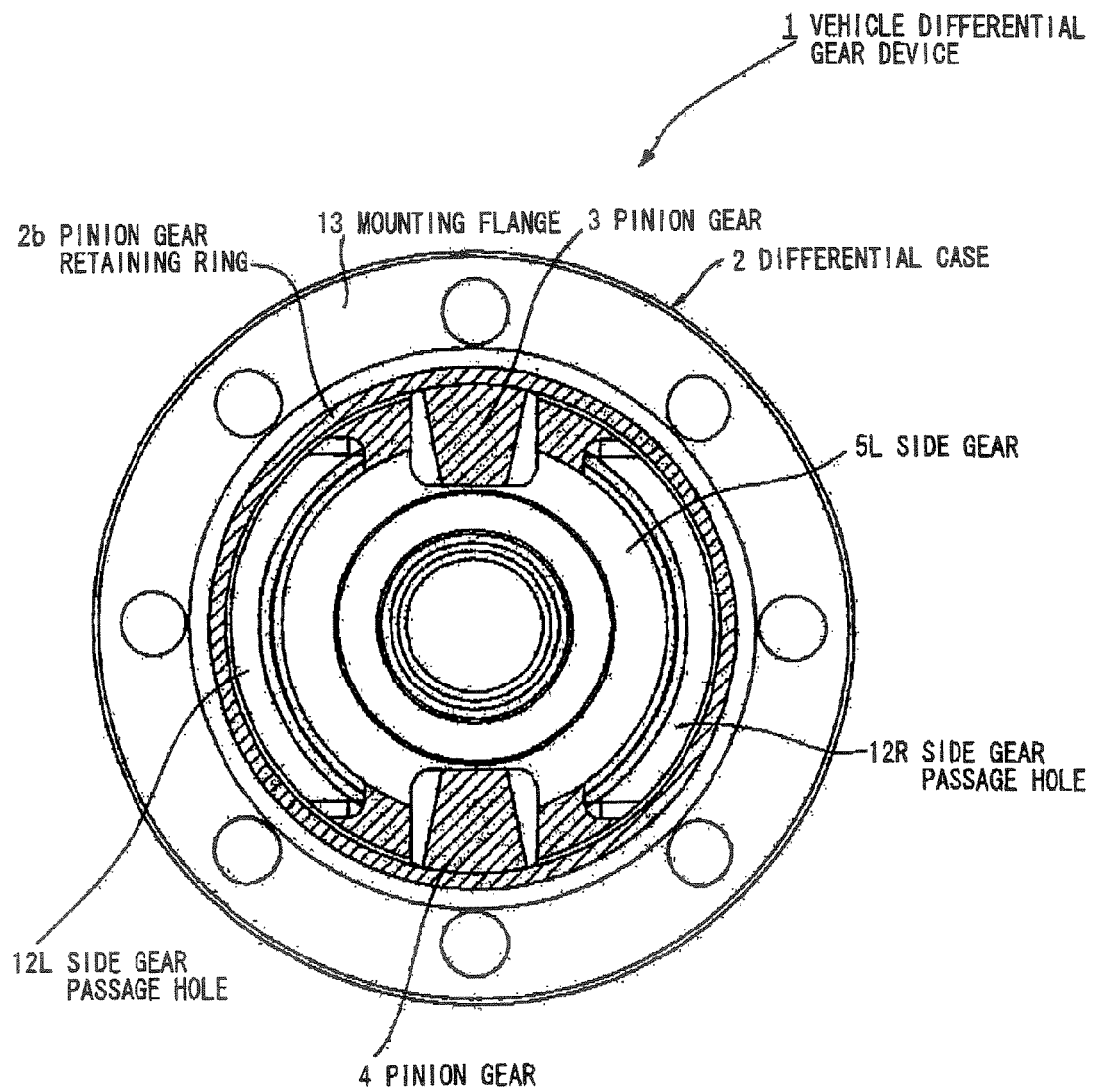
FIG. 5 is a cross sectional view taken along the line B-B in FIG. 4.
Figure 6:
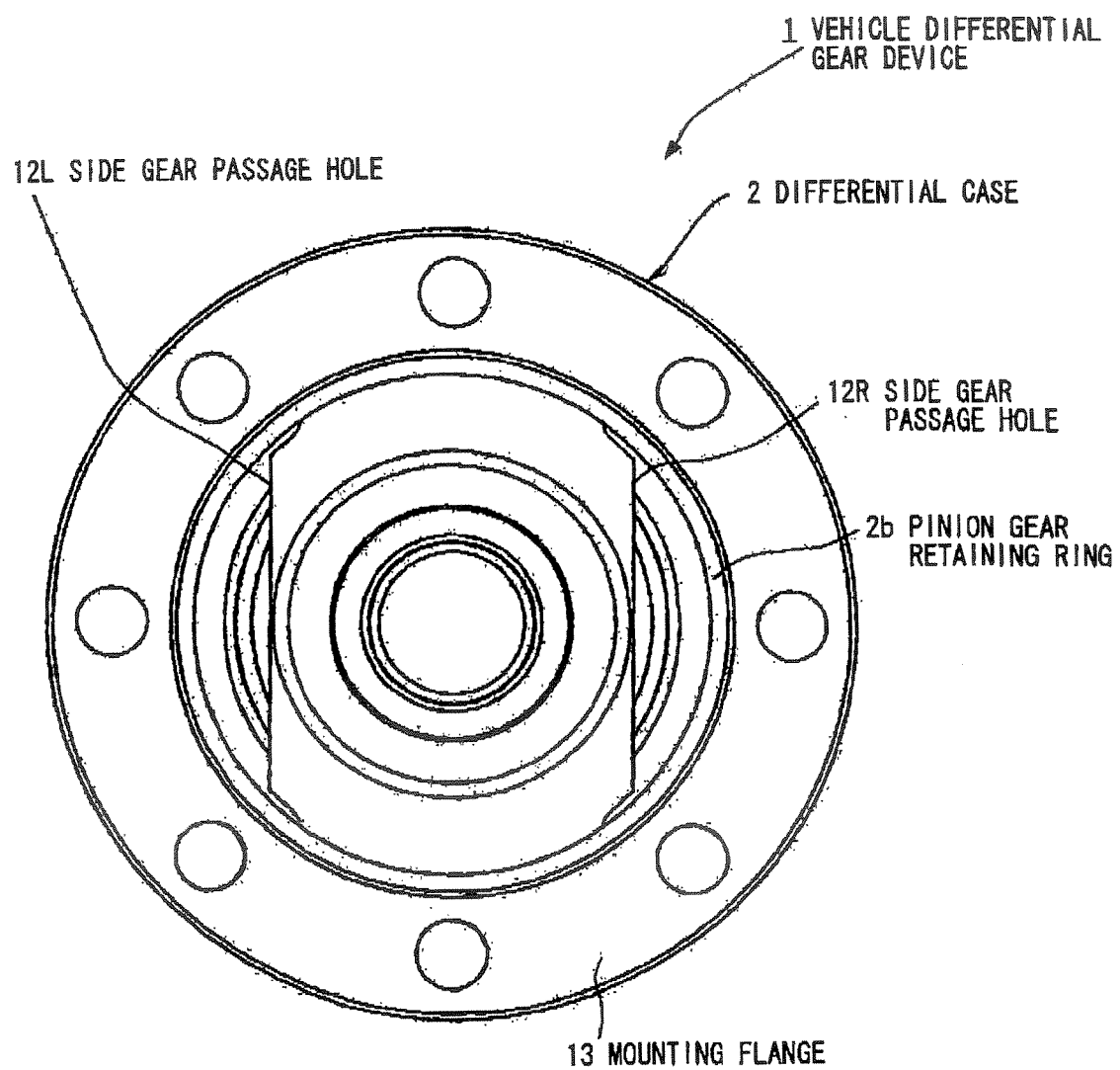
FIG. 6 is a back view showing a vehicle differential gear device in a first preferred embodiment according to the invention.
Figure 7:
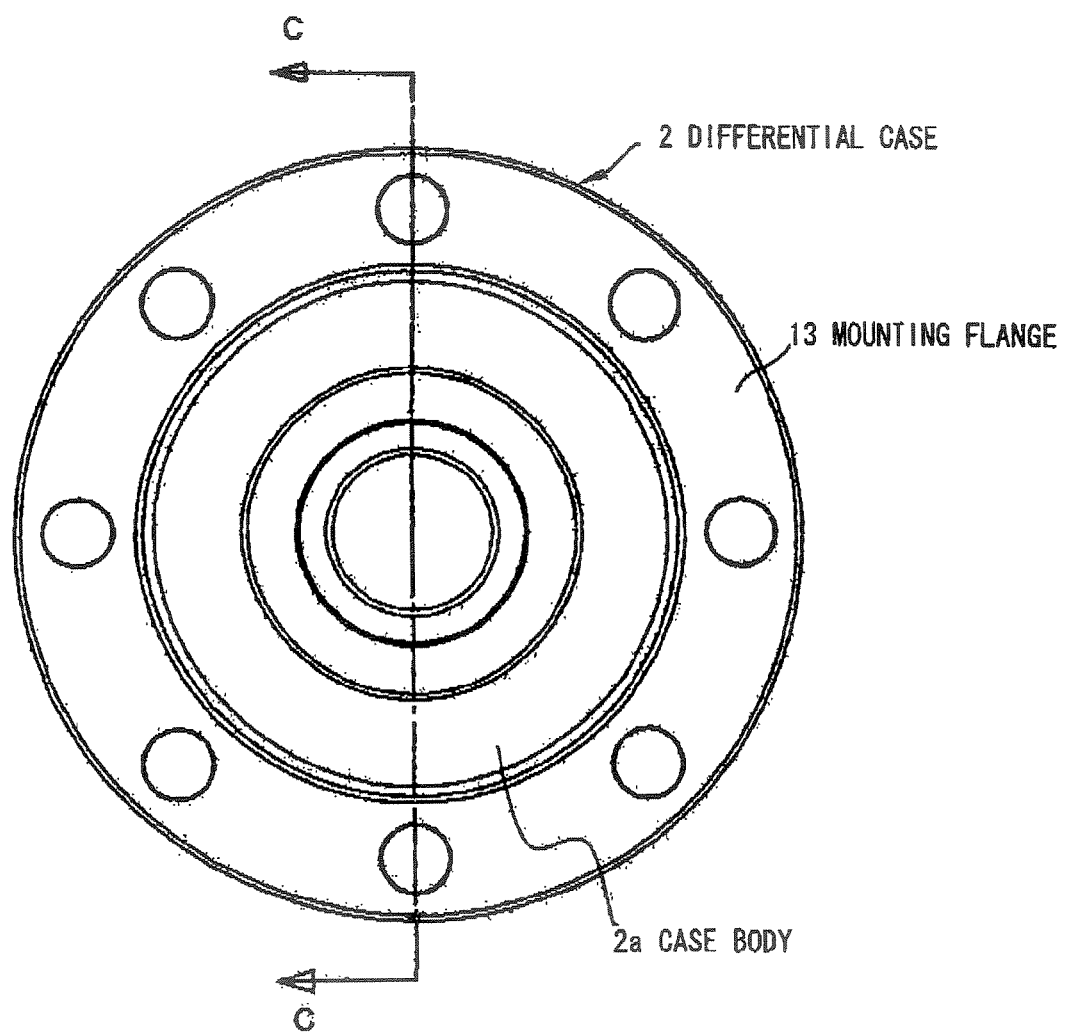
FIG. 7 is a front view showing a differential case of a vehicle differential gear device in a first preferred embodiment according to the invention.
Figure 8:
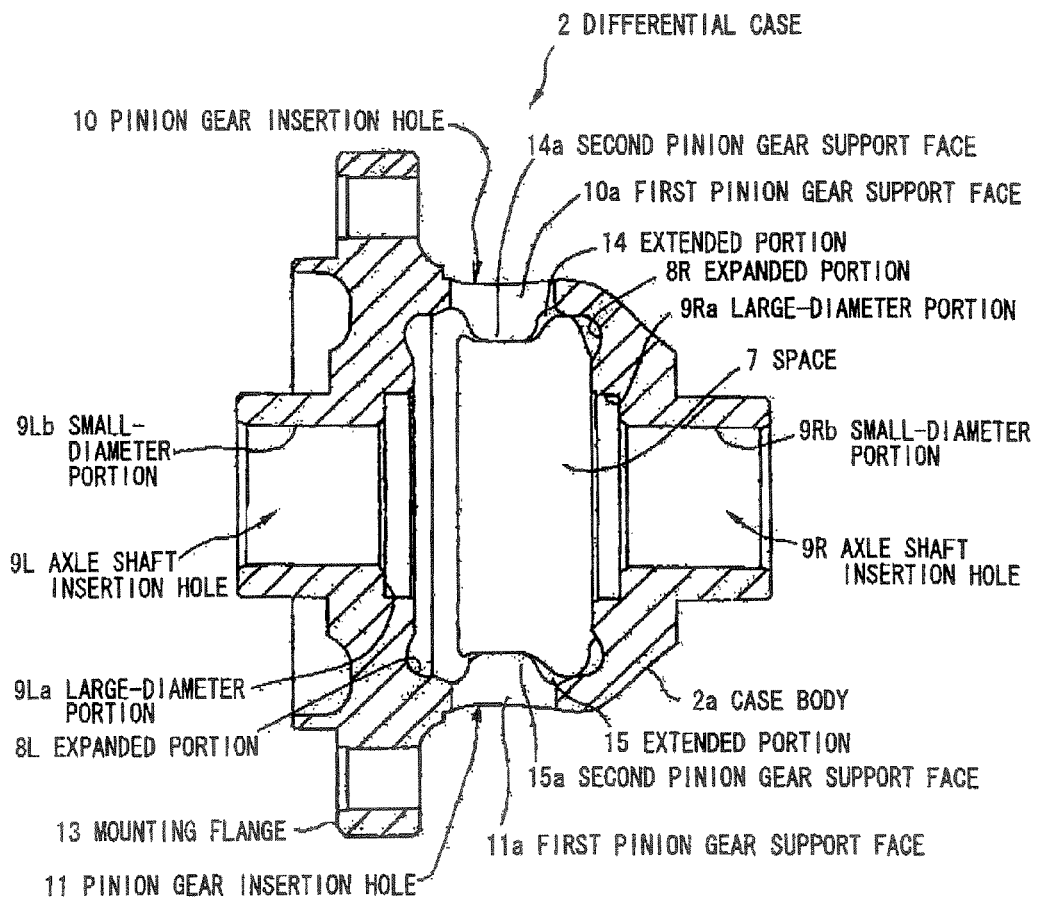
FIG. 8 is a cross sectional view taken along the line C-C in FIG. 7.
Figure 9A:
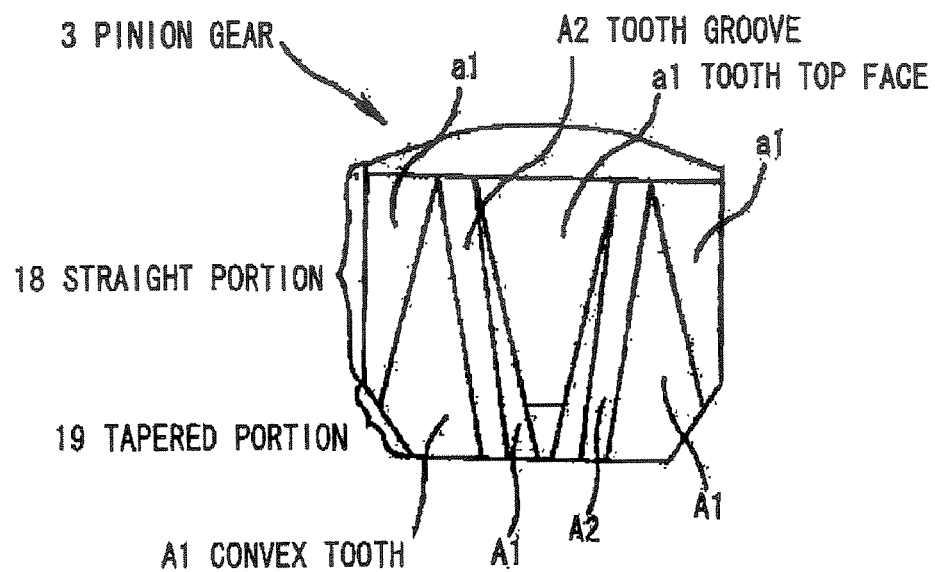
FIG. 9A is a front view showing a pinion gear of a vehicle differential gear device in a first preferred embodiment according to the invention.
Figure 9B:
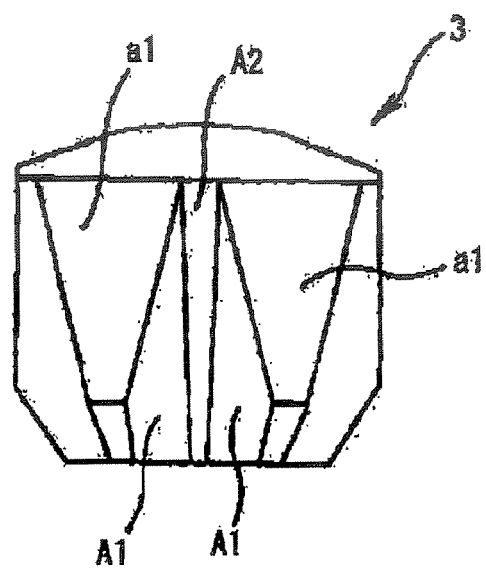
FIG. 9B is a front view showing a pinion gear of a vehicle differential gear device in a first preferred embodiment according to the invention.

FIG. 1 is an exploded perspective view showing a vehicle differential gear device in a first preferred embodiment according to the invention. FIG. 2 is a front view showing a vehicle differential gear device omitted a part thereof in a first preferred embodiment according to the invention. FIG. 3 is a cross sectional view taken along the line A-A in FIG. 2. FIG. 4 is a side view showing a vehicle differential gear device in a first preferred embodiment according to the invention. FIG. 5 is a cross sectional view taken along the line B-B in FIG. 4. FIG. 6 is a back view showing a vehicle differential gear device in a first preferred embodiment according to the invention. FIG. 7 is a front view showing a differential case of a vehicle differential gear device in a first preferred embodiment according to the invention. FIG. 8 is a cross sectional view taken along the line C-C in FIG. 7. FIG. 9A is a front view showing a pinion gear of a vehicle differential gear device in a first preferred embodiment according to the invention. FIG. 9B is a front view showing a pinion gear of a vehicle differential gear device in a first preferred embodiment according to the invention.

Whole Composition of Differential Gear Device

As shown in FIGS. 1 and 3, a vehicle differential gear device 1 in a first preferred embodiment briefly comprises a differential case 2 rotating on receiving an engine torque, top and bottom pinion gears 3, 4 juxtaposed along an axis line direction perpendicular to a rotation axis line O, left and right side gears 5L, 5R engaging with the top and bottom pinion gears 3, 4, and thrust washers 6L, 6R disposed in a back surface side of the left and right side gears 5L, 5R.

Composition of Differential Case

As shown in FIG. 3, the differential case 2 comprises a case body 2a comprising a space 7 (shown in FIG. 8) for housing the pinion gears 3, 4, the side gears 5L, 5R, and the thrust washers 6L, 6R, and expanded portions 8L, 8R (shown in FIG. 8) communicated with the space 7, and a pinion gear retaining ring 2b for preventing the pinion gears 3, 4 from dropping into an outside of the differential case 2.

As shown in FIGS. 3 and 8, the case body 2a comprises left and right axle shaft insertion holes 9L, 9R and opening along the rotation axis line O and top and bottom pinion gear insertion holes 10, 11 and comprising an axis line in a direction perpendicular to an axis line of the axle shaft insertion holes 9L, 9R. Further, the case body 2a comprises side gear passage holes 12L, 12R (shown in FIGS. 5 and 6) disposed in regions which are symmetrical with respect to the rotation axis line O and located at even interval from the pinion gear insertion holes 10, 11 in a circumferential direction separately. As shown in FIGS. 1 to 8, in a left axle shaft side part of the case body 2a, a mounting flange 13 of an annular ring-shape disposed along a circumferential direction in a plane perpendicular to the rotation axis line O is formed so as to be integrated with the case body 2a.

As shown in FIGS. 3 and 8, the axle shaft insertion holes 9L, 9R comprise through holes of a step shape comprising large-diameter portions 9La, 9Ra and small-diameter portions 9Lb, 9Rb which have a different internal diameter mutually. The axle shaft insertion holes 9L, 9R are inserted by left and right axle shafts (not shown) As shown in FIGS. 3 and 8, thrust washer support portions 9Lc, 9Rc supporting the thrust washers 6L, 6R are formed on a circumferential edge of an inner opening.

The pinion gear insertion holes 10, 11 comprise a through hole comprising an opening of a plane circular shape. The opening size is determined to a size comprising an inner diameter (smaller than an outer diameter of side gears 5L, 5R) approx. identical to an outer diameter of the pinion gears 3, 4. As shown in FIG. 8, an internal surface of the pinion gear insertion holes 10, 11 is formed by first pinion gear support faces 10a, 11a supporting first retained portions (region except for a side gear engagement portion) 3a, 4a of the pinion gears 3, 4 rotatably. On a circumferential edge of an inner opening of pinion gear insertion holes 10, 11, extended portions 14, 15 juxtaposed at even interval in a circumferential direction and extending to a side of a rotation axis line of the differential case 2 (an inside of the differential case 2) are formed so as to be integrated with the differential case 2. The extended portions 14, 15 can be formed so as to extend to an outside of the differential case 2, or both an inside and an outside of the differential case 2. The extended portions 14, 15 comprise second pinion gear support faces 14a, 15a connected together to the first pinion gear support faces 10a, 11a and supporting second retained portions (at least a part of the side engagement portion) 3b, 4b of the pinion gears 3, 4.

As shown in FIGS. 1, 5 and 6, side gear passage holes 12L, 12R comprise through holes comprising an opening of a plane noncircular shape. And the opening size is determined to a larger size than the opening size of the pinion gear insertion holes 10, 11, so as to be capable of inserting the side gears 5L, 5R comprising a lager outer diameter than an outer diameter of the pinion gears 3, 4 to the differential case 2. That is, the side gears 3, 4 are supported on an outer circumference of a side gear engagement portion, or on the extended portion 14 extending to an outside or inside, or the outside and inside of the differential case 2 and an outer circumference of an engagement part with the side gears 5L, 5R, in a plurality of the pinion gear insertion holes 10, 11.

The mounting flange 13 is formed so that a ring gear (not shown) receiving a driving torque from a drive pinion (not shown) can be assembled.

On the other hand, as shown in FIG. 3, the pinion gear retaining ring 2b is attached on an outer circumferential surface of the case body 2a so as to cover an opening part of the pinion gear insertion holes 10, 11. On an inner surface of the pinion gear retaining ring 2b, pinion gear support portions 16, 17 supporting the pinion gears 3, 4 stressed by a centrifugal force and comprising a spherical surface formed to a predetermined curvature are formed.

Figure 10:
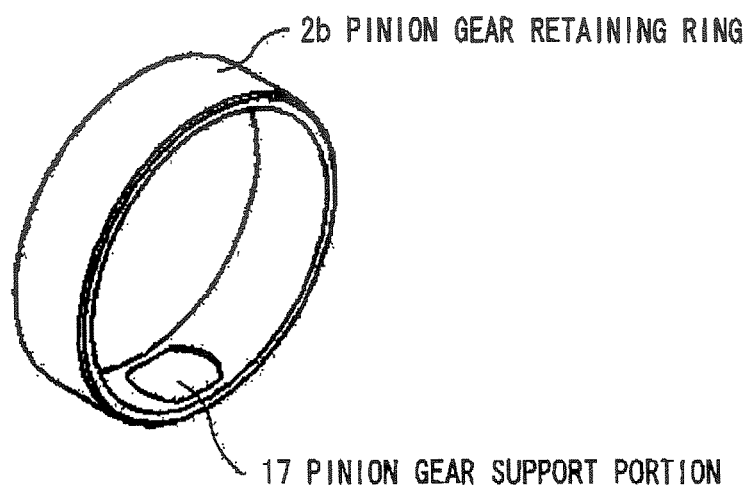
FIG. 10 is a perspective view showing a modified embodiment of a pinion gear retaining ring of a vehicle differential gear device in a first preferred embodiment according to the invention.

Further, in the first preferred embodiment a case that the inner surface of the pinion gear retaining ring 2b comprises the spherical surface over an entire circumference is explained, but the present invention are not to be limited to only the case. As shown in FIG. 10, a case that the inner surface of the pinion gear retaining ring 2b comprises the spherical surface at a part of the circumference as a pinion gear support portion 17 (the pinion gear support portion 17 is only shown) can be adopted.

Composition of Pinion Gears

As shown in FIGS. 9A and 9B the pinion gears 3, 4 comprise shaftless-type gears of an approx. cylindrical shape comprising a gear portion A formed entirely on an outer circumference thereof comprising a convex tooth A1 and a tooth groove A2 juxtaposed alternately in a direction of a circumference, and as shown in FIG. 3, are supported on the pinion gear insertion holes 10, 11, and the extended portions 14, 15 rotatably. As shown in FIG. 3, on a back surface of the pinion gears 3, 4 (a side surface of the pinion gear retaining ring 2b) sliding portions 3A, 4A comprising a spherical surface fitting to the pinion gear support portions 16, 17 of the pinion gear retaining ring 2b are formed.

As shown in FIGS. 9A and 9B, the gear portion A comprises a straight portion 18 comprising first retained portions 3a, 4a and second retained portions 3b, 4b and a tapered portion 19 connected together to the straight portion 18, and engages with side gears 5L, 5R in a side of a rotation axis line of the differential case 2. A tooth top face a1 of the convex tooth A1 in the straight portion 18 (a tooth top face except for a side gear engagement portion engaging with the side gears 5L, 5R, and a part of a tooth top face of the side gear engagement portion continuing into the tooth top face) comprises a circumferential surface comprising a predetermined outer diameter. The tooth top face a1 of the convex tooth A1 in the tapered portion 19 comprises a circumferential surface becoming reduced in size from a gear base portion to a gear top portion.

Composition of Side Gears

As shown in FIG. 3, side gears 5L, 5R comprise a gear of an approx. annular shape (a bevel gear comprising a single face cone angle) comprising bosses 5La, 5Ra having a different outer diameter mutually and gear portions 5Lb, 5Rb, are disposed in a direction of a rotation axis line of the differential case 2 in a movable condition, and are rotatably supported in the differential case 2 while the bosses 5La, 5Ra are inserted to the axle shaft insertion holes 9L, 9R partially. A teeth number of the side gears 5L, 5R is determined to 2.4 times or more of a teeth number of the pinion gears 3, 4 (for example, when the number of the pinion gears 3, 4 is 6, the teeth number of the side gears 5L, 5R is 20). Axle shafts are inserted into axle shaft insertion holes 9L, 9R of the side gears 5L, 5R so that a spline fitting is conducted. An outer diameter of the side gears 5L, 5R are determined to a size larger than a size of an outer diameter of the pinion gears 3, 4 and a distance between the extended portions 14, 15. A method of mounting the side gears 5L, 5R comprises steps of inserting one of side gears 5L, 5R into the differential case 2 through a side gear passage hole 12L or 12R, fitting the boss 5La or 5Ra to one of the axle shaft insertion holes 9L, 9R, inserting another of the side gears 5L, 5R into the differential case 2, and fitting the boss 5La or 5Ra to another of the axle shaft insertion holes 9L, 9R.

Composition of Thrust Washers

As shown in FIG. 1, thrust washers 6L, 6R comprises a washer of an annular shape, and as shown in FIG. 3 thrust washers 6L, 6R are disposed around the bosses 5La, 5Ra and are sandwiched between gear portions 5Lb, 5Rb (back surface) of the side gears 5L, 5R and thrust washer support portions 9Lc, 9Rc. And the embodiment comprises such a structure that an engagement between the side gears 5L, 5R and the pinion gears 3, 4 can be adjusted.

Figure 11:
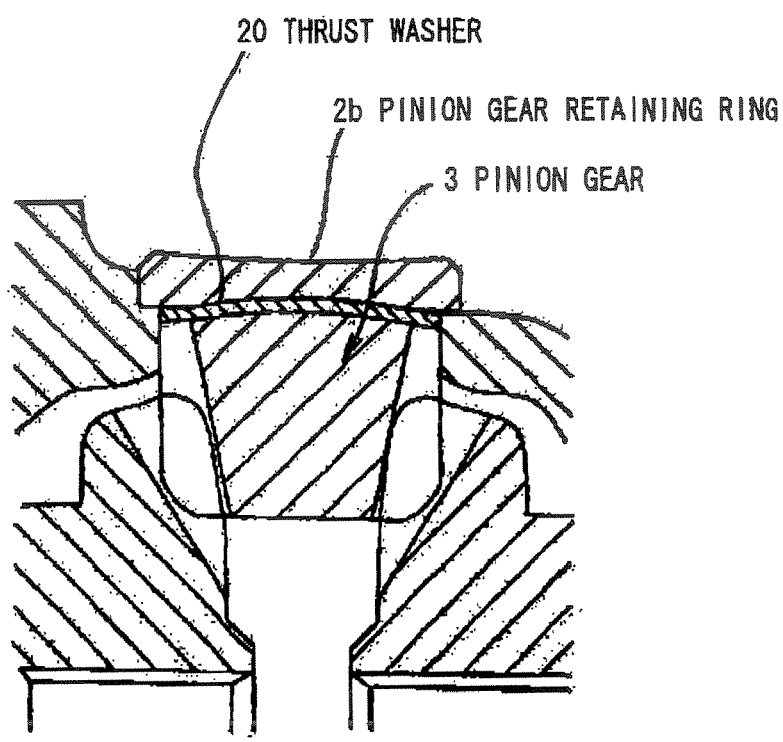
FIG. 11 is a cross sectional view showing a case of sandwiching in a thrust washer between a pinion gear retaining ring and a pinion gear of a vehicle differential gear device in a first preferred embodiment according to the invention.

Further, in the embodiment a case that the thrust washers 6L, 6R are sandwiched between gear portions 5Lb, 5Rb of the side gears 5L, 5R and thrust washer support portions 9Lc, 9Rc so as to adjust the engagement between the side gears 5L, 5R and the pinion gears 3, 4 has been explained, but the invention is not limited to such a case, as shown in FIG. 11, a case that a thrust washer 20 is sandwiched only between the pinion gear retaining ring 2b and the pinion gears 3, 4 can be also adopted. Further, thrust washers can be sandwiched between the side gears 5L, 5R and the thrust washer support portions 9Lc, 9Rc, and between the pinion gear retaining ring 2b and the pinion gears 3, 4 (only the pinion gear 3 is shown) respectively. In this case it is preferred that plural kinds of thrust washers comprising a washer thickness different from each other are prepared, and thrust washers for use are selected from the plural kinds of thrust washers according to processing errors of the pinion gears 3, 4 and the side gears 5L, 5R.

Operation of Differential Gear Device

First, when a torque from an engine side of a vehicle is inputted to the differential case 2 through a drive pinion and a ring gear, the differential case 2 is rotated around the rotation axis line O. Next, when the differential case 2 is rotated, the rotation force is transmitted to the pinion gears is 3, 4, and subsequently is transmitted from the pinion gears 3, 4 to the side gears 5L, 5R. In this case, to the left and right side gears 5L, 5R, the left and right axle shafts are joined by a spline fitting respectively, so that the torque from the engine side of the vehicle can be transmitted to the left and right axle shafts through the drive pinion, the ring gear, the differential case 2, the pinion gears 3, 4 and the side gears 5L, 5R.

In a case that an even load is applied to each wheel on the left and right axle shafts, when the torque from the engine side of the vehicle is inputted to the differential case 2, the pinion gears 3, 4 orbit on the side gears 5L, 5R, and the pinion gears 3, 4 and the side gears 5L, 5R are rotated together with the differential case 2 in an integrated condition so that the torque from the engine side of the vehicle is evenly transmitted to the left and right axle shafts and the left and right wheels are rotated at even revolutions.

On the other hand, in cases that for example the vehicle turns to the left during a drive, or the right wheel falls in a mud, the pinion gears 3, 4 rotate on the side gears 5L, 5R, so that the torque from the engine side of the vehicle is differentially distributed between the left and right axle shafts (wheels). That is, the left wheel is rotated at a lower revolving speed than a revolving speed of the differential case 2 and the right wheel is rotated at a higher revolving speed than the revolving speed of the differential case 2.

Further, when the pinion gears 3, 4 are rotated, the pinion gears 3, 4 slide on first pinion gear support faces 10a, 11a, so that a friction resistance is generated between the pinion gears 3, 4 and the first pinion gear support face 10a, 11a and second pinion gear support face 14a, 15a and a differential rotation of the side gears 5L, 5R is limited by the friction resistance.

In this case, by the rotation of the pinion gears 3, 4 a thrust force is generated on an engaging surface with the side gears 5L, 5R and by the thrust force the side gears 5L, 5R move in a direction of drawing away from each other so as to press thrust washers 6L, 6R to thrust washer support portions 9Lc, 9Rc, so that a friction resistance is generated between the thrust washer 6L, 6R and thrust washer support portions 9Lc, 9Rc and a differential rotation of the side gears 5L, 5R is also limited by the friction resistance.

Method of Assembling the Differential Gear Device

Hereinafter, a method of assembling a vehicle differential gear device in the preferred embodiment will be explained. The method comprises sequential procedures of mounting of side gears and thrust washers, engaging pinion gears with side gears, and mounting a pinion gear retaining ring, so that each procedure will be explained in order.

Mounting of Side Gears and Thrust Washers

First, the side gears 5L, 5R whose bosses 5La, 5Ra are preliminarily inserted to the thrust washers 6L, 6R partially, are inserted to the space 7 of the differential case 2 through side gear passage holes 12L, 12R in a condition of inclining the axis line. Next, the side gears 5L, 5R are moved to one of top and bottom expanded portions 8L, 8R, for example the bottom expanded portions 8L, 8R respectively, while the side gears 5L, 5R are inclined. In this case, the side gears 5L, 5R are moved to the extent that a part of the side gears 5L, 5R butts against the bottom expanded portions 8L, 8R, in order to avoid an interference between the side gears 5L, 5R and the extended portions 14, 15 in the next procedure (when the side gears 5L, 5R turn). After that the side gears 5L, 5R are turned in a direction that portions opposite to butting portions of the side gears 5L, 5R draw away from each other, using the butting portion as a turning pivot, so that each axis line of the side gears 5L, 5R corresponds to the rotation axis line O of the differential case 2. When each axis line of the side gears 5L, 5R corresponds to the rotation axis line O of the differential case 2 the side gears 5L, 5R and the thrust washers 6L, 6R are mounted at a predetermined position in the differential case 2.

Engaging of Pinion Gears and Side Gears

The pinion gears 3, 4 are inserted to pinion gear insertion holes 10, 11 so as to engage with the side gears 5L, 5R. In this case when the pinion gears 3, 4 engage with the side gears 5L, 5R the pinion gears 3, 4 are retained rotatably by the inserted to pinion gear insertion holes 10, 11 and the extended portions 14, 15.

Mounting of Pinion Gear Retaining Ring

After the pinion gear retaining ring 2b preliminarily heat-expanded is inserted to the case body 2a so that the pinion gear insertion holes 10, 11 of the differential case 2 are obstructed by the pinion gear support portions 16, 17, the pinion gear retaining ring 2b is cooled down. In this case when the pinion gear retaining ring 2b is cooled down the pinion gear retaining ring 2b shrinks so that the pinion gear retaining ring 2b is mounted on an outer surface of the case body 2a in a condition that the sliding portions 3A, 4A is adapted to the pinion gear support portions 16, 17.

Advantages of First Embodiment

According to the first preferred embodiment, the following advantages are achieved.

(1) The pinion gears 3, 4 comprise a shaftless-type gear so that an outer diameter thereof can be determined to a small size relatively. Therefore, an outer diameter of the side gears 5L, 5R can be determined to a large size and a rotation backlash ($\tan^{-1}$ (b/r)) defined by a backlash b between the pinion gears 3, 4 and the side gears 5L, 5R, and a radius r of the side gears 5L, 5R becomes small so that a good transmission of a driving force can be achieved.

(2) As the outer diameter of the pinion gears 3, 4 becomes small, a distance between the side gears 5L, 5R becomes small by just that much, so that a size in a direction of the axis line of the differential case 2 can be decreased.

(3) As the outer diameter of the pinion gears 3, 4 becomes small, a slipping area of the pinion gears 3, 4 becomes small by just that much, so that a seize resistance of the pinion gears 3, 4 against a baking caused by the slipping thereof can be enhanced (4) As the outer diameter of the pinion gears 3, 4 becomes small, a mass of the pinion gears 3, 4 are decreased by just that much, so as to make the pinion gears 3, 4 less likely to be affected by a centrifugal force. As a result, a variation in a force of limiting the differential becomes small so that a stable performance can be obtained.

(5) The pinion gears 3, 4 are supported on not only first pinion gear support faces 10a, 11a of the pinion gear insertion holes 10, 11 but also second pinion gear support faces 14a, 15a of the extended portions 14, 15, so that even if an outer force is applied to the pinion gears 3, 4 an inclination thereof can be decreased and a biased abrasion of the pinion gears 3, 4 can be suppressed.

(6) The inclination of the pinion gears 3, 4 can be decreased so that a good engagement between the pinion gears 3, 4 and side gears 5L, 5R can be obtained. Therefore, a rotation driving force at a differential rotation can be smoothly converted from a high speed side to a low speed side and a driving characteristic as a whole can be enhanced.

(6) The sliding portions 3A, 4A of the pinion gears 3, 4 comprise a spherical surface adapted to the pinion gear support portions 16, 17 of the pinion gear retaining ring 2b so that even if an outer force is applied to the pinion gears 3, 4 a center-to-center distance thereof is invariable and a slippage of an engagement position between the pinion gears 3, 4 and the side gears 5L, 5R can be decreased.

Second Embodiment

Figure 12:
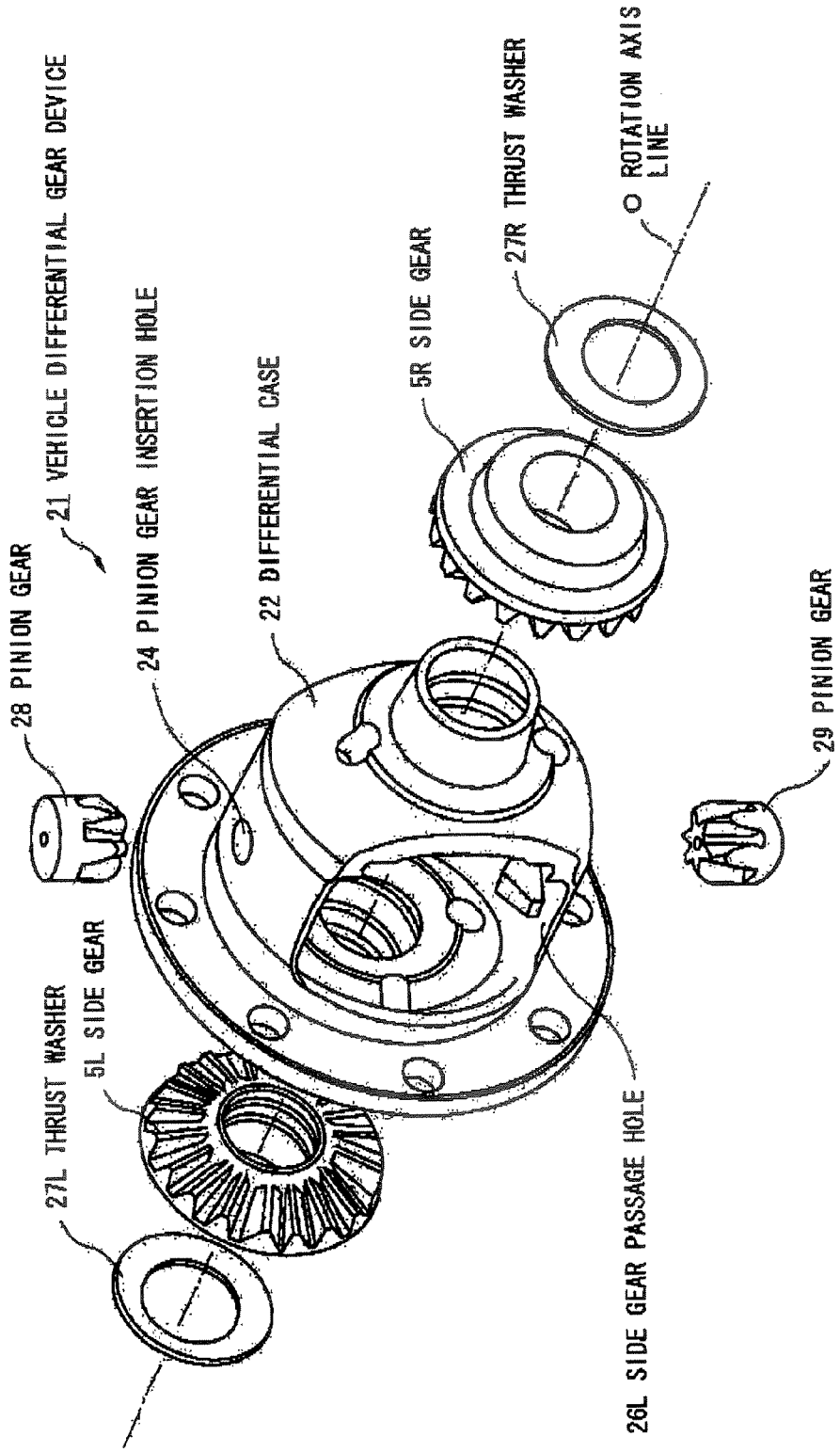
FIG. 12 is an exploded perspective view showing a vehicle differential gear device in a second preferred embodiment according to the invention.
Figure 13:
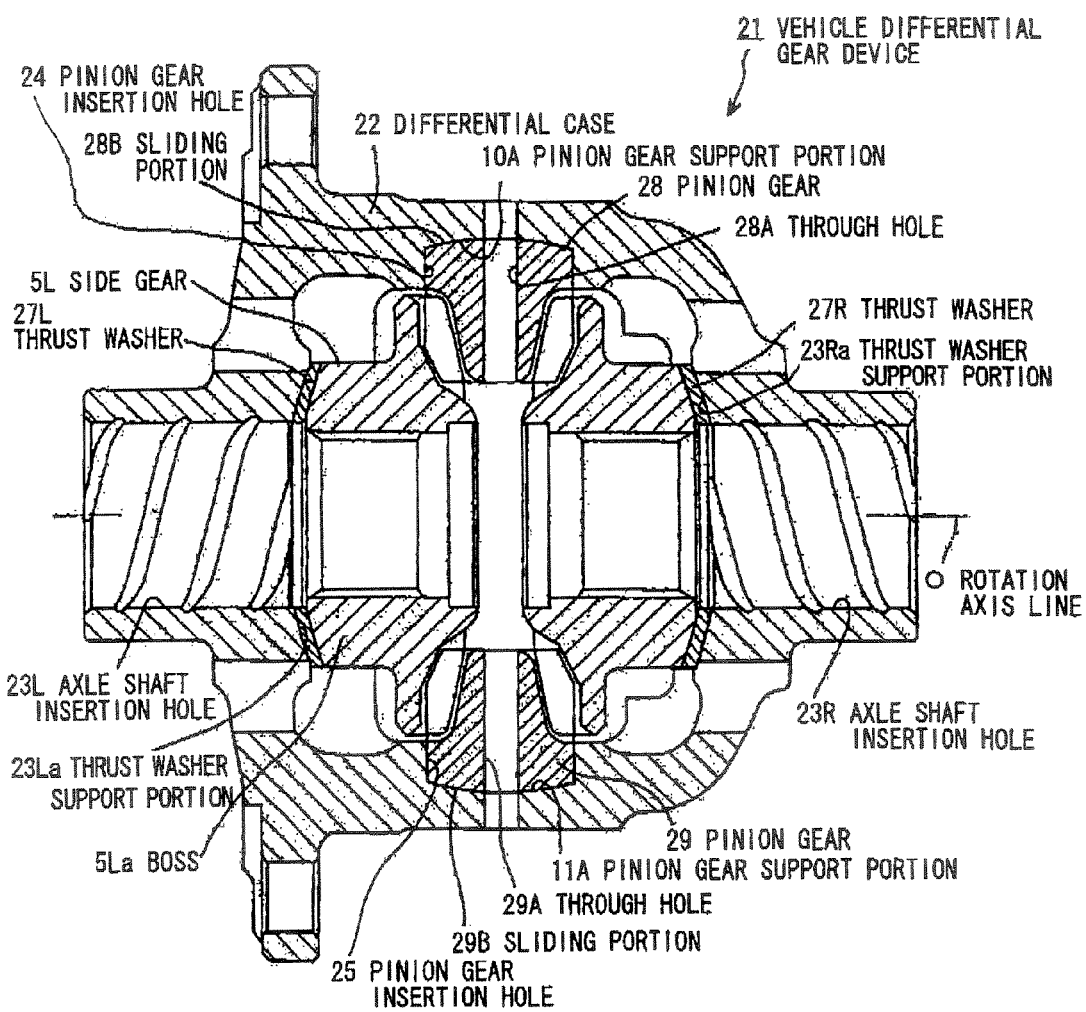
FIG. 13 is a cross sectional view showing a vehicle differential gear device in a second preferred embodiment according to the invention.
Figure 14:
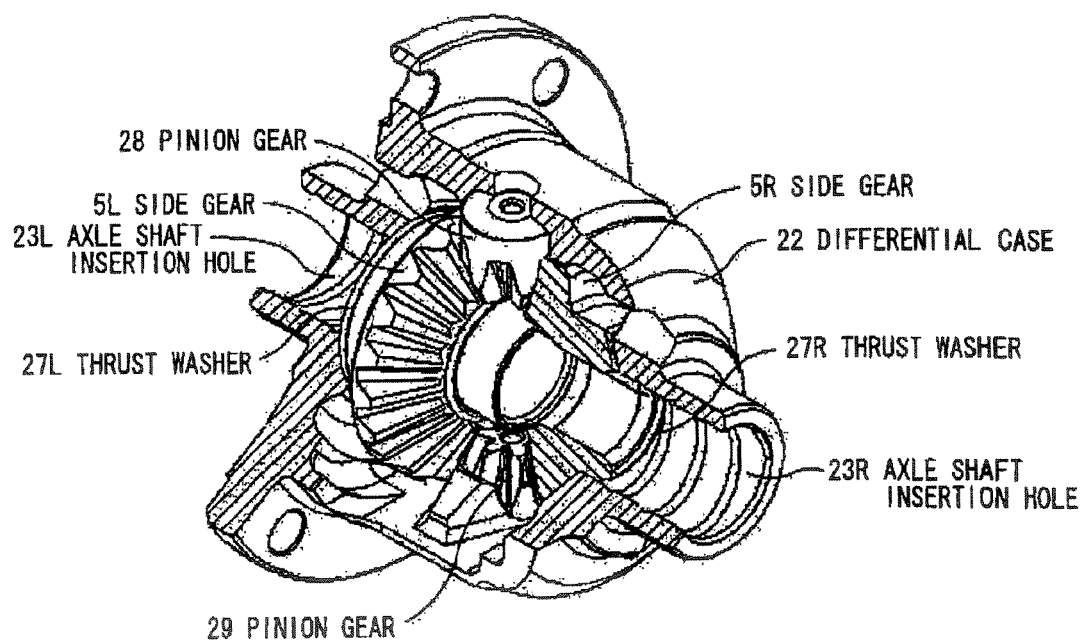
FIG. 14 is a perspective view showing a vehicle differential gear device removed a part thereof in a second preferred embodiment according to the invention.
Figure 15:
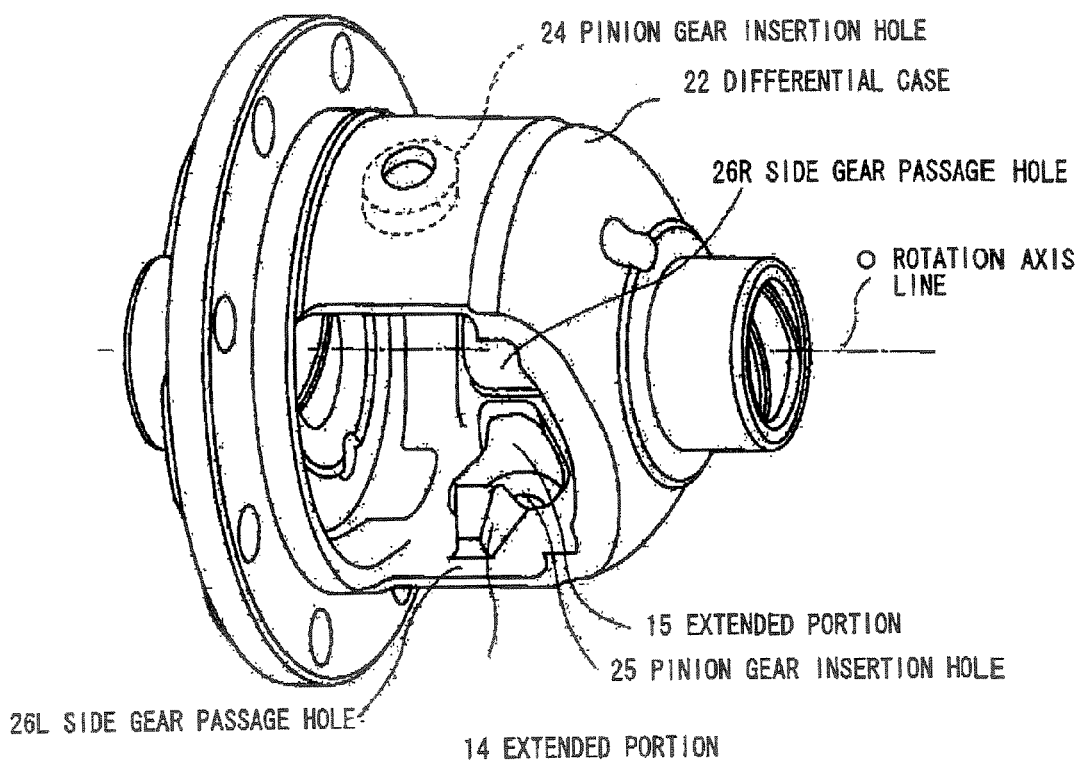
FIG. 15 is a perspective view showing a differential case of a vehicle differential gear device in a second preferred embodiment according to the invention.
Figure 16A:
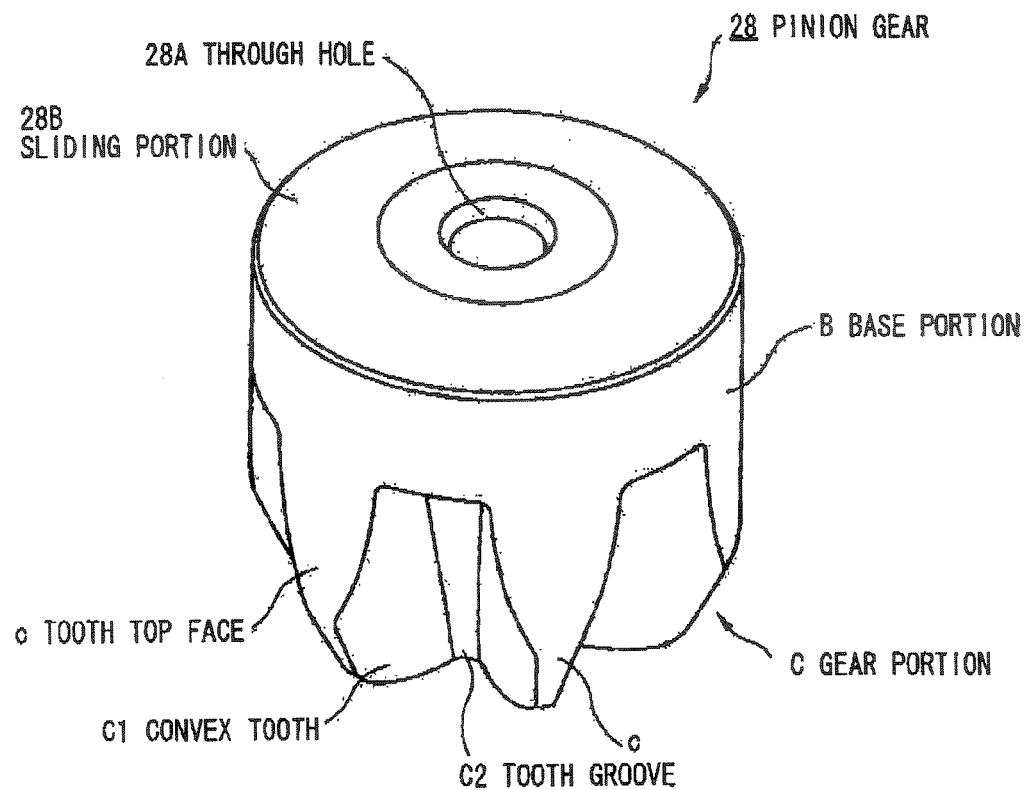
FIG. 16A is a perspective view showing a pinion gear of a vehicle differential gear device in a second preferred embodiment according to the invention, in a condition of seeing the pinion gear from above.
Figure 16B:
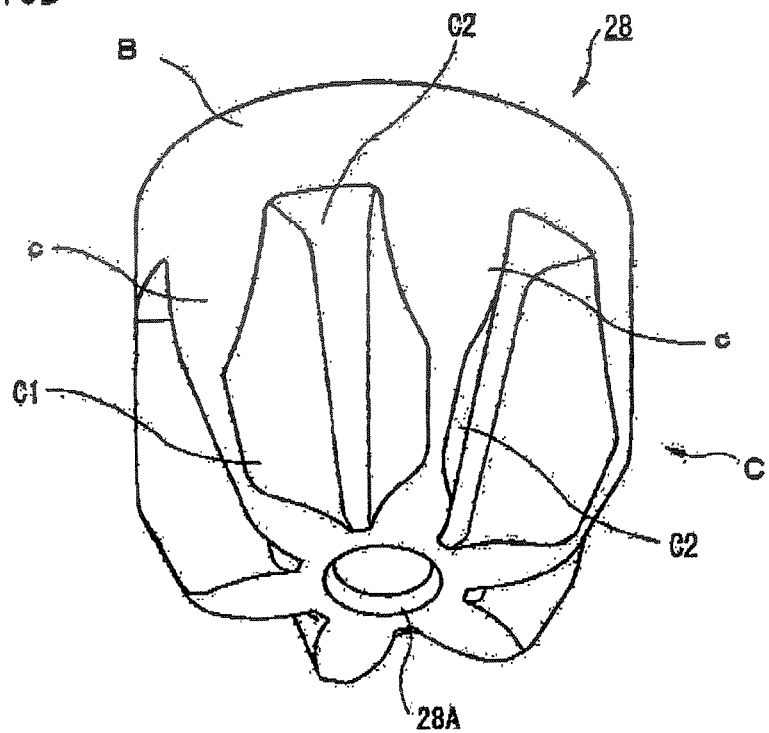
FIG. 16B is a perspective view showing a pinion gear of a vehicle differential gear device in a second preferred embodiment according to the invention, in a condition of seeing the pinion gear from underneath.
Figure 17A:
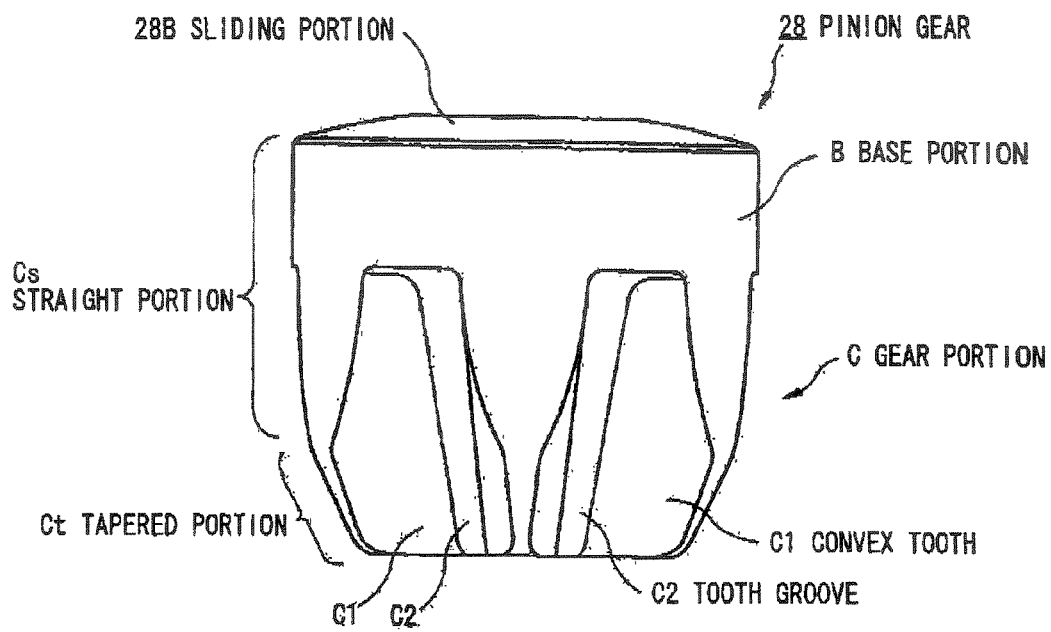
FIG. 17A is a front view (1) showing a pinion gear of a vehicle differential gear device in a second preferred embodiment according to the invention.
Figure 17B:
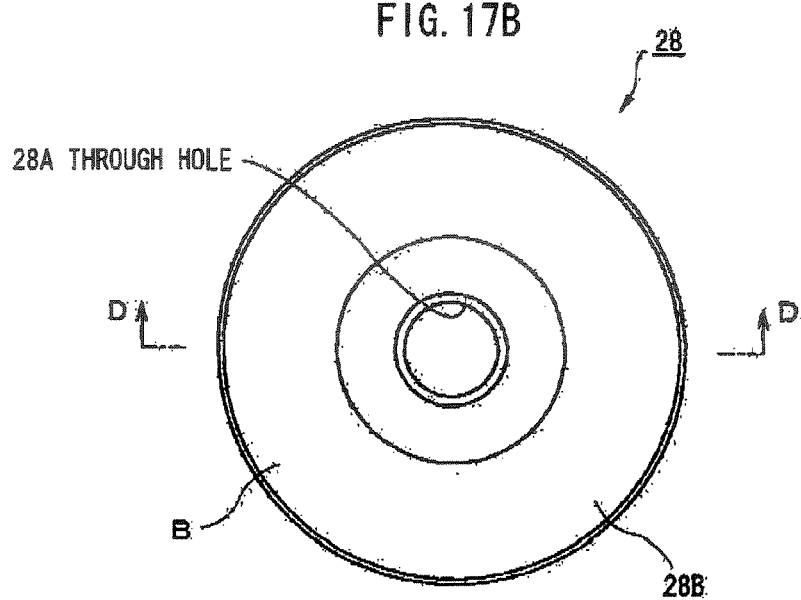
FIG. 17B is a plain view showing a pinion gear of a vehicle differential gear device in a second preferred embodiment according to the invention.
Figure 18A:
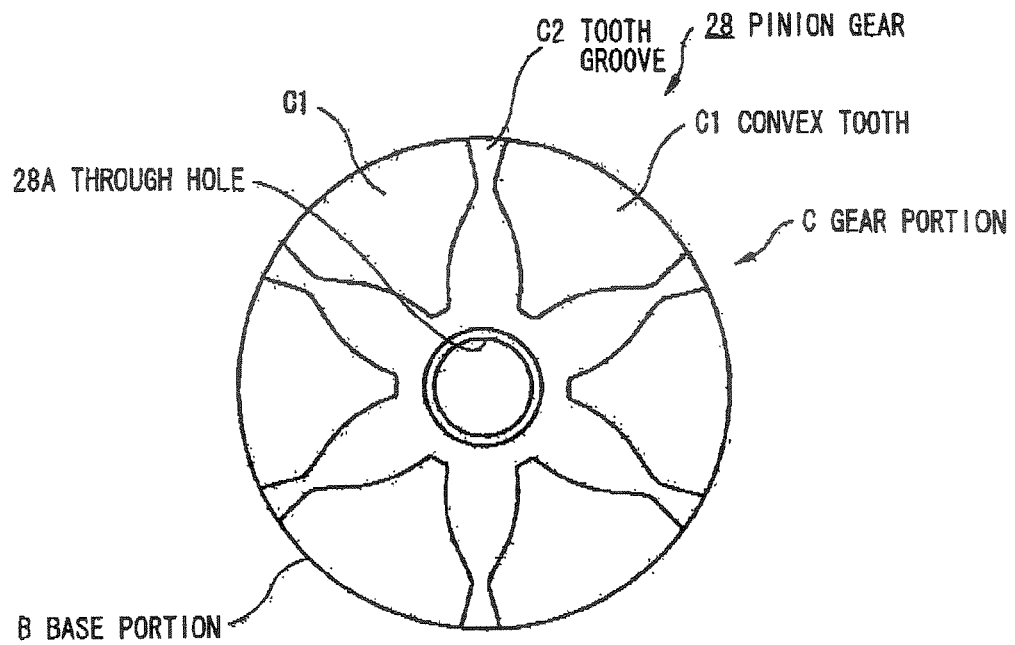
FIG. 18A is a bottom view showing a pinion gear of a vehicle differential gear device in a second preferred embodiment according to the invention.
Figure 18B:
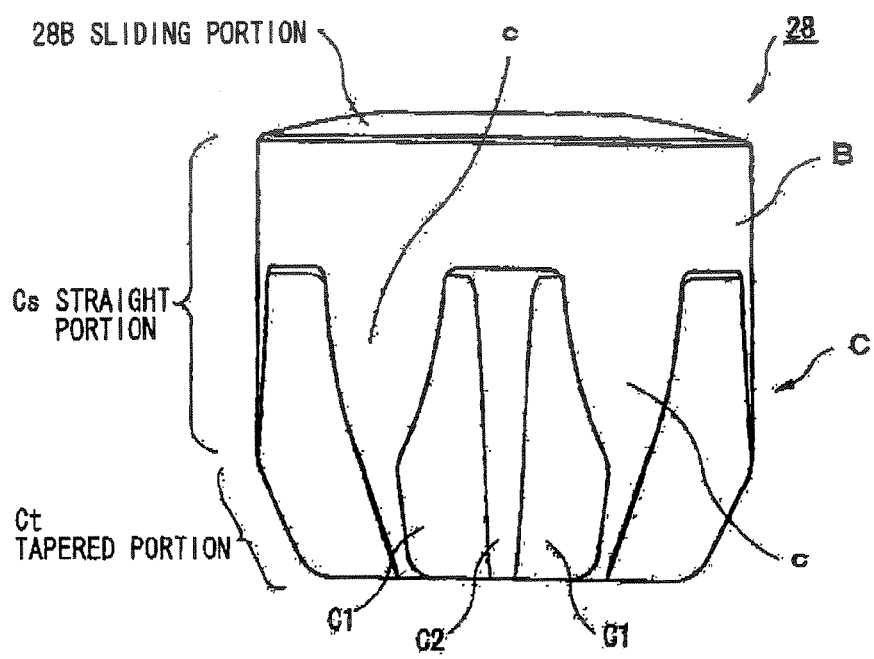
FIG. 18B is a front view (2) showing a pinion gear of a vehicle differential gear device in a second preferred embodiment according to the invention.
Figure 19:
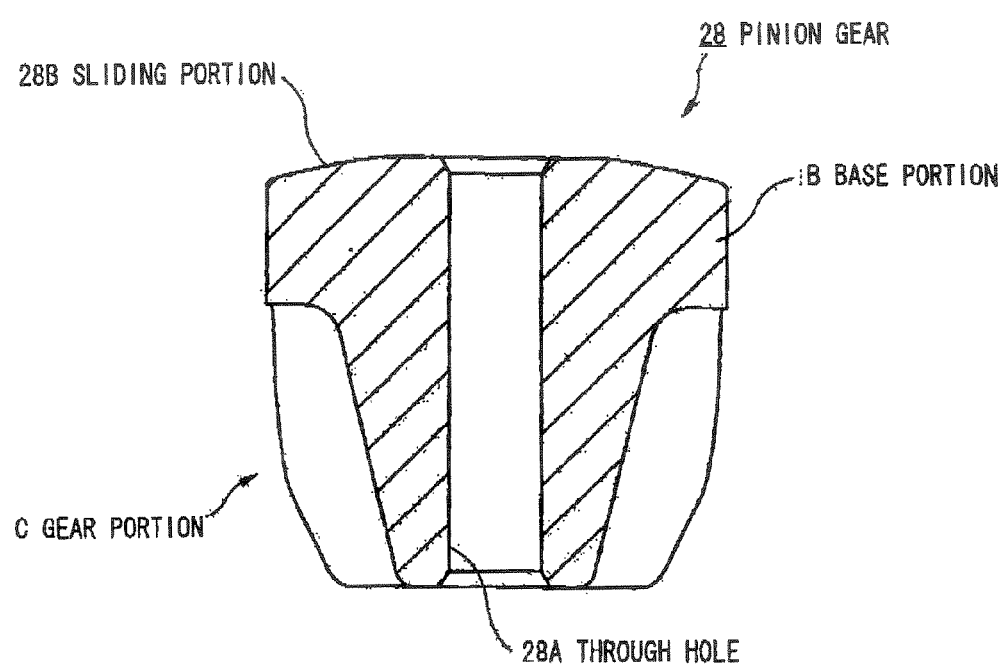
FIG. 19 is a cross sectional view taken along the line D-D in FIG. 17B.

FIG. 12 is an exploded perspective view showing a vehicle differential gear device in a second preferred embodiment according to the invention. FIG. 13 is a cross sectional view showing a vehicle differential gear device in a second preferred embodiment according to the invention. FIG. 14 is a perspective view showing a vehicle differential gear device removed a part thereof in a second preferred embodiment according to the invention. FIG. 15 is a perspective view showing a differential case of a vehicle differential gear device in a second preferred embodiment according to the invention. FIG. 16A is a perspective view showing a pinion gear of a vehicle differential gear device in a second preferred embodiment according to the invention, in a condition of seeing the pinion gear from above. FIG. 16B is a perspective view showing a pinion gear of a vehicle differential gear device in a second preferred embodiment according to the invention, in a condition of seeing the pinion gear from underneath. FIG. 17A is a front view (1) showing a pinion gear of a vehicle differential gear device in a second preferred embodiment according to the invention. FIG. 17B is a plain view showing a pinion gear of a vehicle differential gear device in a second preferred embodiment according to the invention. FIG. 18A is a bottom view showing a pinion gear of a vehicle differential gear device in a second preferred embodiment according to the invention. FIG. 18B is a front view (2) showing a pinion gear of a vehicle differential gear device in a second preferred embodiment according to the invention. FIG. 19 is a cross sectional view taken along the line D-D in FIG. 17B. In FIGS. 12 to 19, as to components identical or equivalent to the components used in FIGS. 1 to 9 the same references are used (except for a pinion gear and a differential case), and detail explanation is omitted, As shown in FIGS. 12 to 14, a vehicle differential gear device 21 in a second preferred embodiment is characterized in comprising a differential case 2 of one piece structure which does not comprise the pinion gear retaining ring 2b (shown in FIGS. 1 and 3)

Therefore, as shown in FIG. 13, a differential case 22 comprises left and right axle shaft insertion holes 23L, 23R opening along the rotation axis line O and left and right pinion gear insertion holes 24, 25 comprising an axis line in a direction perpendicular to the axis line of the axle shaft insertion holes 23L, 23R. Further, as shown in FIG. 15, the differential case 22 comprises side gear passage holes 26L, 26R disposed in regions which are symmetrical with respect to the rotation axis line O and located at even interval from the pinion gear insertion holes 24, 25 in a circumferential direction separately.

As shown in FIG. 13, the axle shaft insertion holes 23L, 23R comprise through holes comprising a similarly sized inner diameter. To the axle shaft insertion holes 23L, 23R left and right axle shafts (not shown) are inserted respectively. As shown in FIG. 13, to a circumferential edge of an inner opening of the axle shaft insertion holes 23L, 23R thrust washer support portions 23La, 23Ra which support an annular thrust washer 27L, 27R and comprise a spherical surface are formed.

As shown in FIGS. 13 and 15, the pinion gear insertion holes 24, 25 comprise through holes of a step shape comprising an opening of a plane circular shape. Further, the opening size is determined to a size comprising an inner diameter smaller than outer diameters of the pinion gears 28, 29 and the side gears 5L, 5R. On step-shaped surfaces of the pinion gear insertion holes 24, 25, pinion gear support portions (top portion) 10A, 11A supporting the pinion gears 28, 29 stressed by a centrifugal force and comprising a spherical surface formed to a predetermined curvature are formed. On a circumferential edge of an inner opening of pinion gear insertion holes 24, 25 extended portions 14, 15 juxtaposed at even interval in a circumferential direction and extending to a side of a rotation axis line of the differential case 22 are formed so as to be integrated with the differential case 22. The extended portions 14, 15 can be formed so as to extend to an outside of the differential case 22, or both an inside and an outside of the differential case 22.

The pinion gears 28, 29 comprise an identical structure respectively, therefore, for example only the pinion gear 28 will be explained. As shown in FIGS. 16 to 19, the pinion gear 28 comprises shaftless-type gears of an approx, cylindrical shape which comprise a base portion B comprising a circumferential surface having a predetermined outer diameter, and a gear portion C comprising a convex tooth C1 and a tooth groove C2 juxtaposed alternately in a direction of a circumference and being formed on an outer circumference thereof. Further, as shown in FIG. 13, the pinion gear 28 is supported on the pinion gear insertion holes 24, 25 and the extended portions 14, 15 (shown in FIG. 5) rotatably. As shown in FIG. 19, the pinion gears 28, 29 comprise through holes 28A, 29A opening in a direction of the gear axis line. Therefore, a heat treatment can be applied to not only outer surfaces of the pinion gears 28, 29 but also inner surface of the through holes 28A, 29A so that a mechanical strength of the pinion gears 28, 29 can be further increased. Further, the through holes 28A, 29A comprise a structure functioning as centering holes at forming the pinion gears 28, 29, lubricant supply holes at using the vehicle differential gear device 1 and gear support shaft insertion holes at housing the pinion gears 28, 29.

The base portion 8 is disposed in an edge portion of a side opposite to a side of the side gear and in a region except for a side gear engagement portion engaging with the side gears 5L, 5R and comprising a structure functioning as a supported surface which is supported in the pinion gear insertion holes 24, 25. As shown in FIG. 13, on a back surface, sliding portions 28A, 29A comprising a spherical surface fitting to the pinion gear support portions 24A, 25A of the pinion gear retaining ring 2b are formed As shown in FIGS. 17A and 18B, the gear portion C comprises a straight portion Cs comprising first retained portions 28a, 29a and second retained portions 28b, 29b and a tapered portion Ct connected together to the straight portion Cs, and engages with side gears 5L, 5R in a side of a rotation axis line of the differential case 22. A tooth top face c of the convex tooth C1 in the straight portion Cs (a circumferential surface of the base portion except for a side gear engagement portion engaging with the side gears 5L, 5R, and a part of a tooth top face of the side gear engagement portion continuing into the circumferential surface) comprises a circumferential surface comprising a predetermined outer diameter. The tooth top face c of the convex tooth C1 in the tapered portion Ct comprises a circumferential surface becoming reduced in size from a gear base portion to a gear top portion.

As shown in FIG. 12, the side gear passage holes 26L, 26R comprise through holes comprising an opening of a plane noncircular shape. And the opening size is determined so as to be capable of inserting the pinion gears 28, 29 and the side gears 5L, 5R to the differential case 22.

As shown in FIG. 13, side gears 5L, 5R comprise a gear of an approx. annular shape (a bevel gear comprising a single face cone angle) comprising a diameter larger than a diameter of the pinion gears 28, 29, are rotatably supported in the differential case 22, and engage with the pinion gears 28, 29. Further, on a back surface of the side gears 5L, 5R, sliding portions 5La, 5Ra comprising a spherical surface fitting to the thrust washer support portions 23La, 23Ra through the washer 27L, 27R are formed.

Figure 20:
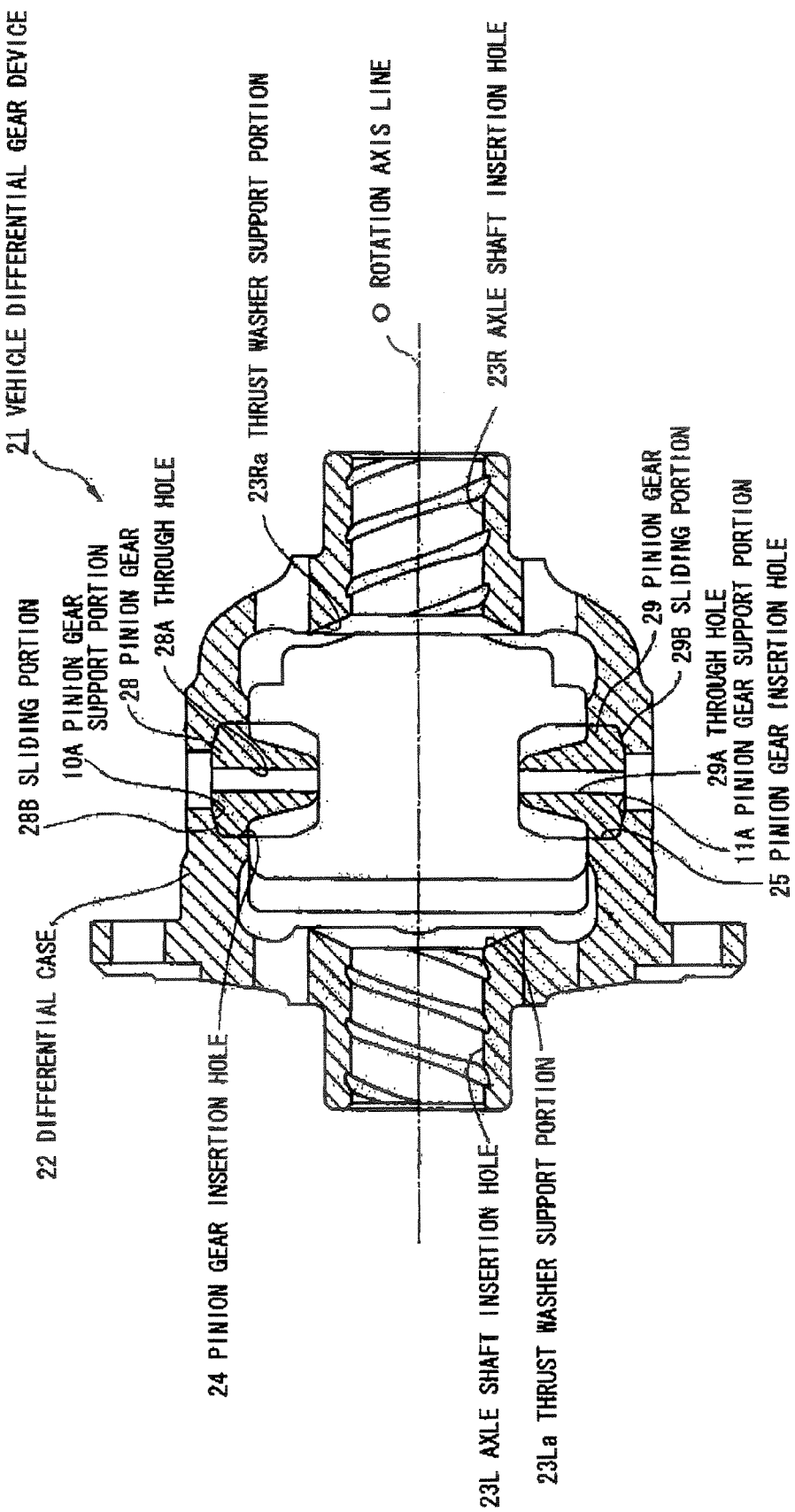
FIG. 20 is a cross sectional view showing an assembling method (mounting a pinion gear) of a vehicle differential gear device in a second preferred embodiment according to the invention.
Figure 21:
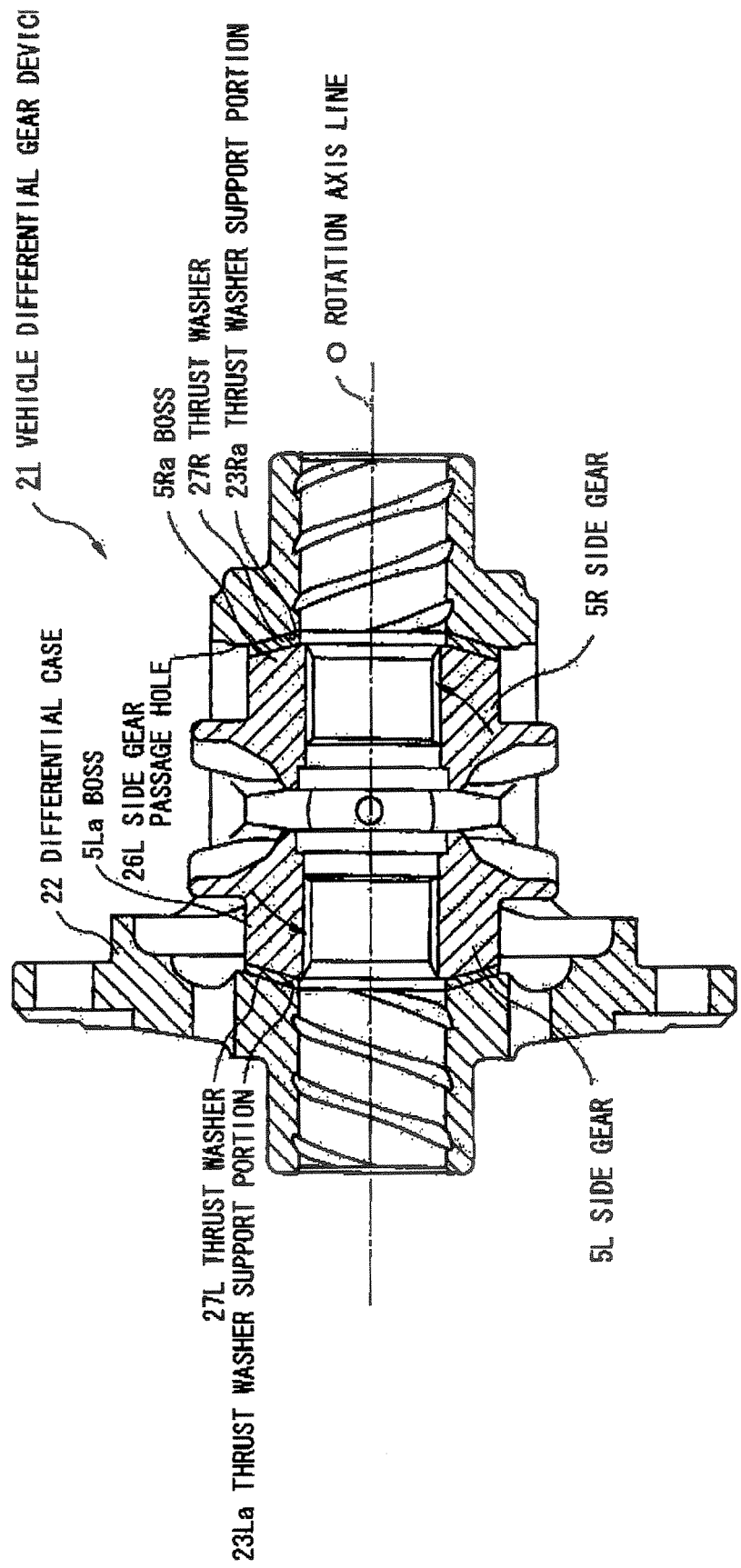
FIG. 21 is a cross sectional view showing an assembling method (mounting a side gear) of a vehicle differential gear device in a second preferred embodiment according to the invention.

Hereinafter, a method of assembling a vehicle differential gear device in the preferred embodiment will be explained referring to FIGS. 20 and 21. FIG. 20 is a cross sectional view showing an assembling method (mounting a pinion gear) of a vehicle differential gear device in a second preferred embodiment according to the invention. FIG. 21 is a cross sectional view showing an assembling method (mounting a side gear) of a vehicle differential gear device in a second preferred embodiment according to the invention. The method comprises sequential procedures of mounting of pinion gears, mounting of side gears, and engaging pinion gears with side gears, so that each procedure will be explained in order.

Mounting of Pinion Gears

First, after the pinion gears 28, 29 are inserted to the differential case 22 through side gear passage holes 26L, 26R, the pinion gears 28, 29 are inserted to the pinion gear insertion holes 24, 25 to the extent that the sliding portions 28B, 29B butt against the pinion gear support portions 10A, 11A, and retained. In this case when the pinion gears 28, 29 are retained in the pinion gear insertion holes 24, 25, the pinion gears 28, 29 are mounted to the predetermined location in the differential case 22.

Mounting of Side Gears

The side gears 5L, 5R are inserted to the differential case 22 through the side gear passage holes 26L, 26R along the thrust washer support portions 23La, 23Ra from mutually different directions (directions shown in FIG. 21 by arrowed lines), while side gears 5L, 5R are made slide on thrust washer support portions 23La, 23Ra, so that the gear axis line corresponds to the rotation axis line O. When each axis line of the side gears 5L, 5R corresponds to the rotation axis line O the side gears 5L, 5R are mounted in the differential case 22.

Further, the insertion of the side gears 5L, 5R, if an opening size of the side gear passage holes 26L, 26R is determined to a size larger than an opening size shown in FIG. 21, a distance between the thrust washer support portions 23La, 23Ra is determined to a distance wider than a distance shown in FIG. 21, and a thickness of the thrust washer support portions 23La, 23Ra is determined to a thickness thicker by just that much, can be performed by that the side gears 5L, 5R are made slide along the thrust washer support portions 23La, 23Ra from mutually identical directions However, as described above, according to a method that the side gears 5L, 5R are mounted from mutually different directions, the side gears 5L, 5R can be mounted from dual directions in a condition that the side gears 5L, 5R engage with the pinion gears 28, 29 and the pinion gears 28, 29 are rotated, so that the following advantages can be obtained. That is, the openings of the side gear passage holes 26L, 26R are not required to be enlarged and a stiffness of the differential case 22 is assured.

Engaging of Pinion Gears and Side Gears

The thrust washers 27L, 27R are sandwiched between slide portions of the bosses 5La, 5Ra of the side gears 5L, 5R and the thrust washer support portion 23La, 23Ra, while a distance in a direction of the axis line between the thrust washer support portion 23La, 23Ra and the side gears 5L, 5R is adjusted. In this case when the thrust washers 27L, 27R are sandwiched between the side gears 5L, 5R and the thrust washer support portion 23La, 23Ra, so as to engage with the pinion gears 28, 29. Further, in order to perform a joining work (a spline fitting) of the side gears 5L, 5R and the axle shafts (not shown) smoothly and surely, it is preferable that on engaging the pinion gears 28, 29 with the side gears 5L, 5R, a stopper (not shown) as an axle shaft movement restriction member is sandwiched between the left and right side gears 5L, 5R.

Advantages of Second Embodiment

According to the second preferred embodiment, the following advantages are achieved in addition to the advantages (1) to (7) of the first preferred embodiment.

(1) The base portion B always functions as a supported surface to the supporting surface of the pinion gear insertion holes 24, 25, so that even if supporting positions are different mutually due to the pinion gear insertion holes 10, 11 when the pinion gears 28, 29 rotate, a certain area of the supported surface can be assured and a mechanical strength as a gear can be increased. Further, a good engagement between the pinion gears 28, 29 and the side gears 5L, 5R can be obtained so that a noise at the gear rotation can be decreased.

(2) The base portion functions as the supported surface so that an area of the supported surface is enlarged as a whole. Therefore, a surface pressure which the pinion gears 28, 29 are applied from the pinion gear insertion holes 24, 25 and the extended portions 14, 15 can be dispersed and a seize resistance against a baking of the pinion gears 28, 29 can be enhanced.

(3) The side gears 5L, 5R are inserted to the differential case 22 through the side gear passage holes 26L, 26R along the thrust washer support portions 23La, 23Ra from mutually different directions, while side gears 5L, 5R are made slide on thrust washer support portions 23La, 23Ra and the side gears 5L, 5R are mounted in the differential case 22, so that the opening size of the side gear passage holes 26L, 26R is determined to a relatively small size, and a mechanical strength of the differential case 22 can be increased.

Figure 22:
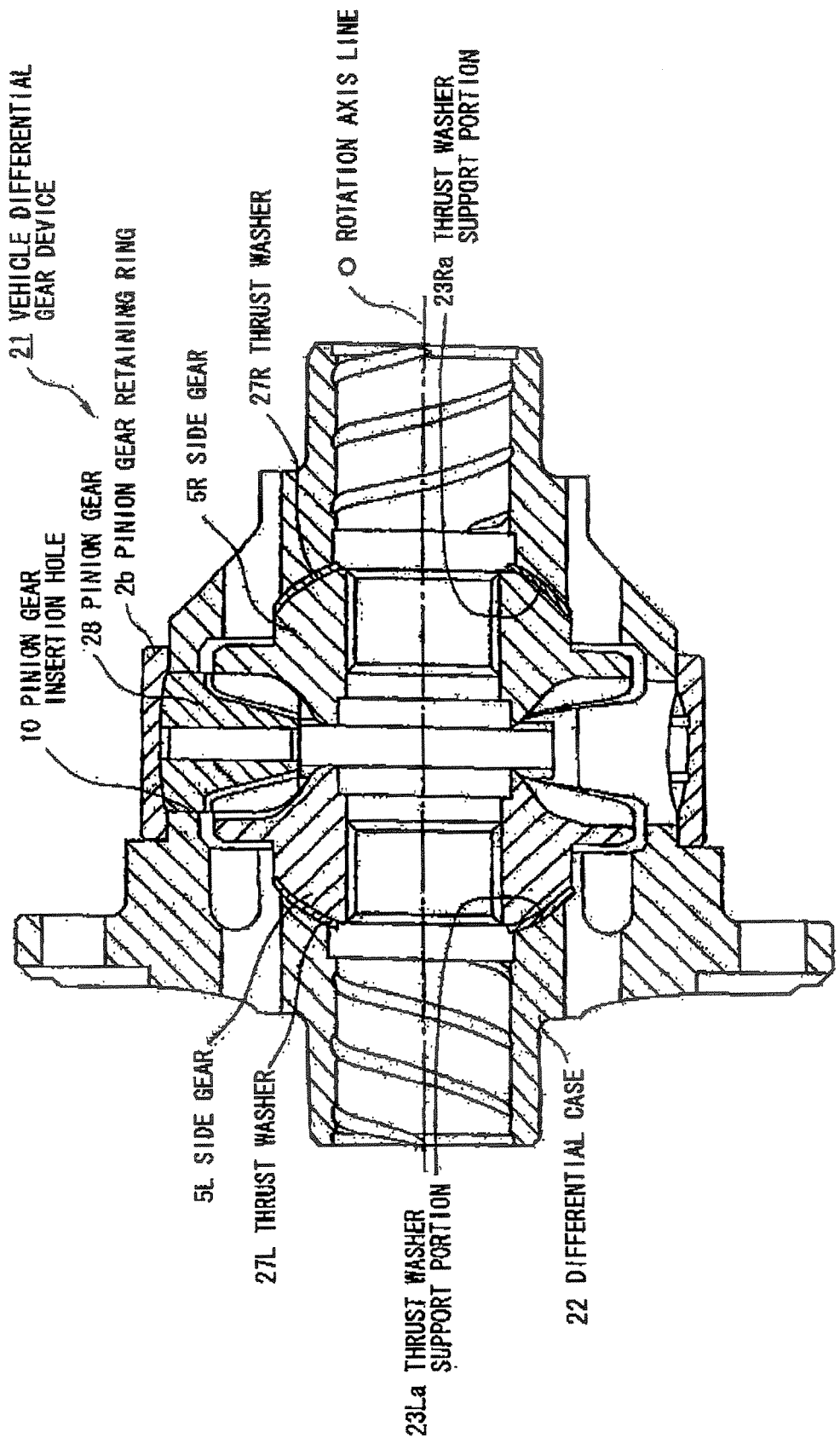
FIG. 22 is a cross sectional view showing a modified embodiment of a differential case (a pinion gear insertion hole) of a vehicle differential gear device in a second preferred embodiment according to the invention.

(4) Further, in the embodiment a structure that the pinion gear retaining ring 2b is not used has been explained, but the invention is not limited to such a structure, as shown in FIG. 22, the following structure can be adopted The structure is that the pinion gear retaining ring 2b is used by means that the pinion gear insertion holes 10, 11 comprising an inner diameter determined to a size approx. identical to an outer diameter of the pinion gears 28, 29 are formed on the differential case 22.

Figure 23:
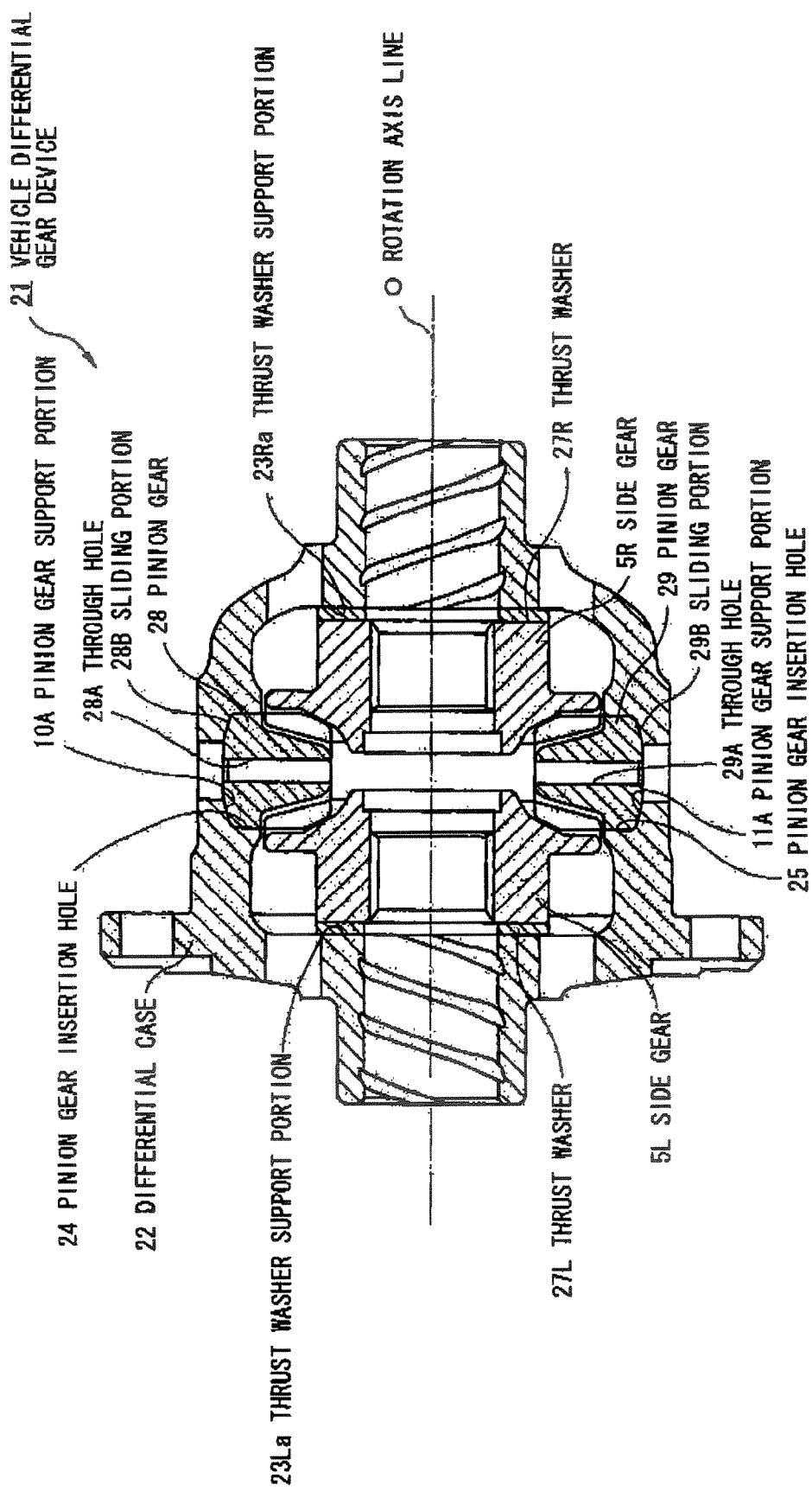
FIG. 23 is a cross sectional view showing a modified embodiment of a side gear support portion of a differential case of a vehicle differential gear device in a second preferred embodiment according to the invention.

Further, in the embodiment a case that a back surface of the side gears 5L, 5R and both surface of the thrust washers 27L, 27R are spherical surfaces has been explained, but the invention is not limited to such a case, as shown in FIG. 23, a case that the surfaces are plane surfaces can be adopted.

Third Embodiment

Figure 24:
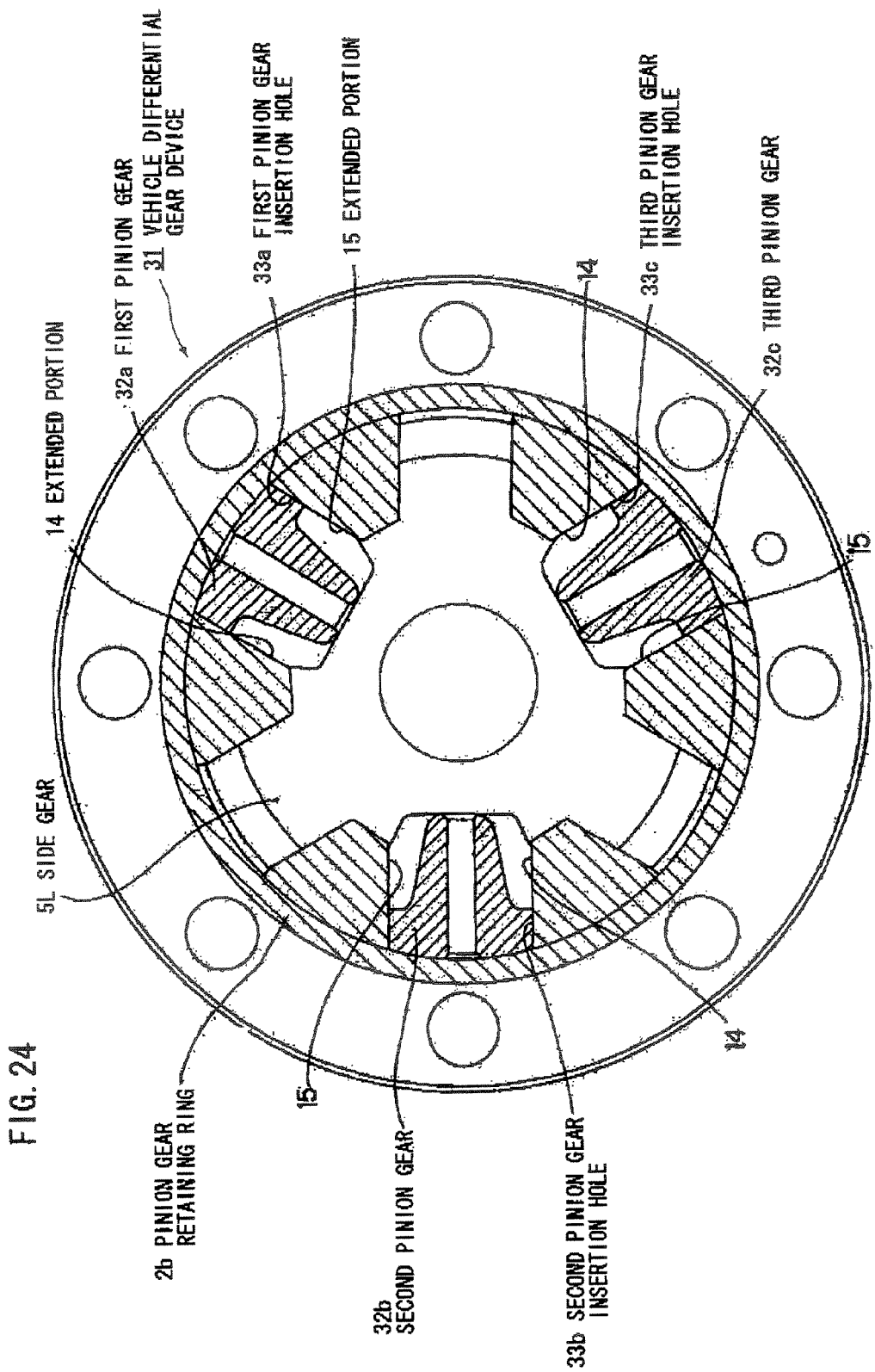
FIG. 24 is a cross sectional view showing a vehicle differential gear device in a third preferred embodiment according to the invention.

FIG. 24 is a cross sectional view (corresponding to FIG. 5) showing a vehicle differential gear device in a third preferred embodiment according to the invention. In FIG. 24, as to components identical or equivalent to the components used in FIG. 5 the same references are used (except for a pinion gear and a pinion gear insertion hole), and detail explanation is omitted.

As shown in FIG. 24, a vehicle differential gear device 31 in a third preferred embodiment is characterized in comprising three pieces of pinion gear (a first pinion gear 32a to a third pinion gear 32c) engaging with the side gears 5L, 5R in the differential case 2.

Therefore, as shown in FIG. 24, in the differential case 2 the first pinion gear 32a to the third pinion gear 32c as through holes are disposed at even intervals in a circumferential direction.

The first pinion gear 32a to the third pinion gear 32c are respectively supported in a first pinion gear insertion hole 33a to a third pinion gear insertion hole 33c and the extended portions 14, 15 rotatably.

Advantages of Third Embodiment

According to the third preferred embodiment, the following advantages are achieved in addition to the advantages (1) to (7) of the first preferred embodiment.

(1) The first pinion gear 32a to the third pinion gear 32c engage with the side gears 5L, 5R so that a mechanical strength as a gear mechanism can be increased in comparison with the first preferred embodiment and an automatic center adjustment function at a gear engagement can be achieved.

Fourth Embodiment

Figure 25:
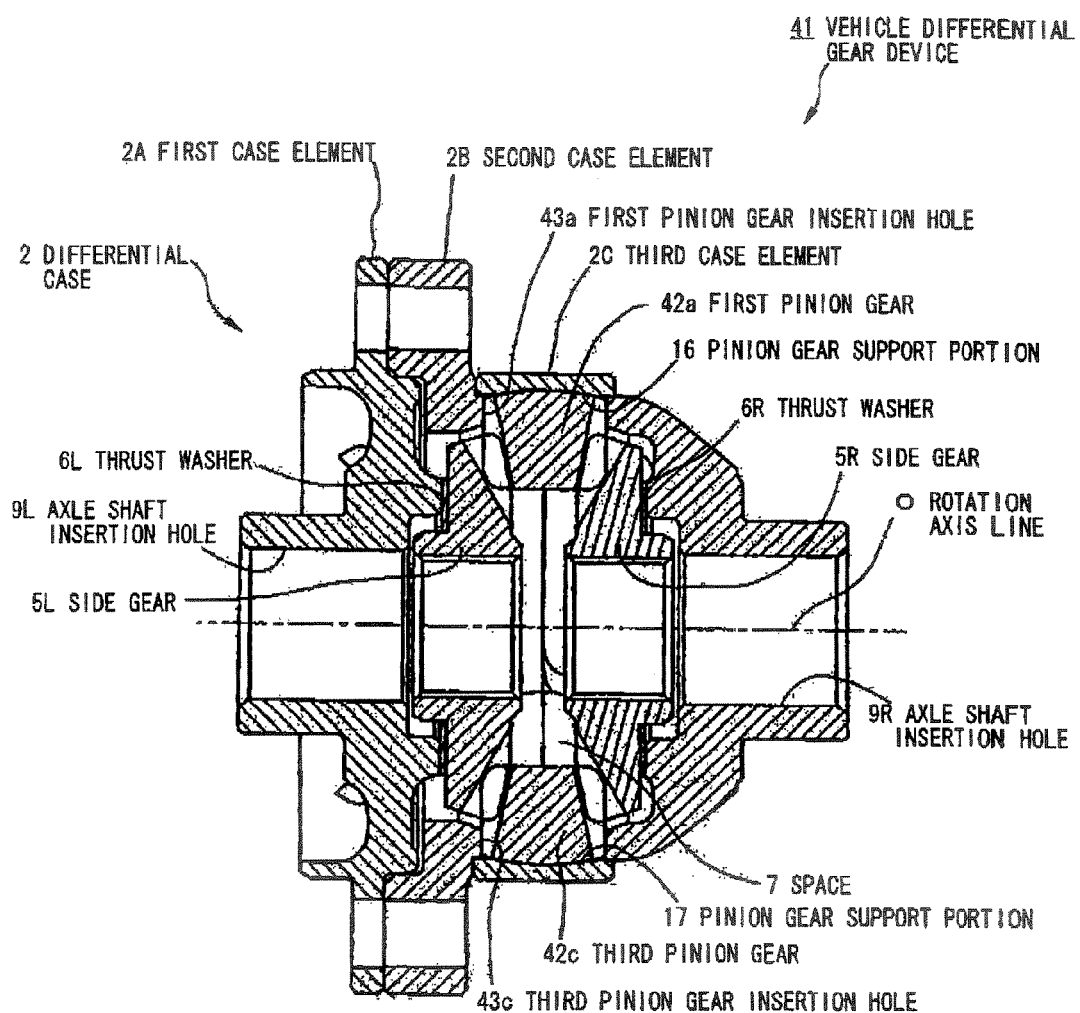
FIG. 25 is a first cross sectional view showing a vehicle differential gear device in a fourth preferred embodiment according to the invention.
Figure 26:
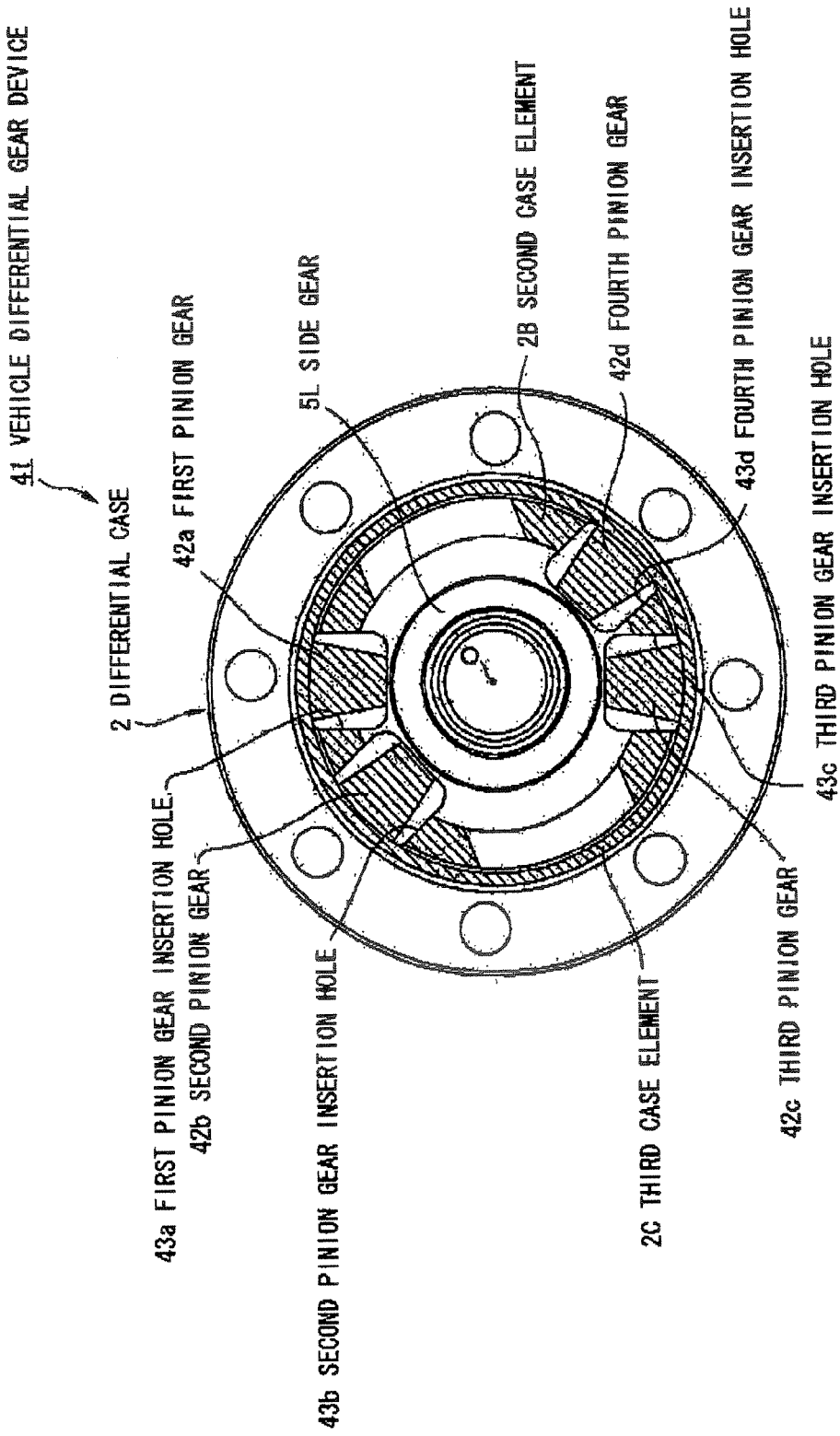
FIG. 26 is a second cross sectional view showing a vehicle differential gear device in a fourth preferred embodiment according to the invention.

FIG. 25 is a first cross sectional view (corresponding to FIG. 3) showing a vehicle differential gear device in a fourth preferred embodiment according to the invention. FIG. 26 is a second cross sectional view (corresponding to FIG. 5) showing a vehicle differential gear device in a fourth preferred embodiment according to the invention. In FIGS. 25 and 26, as to components identical or equivalent to the components used in FIGS. 3 and 5 the same references are used (except for a differential case, a pinion gear, a pinion gear insertion hole and a pinion gear retaining ring), and detail explanation is omitted.

As shown in FIG. 26, a vehicle differential gear device 41 in a fourth preferred embodiment is characterized in comprising four pieces of pinion gear (a first pinion gear 42a to a fourth pinion gear 42d) engaging with the side gears 5L, 5R in the differential case 2.

Therefore, as shown in FIG. 25, the differential case 2 comprises three pieces, those are a first case element 2A comprising an axle shaft insertion hole 9L, a second case element 2B comprising a first pinion gear insertion hole 43a to a fourth pinion gear insertion hole 43d (a second pinion gear insertion hole 43b and a fourth pinion gear insertion hole 43d are shown in FIG. 26), extended portions (not shown), an axle shaft insertion hole 9R, and a space 7, and a third case element 2C (the pinion gear retaining ring 2b) comprising pinion gear support portions 16,17, so as to be capable of housing a first pinion gear 42a to a fourth pinion gear insertion hole 43d and the side gears 5L, 5R.

As shown in FIG. 26, the first pinion gear insertion hole 43a to the fourth pinion gear insertion hole 43d comprise a first pinion gear insertion hole group comprising the first pinion gear insertion hole 43a and the second pinion gear insertion hole 43b which are located close to each other, and a second pinion gear insertion hole group comprising the third pinion gear insertion hole 43c and the fourth pinion gear insertion hole 43d which are located close to each other.

Further, the first pinion gear insertion hole group and the second pinion gear insertion hole group are disposed in regions which are symmetrical with respect to the rotation axis line O of the differential case 2.

As shown in FIG. 26, the first pinion gear 42a to the fourth pinion gear 42d are respectively supported in the first pinion gear insertion hole 43a to the fourth pinion gear insertion hole 43d and the extended portions (not shown) rotatably.

Advantages of Fourth Embodiment

According to the fourth preferred embodiment, the following advantages are achieved in addition to the advantages (1) to (7) of the first preferred embodiment.

In comparison with a device of a four pinion gear-type comprising pinion shafts, the number of components can be reduced and a production cost can be decreased.

Figure 27:
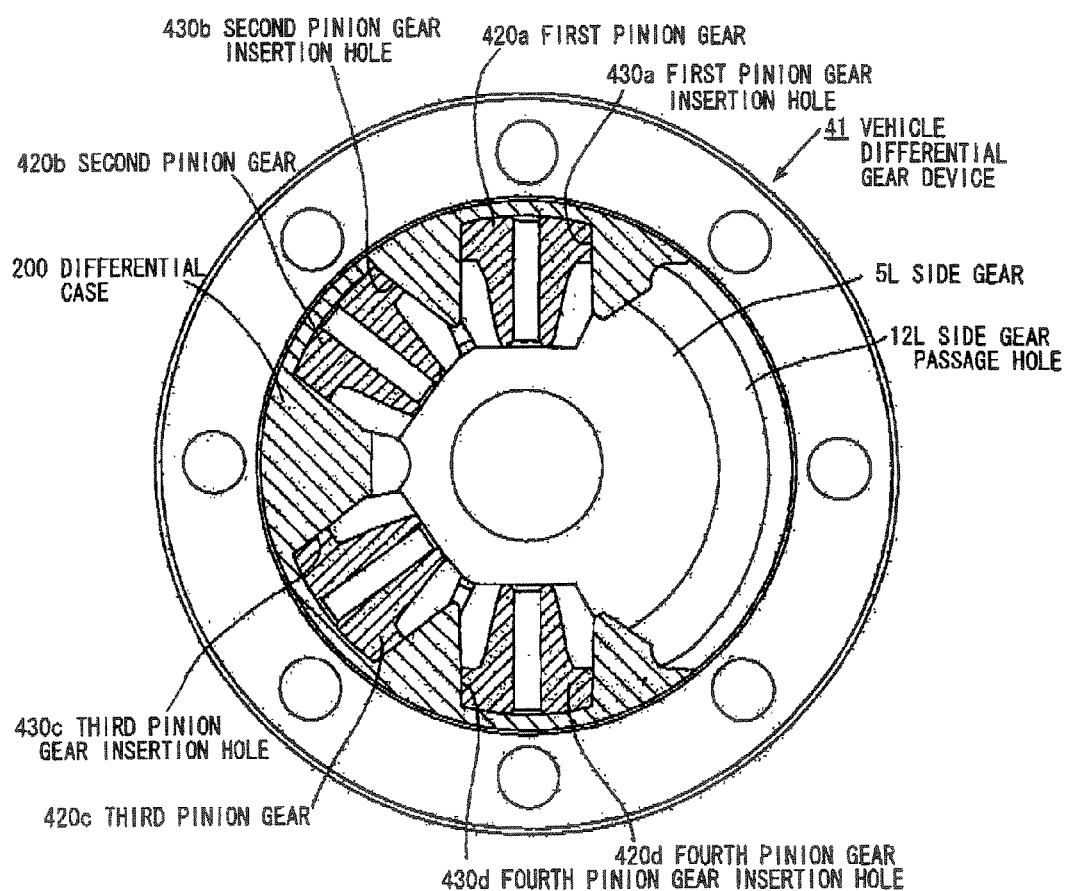
FIG. 27 is a cross sectional view showing the other allocation embodiment of a pinion gear of a vehicle differential gear device in a fourth preferred embodiment according to the invention.

Further, in the embodiment a structure that the first pinion gear insertion hole group (the first pinion gear insertion hole 43a and the second pinion gear insertion hole 43b) and the second pinion gear insertion hole group (the third pinion gear insertion hole 43c and the fourth pinion gear insertion hole 43d) are disposed in regions which are symmetrical with respect to the rotation axis line O of the differential case 2, and the first pinion gear 42a to the fourth pinion gear 42d are respectively supported in the first pinion gear insertion hole 43a to the fourth pinion gear insertion hole 43d has been explained, but the invention is not limited to such a structure, as shown in FIG. 27, a structure that the first pinion gear insertion hole group (the first pinion gear insertion hole 430a and the second pinion gear insertion hole 430b) and the second pinion gear insertion hole group (the third pinion gear insertion hole 430c and the fourth pinion gear insertion hole 430d) are disposed in regions which are unsymmetrical with respect to the rotation axis line O of the differential case 200, and the first pinion gear 420a to the fourth pinion gear 420d are respectively supported in the first pinion gear insertion hole 430a to the fourth pinion gear insertion hole 430d can be adopted. In this case, of regions between the first pinion gear insertion hole group and the second pinion gear insertion hole group in the differential case 200, one region is formed more widely than the other region in a circumferential direction. In the wider region, a side gear passage hole 12L are disposed.

Further, in the invention a structure that the first pinion gear insertion hole to the fourth pinion gear insertion hole juxtaposed at even interval in a circumferential direction are disposed in the differential case 2 and the first pinion gear to the fourth pinion gear are respectively supported in the first pinion gear insertion hole to the fourth pinion gear insertion hole can be also adopted.

Fifth Embodiment

Figure 28:
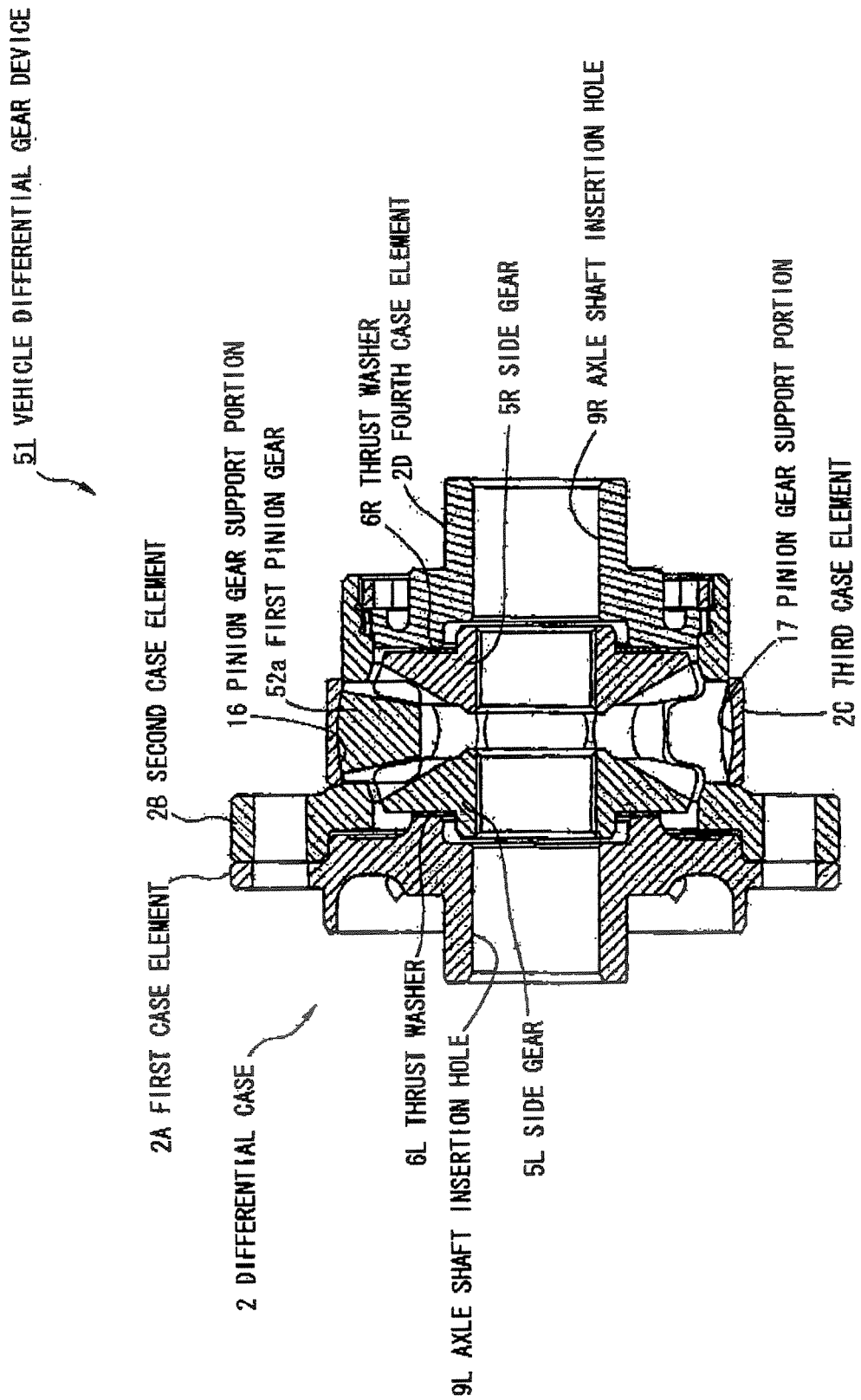
FIG. 28 is a first cross sectional view showing a vehicle differential gear device in a fifth preferred embodiment according to the invention.
Figure 29:
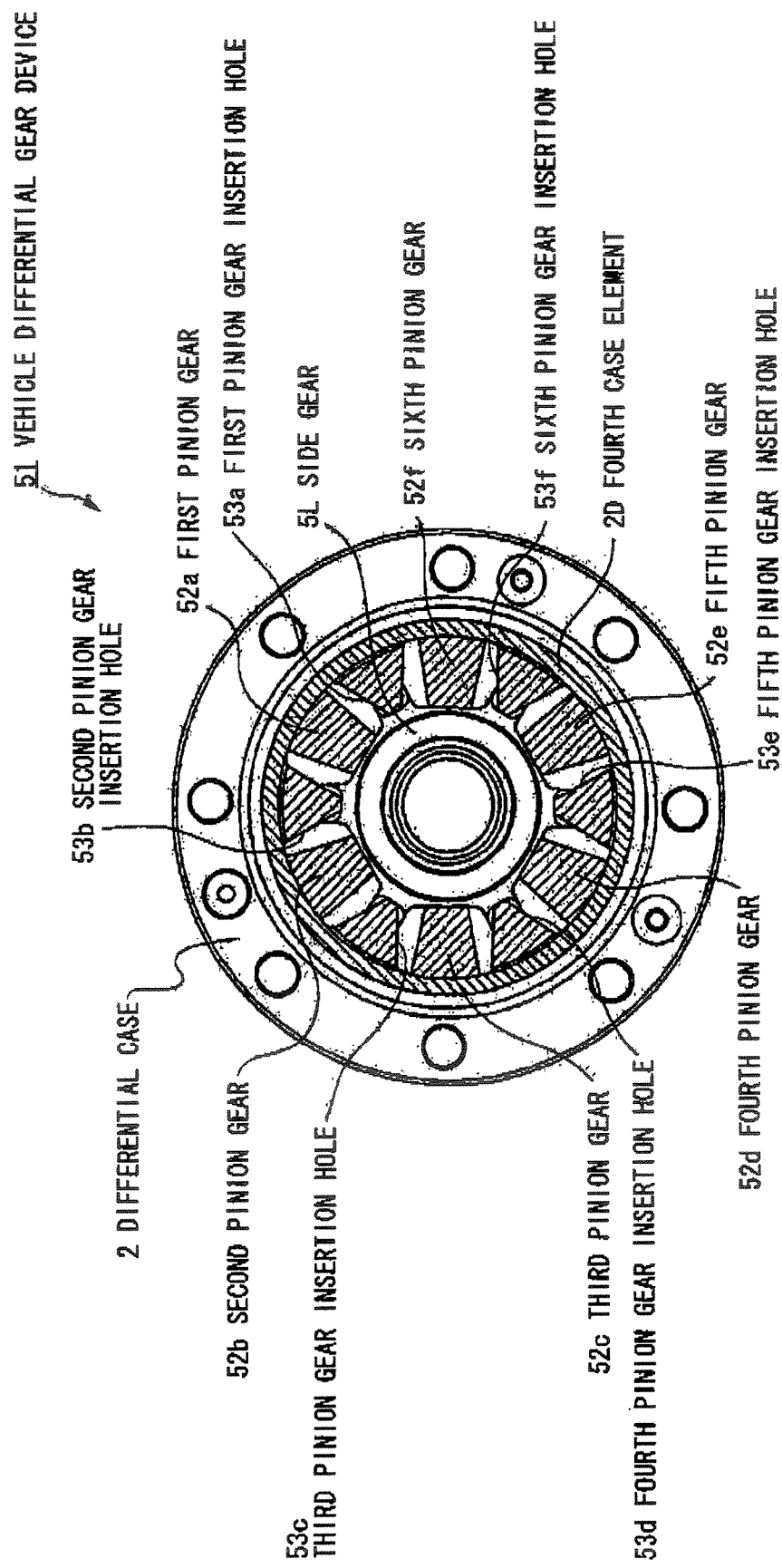
FIG. 29 is a second cross sectional view showing a vehicle differential gear device in a fifth preferred embodiment according to the invention.

FIG. 28 is a first cross sectional view (corresponding to FIG. 3) showing a vehicle differential gear device in a fifth preferred embodiment according to the invention, FIG. 29 is a second cross sectional view (corresponding to FIG. 5) showing a vehicle differential gear device in a fifth preferred embodiment according to the invention. In FIGS. 28 and 29, as to components identical or equivalent to the components used in FIGS. 3 and 5 the same references are used (except for a pinion gear, a pinion gear insertion hole and a pinion gear retaining ring), and detail explanation is omitted.

As shown in FIG. 29, a vehicle differential gear device 51 in a fifth preferred embodiment is characterized in comprising six pieces of pinion gear (a first pinion gear 52a to a sixth pinion gear 52f) engaging with the side gears 5L, 5R in the differential case 2.

Therefore, as shown in FIG. 28, the differential case 2 comprises four pieces, those are a first case element 2A comprising an axle shaft insertion hole 9L, a second case element 2B comprising a first pinion gear insertion hole 53a to a sixth pinion gear insertion hole 53f (shown in FIG. 29) and the extended portions 14, 15, a third case element 2C (the pinion gear retaining ring 2b) comprising the pinion gear support portions 16, 17, and a fourth case element 2D comprising an axle shaft insertion hole 9R, so as to be capable of housing a first pinion gear 52a to a sixth pinion gear 52f and the side gears 5L, 5R.

As shown in FIG. 29, the first pinion gear insertion hole 53a to the sixth pinion gear insertion hole 53f are disposed in the differential case 2 (the second case element 2B) at even intervals in a circumferential direction.

As shown in FIG. 29, the first pinion gear 52a to the sixth pinion gear 52f are respectively supported in the first pinion gear insertion hole 53a to the sixth pinion gear insertion hole 53f and the extended portions (not shown) rotatably.

Advantages of Fifth Embodiment

According to the fifth preferred embodiment, the following advantages are achieved in addition to the advantages (1) to (7) of the first preferred embodiment.

In comparison with a device of a six pinion gear-type comprising pinion shafts, the number of components can be reduced and a production cost can be decreased.

Figure 30:
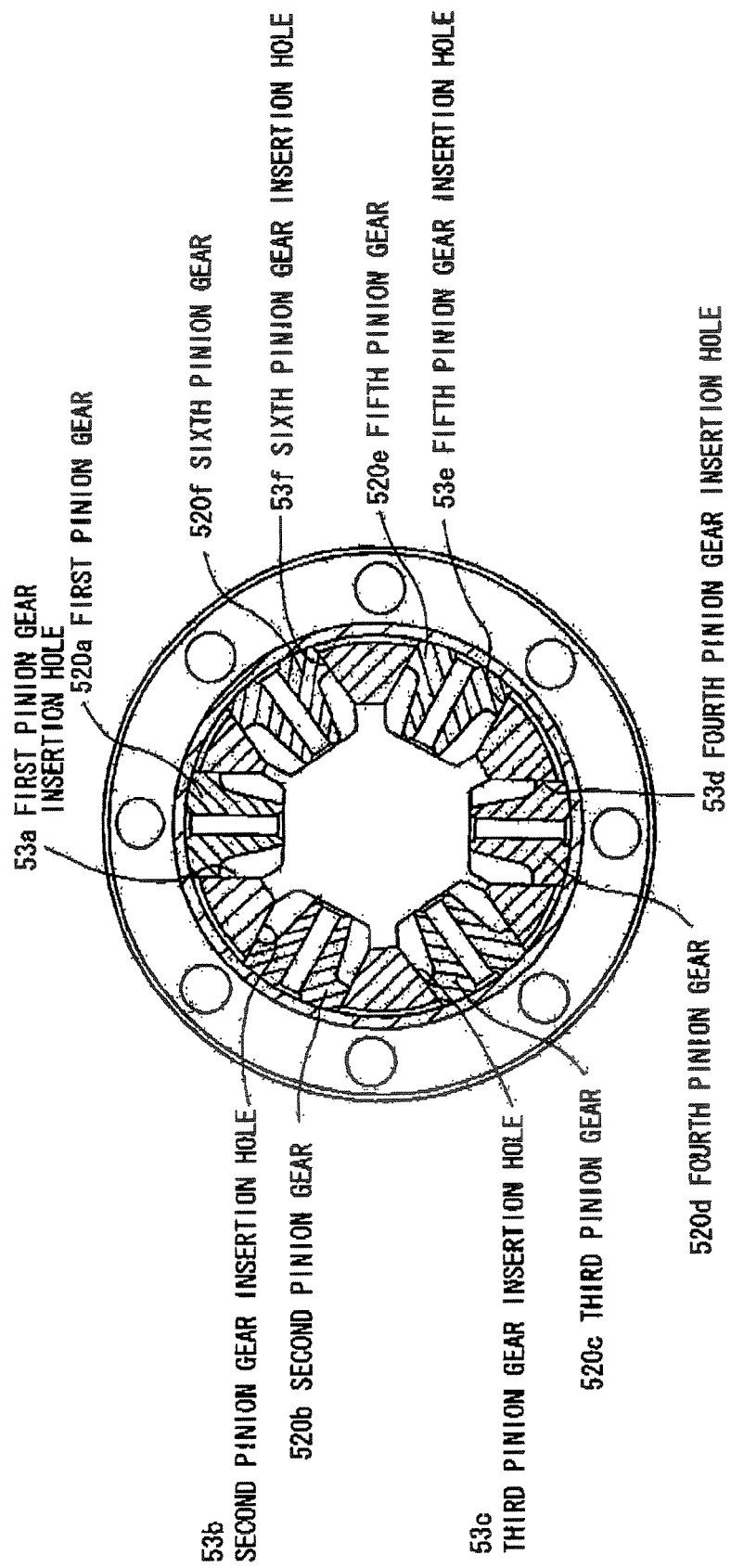
FIG. 30 is a cross sectional view showing a modified embodiment of a pinion gear of a vehicle differential gear device in a fifth preferred embodiment according to the invention.
Figure 31:
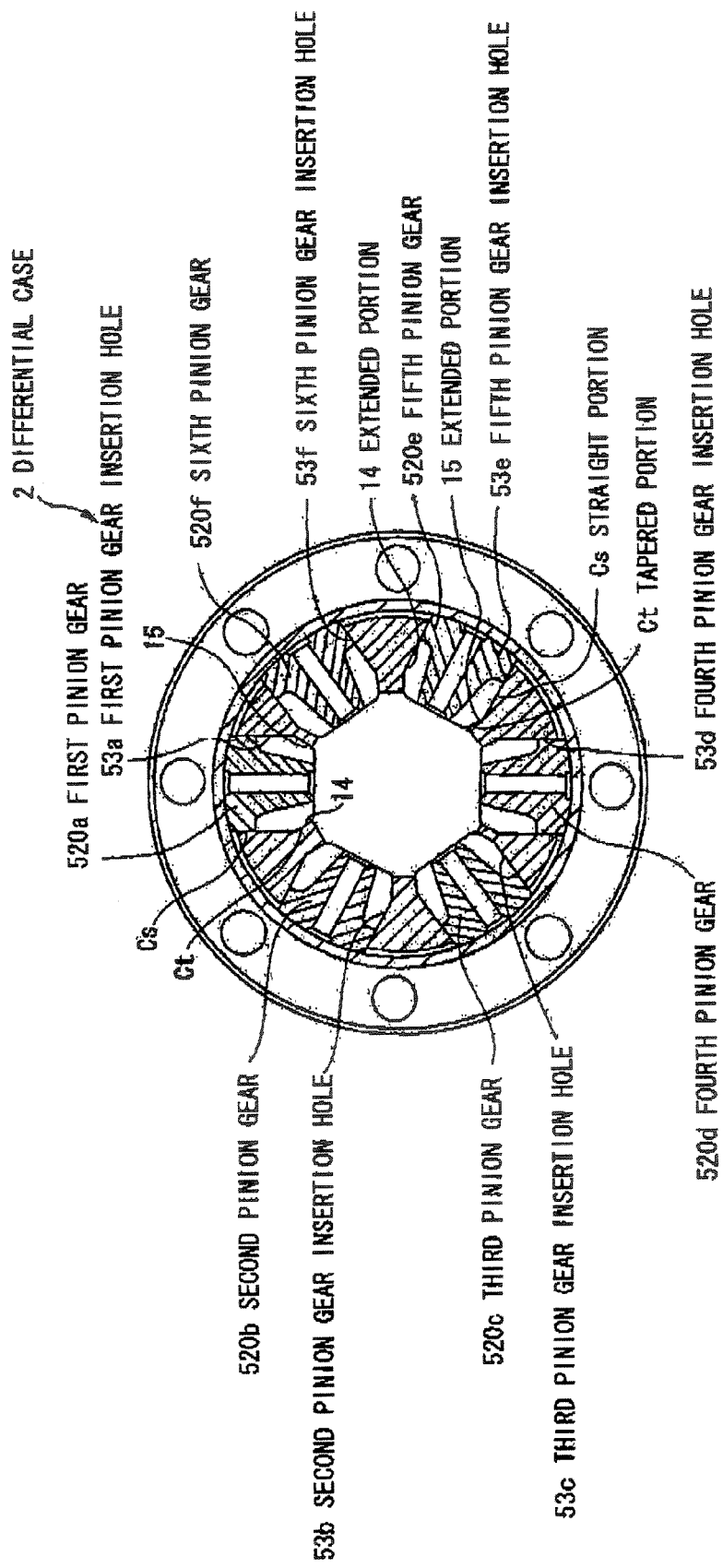
FIG. 31 is a cross sectional view showing the other supporting embodiment of a pinion gear of a vehicle differential gear device in a fifth preferred embodiment according to the invention.

Further, in the embodiment a structure that the pinion gears without through holes are used as the first pinion gear 52a to the sixth pinion gear 52f, as shown in FIG. 30, but the first pinion gear 520a to the sixth pinion gear 520f which comprise through holes can be used. In this case, as shown in FIG. 31, a structure that a tapered portion Ct (a part) and a straight portion Cs of the first pinion gear 520a to the sixth pinion gear 520f are respectively supported in the first pinion gear insertion hole 53a to the sixth pinion gear insertion hole 53f and the extended portions 14, 15 rotatably can be adopted. Therefore, an area of the supported surface of the first pinion gear 520a to the sixth pinion gear 520f to the first pinion gear insertion hole 53a to the sixth pinion gear insertion hole 53f and the extended portions 14, 15 is enlarged, so that a surface pressure which the first pinion gear 520a to the sixth pinion gear 520f are applied from the first pinion gear insertion hole 53a to the sixth pinion gear insertion hole 53f and the extended portions 14, 15 can be dispersed and a seize resistance against a baking of the first pinion gear 520a to the sixth pinion gear 520f can be enhanced. Further, a tapered portion Ct (a part) and a straight portion Cs of the first pinion gear 520a to the sixth pinion gear 520f are respectively supported in the first pinion gear insertion hole 53a to the sixth pinion gear insertion hole 53f and the extended portions 14, 15, so that the first pinion gear 520a to the sixth pinion gear 520f can be prevented from inclining and falling down and a good engagement between the first pinion gear 520a to the sixth pinion gear 520f and the side gears 5L, 5R can be achieved side gear 5L.

Figure 32:
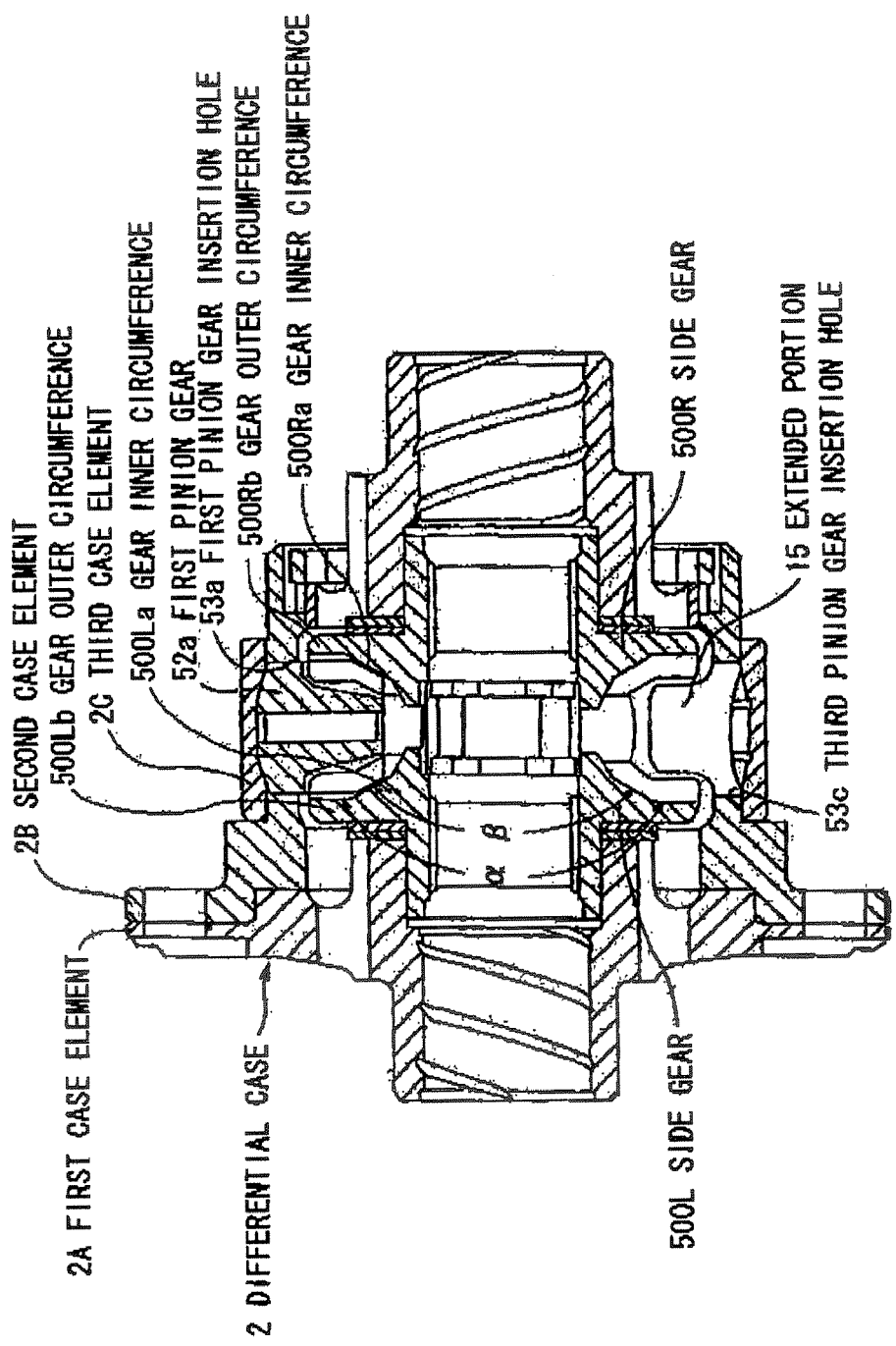
FIG. 32 is a cross sectional view showing a modified embodiment of a side gear of a vehicle differential gear device in a fifth preferred embodiment according to the invention.
Figure 33:
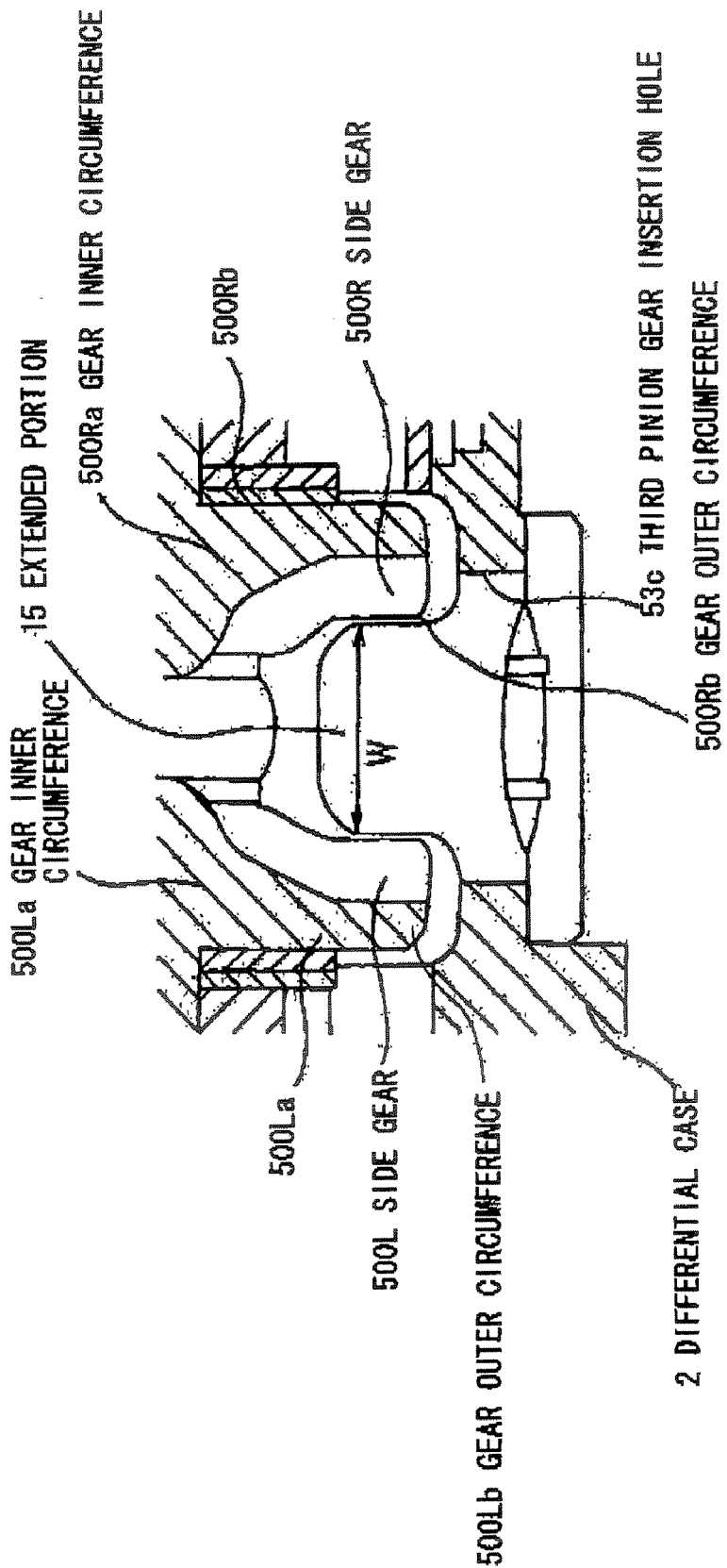
FIG. 33 is a cross sectional view showing a substantial part of FIG. 32 in a partially enlarged condition.

Further, in the embodiment a case that the side gears 5L, 5R comprising a single face cone angle are used has been explained, but the invention is not limited to such a case, as shown in FIG. 32, a case that side gears 500L, 500R comprising gear inner circumferences 500La, 500Ra and gear outer circumferences 500Lb, 500Rb which comprise a different face cone angle mutually can be adopted. In this case a face cone angle α of the gear outer circumferences 500Lb, 500Rb is determined to a larger value than a face cone angle β of the gear inner circumferences 500La, 500Ra. And, as shown in FIG. 33, a region extending to a side of the rotation axis line of the differential case 2, of pinion gear support surfaces of the extended portions 14, 15 (only the extended portions 15 is shown) comprises an extended portion comprising a shape (a width size W) adapted to the gear outer circumferences 500L*b*, 500R*b* of the side gears 500L, 500R. Therefore, a whole area of the pinion gear support surface of the extended portions 14, 15 can be enlarged, and following this, an area of the supported surface of the first pinion gear 52*a* to the sixth pinion gear 52*f* to the first pinion gear insertion hole 53*a* to the sixth pinion gear insertion hole 53*f* and the extended portions 14, 15 is enlarged, so that a surface pressure which the first pinion gear 52*a* to the sixth pinion gear 52*f* (only the first pinion gear 52*a* and the third pinion gear 52*c* are shown) are applied from the first pinion gear insertion hole 53*a* to the sixth pinion gear insertion hole 53*f* (only the first pinion gear insertion hole 53*a* and the third pinion gear insertion hole 53*c* are shown) and the extended portions 14, 15 can be dispersed and a seize resistance against a baking of the first pinion gear 52*a* to the sixth pinion gear 52*f* can be enhanced.

Sixth Embodiment

Figure 34:
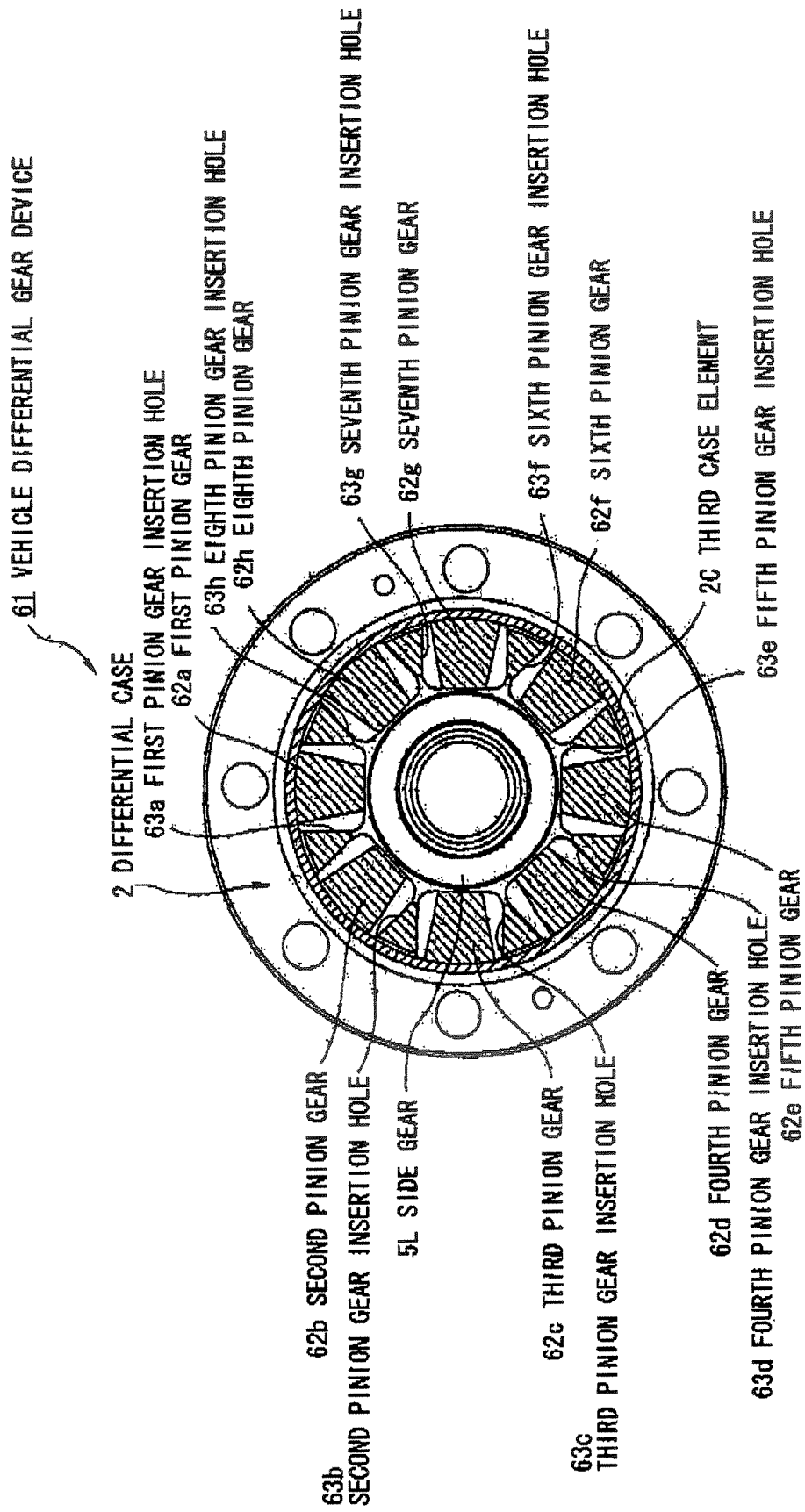
FIG. 34 is a cross sectional view showing a vehicle differential gear device in a sixth preferred embodiment according to the invention.

FIG. 34 is a cross sectional view (corresponding to FIG. 5) showing a vehicle differential gear device in a sixth preferred embodiment according to the invention. In FIG. 34, as to components identical or equivalent to the components used in FIG. 5 the same references are used (except for a pinion gear and a pinion gear insertion hole), and detail explanation is omitted.

As shown in FIG. 34, a vehicle differential gear device 61 in a sixth preferred embodiment is characterized in comprising eight pieces of pinion gear (a first pinion gear 62*a* to an eighth pinion gear 62*h*) engaging with the side gears 5L, 5R (only the side gear 5L is shown) in the differential case 2.

Therefore, as shown in FIG. 34, in the differential case 2 a first pinion gear insertion hole 63*a* to an eighth pinion gear insertion hole 63*h* are disposed at even intervals in a circumferential direction.

The first pinion gear 62*a* to the eighth pinion gear 62*h* are respectively supported in the first pinion gear insertion hole 63*a* to the eighth pinion gear insertion hole 63*h* and the extended portions (not shown) rotatably.

Advantages of Sixth Embodiment

According to the sixth preferred embodiment, same advantages as the advantages (1) to (7) of the first preferred embodiment are achieved.

For example, the following modifications and alternative constructions can be adopted.

Figure 35:
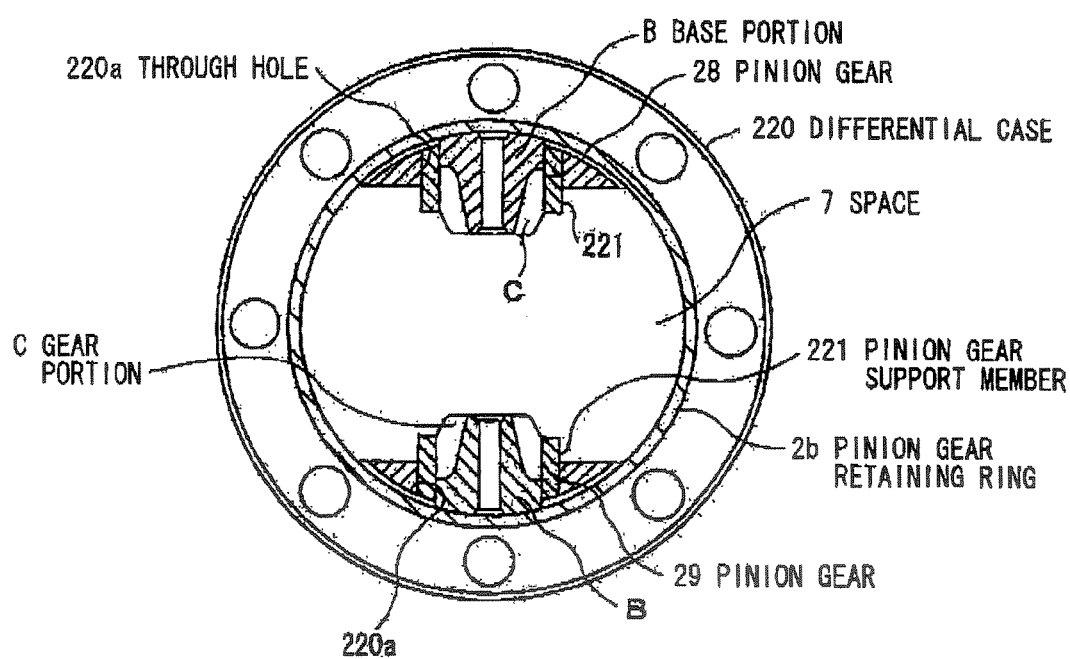
FIG. 35 is a cross sectional view showing the other supporting embodiment of a pinion gear of a vehicle differential gear device in a sixth preferred embodiment according to the invention.
Figure 36A:
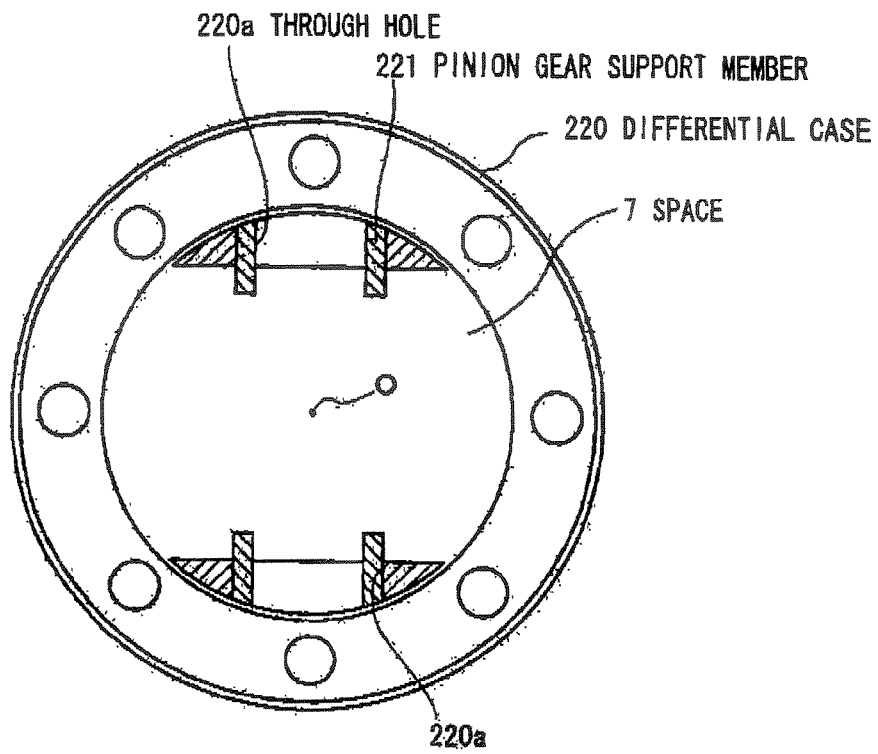
FIG. 36A is a cross sectional view showing an assembling procedure of a pinion gear shown in FIG. 35.
Figure 36B:
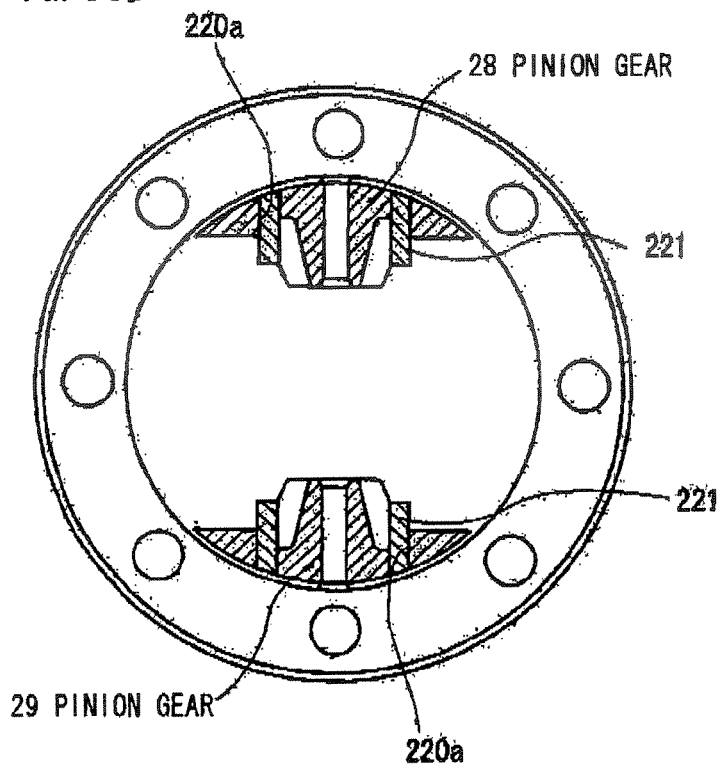
FIG. 36B is a cross sectional view showing an assembling procedure of a pinion gear shown in FIG. 35.

(1) In each preferred embodiment (a structure comprising the pinion gear retaining ring 2*b*), a case that the pinion gears 28, 29 etc. are supported in the differential case 220 (each support surface of the pinion gear insertion holes and the extended portions) has been explained, but the invention is not limited to such a case, as shown in FIG. 35, a case that a pinion gear support member 221 of a bottomless cylindrical shape is sandwiched between the pinion gears 28, 29 and the differential case 220 (gear mounting holes) can be adopted. In this case through holes 220*a* for mounting the pinion gear support member 221 are formed in the differential case 220. An inner diameter of the through hole 220*a* is determined to an approx. identical size to an outer diameter of the pinion gear support member 221. An inner diameter of the pinion gear support member 221 is determined to an approx. identical size to an outer diameter of the pinion gears 28, 29. An inner surface of the pinion gear support member 221 comprises at least a part of the gear portion C (an engagement portion with side gear) of the pinion gears 28, 29 and a gear support surface supporting the base portion B. Therefore, the space of the differential case 220 can be determined to a large size relatively and it is not required to form expanded portions 8L, 8R (refer to FIG. 8) in the differential case 220, so that a degree of freedom on a design of the differential case can be enhanced. Further, an enhancement of a mechanical strength as an expected purpose is achieved by applying a surface treatment to only the pinion gear support member 221, so that a production cost can be decreased. In the modification described above, as shown in FIG. 36A, a method of assembling the pinion gear support member 221 and the pinion gears 28, 29 comprises steps of mounting the pinion gear support member 221 in through holes 220*a* of the differential case 220 mounted the side gears (not shown), while a part the pinion gear support member 221 is extended to a side of the rotation axis line O, and then as shown in FIG., inserting the pinion gears 28, 29 into the pinion gear support member 221 in a direction shown in FIG. 36B by arrowed lines.

Figure 37:
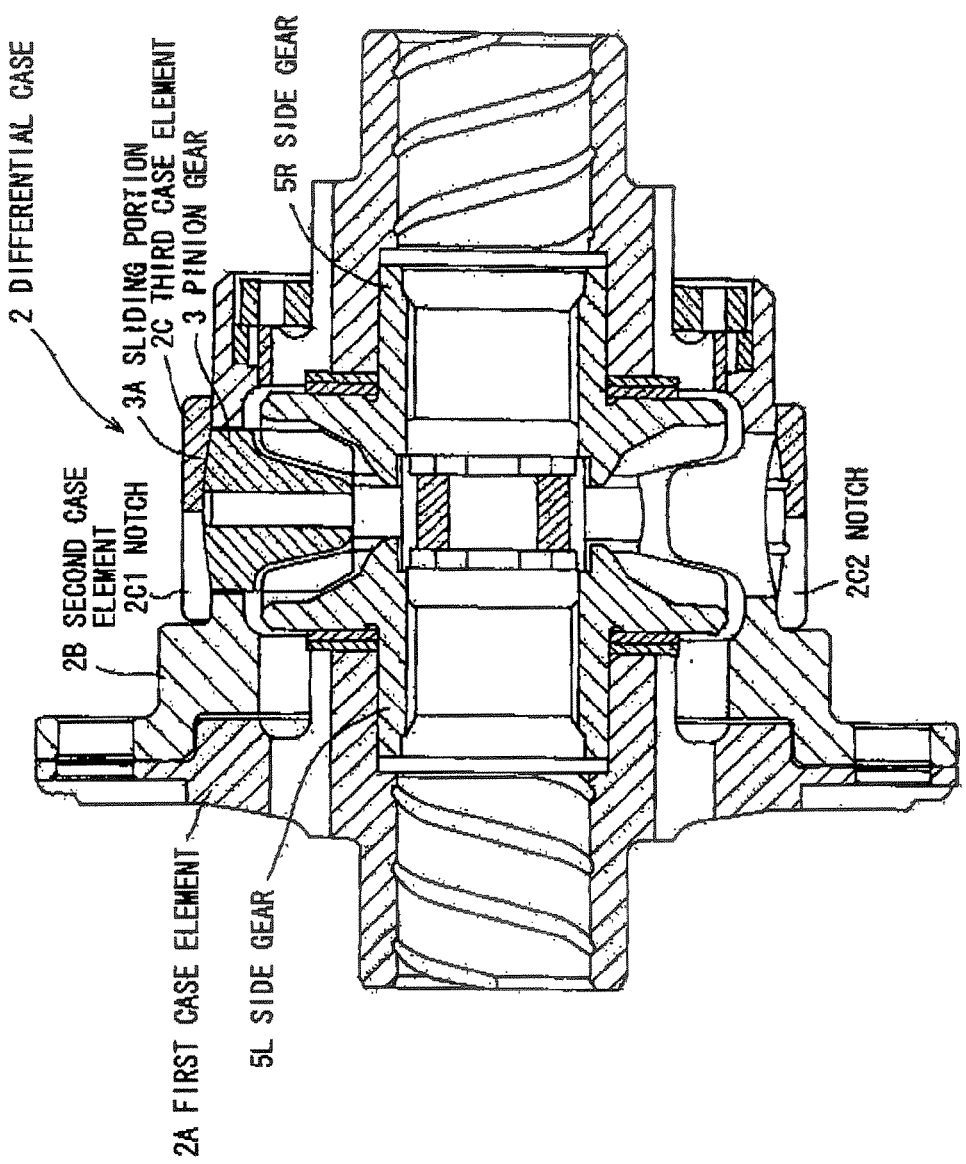
FIG. 37 is a cross sectional view showing a modified embodiment of a pinion gear retaining ring of a vehicle differential gear device in a sixth preferred embodiment according to the invention.

(2) In each preferred embodiment (a structure comprising the pinion gear retaining ring 2*b*), a case that the pinion gear retaining ring 2*b* is heat-expanded and mounted in the case body 2*a* has been explained, but the invention is not limited to such a case, as shown in FIG. 37, a case that the third case element 2C (the pinion gear retaining ring 2*b*) comprising notches 2C1, 2C2 allowing a part of the sliding portions 3A, 4A of the pinion gears 3, 4 to escape can be adopted, In this case a heating process can be omitted at mounting the pinion gear retaining ring 2*b* so that a production cost can be decreased. Further, five or seven pieces of the pinion gear other than the above can also be adopted. Furthermore, a case that a cylindrical diameter is determined to a smaller size and nine or more pieces of the pinion gear is used can be adopted.

Seventh Embodiment

Figure 38:
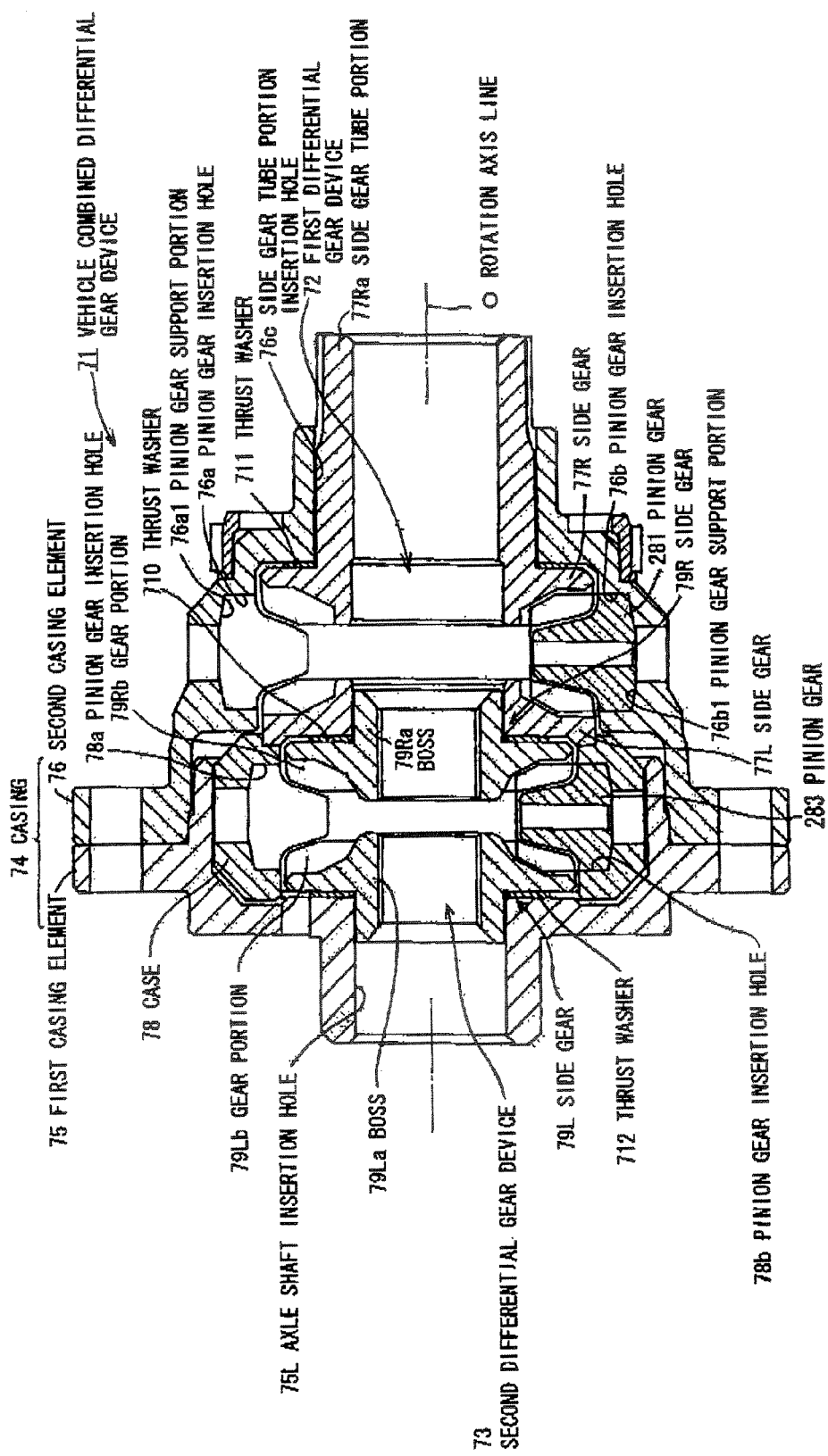
FIG. 38 is a cross sectional view showing a vehicle combined differential gear device in a seventh preferred embodiment according to the invention.

FIG. 38 is a cross sectional view showing a vehicle combined differential gear device in a seventh preferred embodiment according to the invention. In FIG. 38, as to components identical or equivalent to the components used in FIGS. 1 to 37 the same references are used, and detail explanation is omitted.

As shown in FIG. 38, a vehicle combined differential gear device 71 in a seventh preferred embodiment is characterized in comprising a bevel gear-system differential gear device (a vehicle differential gear device comprising a shaftless-type pinion gear) is adopted as a first differential gear device 72 and a second differential gear device 73 and the first differential gear device 72 and the second differential gear device 73 are juxtaposed along an axis line O of a casing 74.

Therefore, the casing 74 comprises a first casing element 75 comprising a axle shaft insertion hole 75L, and a second casing element 76 comprising pinion gear insertion holes 76*a*, 76*b* and a side gear tube portion insertion hole 76*c*, so as to house the first differential gear device 72 and the second differential gear device 73.

The pinion gear insertion holes 76*a*, 76*b* comprise through holes of a step shape comprising openings of a plane round shape. On an inner opening circumferential edge of the pinion gear insertion holes 76*a*, 76*b* pinion gear support portions (top portion) 76*a*1, 76*b*1 supporting the pinion gears 280, 281 (to be hereinafter described) stressed by a centrifugal force and comprising a spherical surface formed to a predetermined curvature are formed.

The first differential gear device 72 comprises two pieces of pinion gears 280, 281 (only the pinion gear 280 is shown) juxtaposed mutually along an axis line direction perpendicular to a rotation axis line O of the casing 74, and left and right side gears 77L, 77R engaging with the pinion gears 280, 281, so as to function as a center differential gear device.

The pinion gears 290, 281 function as a first input member and is supported in the pinion gear insertion holes 76a, 76b and the extended portions (not shown) rotatably. And, when a rotation driving force of any one of wheels in a vehicle (a four wheels vehicle) is decreased, the pinion gears 280, 281 receive the rotation driving force in an engine side, the force defined by multiplying a torque bias proportion of the side gears 77L, 77R by a torque bias proportion of the side gears 79L, 79R from the casing 74 so as to input to the side gears 77L, 77R.

The side gears 77L, 77R comprise an annular bevel gear engaging with the pinion gears 280, 281 and are supported in the second casing element 76 rotatably. And, the side gear 77R functions as a first output member and the side gear 77L functions as a second output member respectively. On a back surface of the side gear 77L, a case 78 comprising pinion gear insertion hole 78a, 78b is mounted. A thrust washer 710 is sandwiched between the back surface of the side gear 77L and a back surface of a side gear 79R (to be hereinafter described). On the back surface of the side gear 77R, a side gear tube portion 77Ra for inserting the axle shaft inserting to a side gear tube portion insertion hole 76c rotatably is mounted so as to be integrated with the side gear 77R. A thrust washer 711 is sandwiched between the back surface of the side gear 77R and an inner opening circumferential edge of the side gear tube portion insertion hole 76c. To the side gear tube portion 77Ra, a rear axle shaft is joined through a propeller shaft (not shown).

The second differential gear device 73 comprises two pieces of pinion gears 282, 283 (only the pinion gear 283 is shown) juxtaposed mutually along an axis line direction perpendicular to a rotation axis line O of the casing 74, and left and right side gears 79L, 79R engaging with the pinion gears 282, 283, so as to function as a front differential gear device.

The pinion gears 282, 283 function as a second input member and are supported in the pinion gear insertion holes 78a, 78b and the extended portions (not shown) rotatably. And, when a rotation driving force of any one of wheels in a vehicle (a four wheels vehicle) is decreased, the pinion gears 280, 281 receive the rotation driving force in an engine side, the force defined by a torque bias proportion of the side gears 79L, 79R from the first differential gear device 72 (a casing 78) so as to input to the side gears 79L, 79R.

The side gears 77L, 77R comprise bosses 79La, 79Ra comprising a different outer diameter mutually and an approx. annular bevel gear comprising gear portions 79Lb, 79Rb, engage with the pinion gears 282, 283, and are supported in the casing 74 rotatably, while the bosses 79La, 79Ra are respectively inserted to the axle shaft insertion holes 75L, 75R partially. To the side gears 77L, 77R, left and right front axle shafts (not shown) are joined by a spline fitting respectively. And, the side gear 79L functions as a third output member and the side gear 79R functions as a fourth output member respectively. A thrust washer 712 is sandwiched between the back surface of the side gear 79L and an inner opening circumferential edge of the axle shaft insertion holes 75L.

Operation of the Combined Differential Gear Device

First, when a torque from an engine side of a vehicle is inputted to the casing 74 through a drive pinion and a ring gear, the casing 74 is rotated around the rotation axis line O.

Next, when the casing 74 is rotated, the rotation force is transmitted to the pinion gears 280, 281, and subsequently is transmitted from the pinion gears 280, 281 to the side gears 77L, 77R. Therefore, the side gears 77L, 77R are rotated the rotation force of the side gear 77L, 77R is transmitted to the pinion gears 282, 283 through a case 78. And, the pinion gears 282, 283 are rotated the rotation force is transmitted to the side gears 79L, 79R, In this case, to the side gear 77R (a side gear tube portion 77Ra), a rear axle shaft is joined by a spline fitting and to the side gears 79L, 79R, the left and right front axle shafts are joined by a spline fitting respectively, so that the torque from the engine side of the vehicle can be transmitted to the rear axle shaft through the drive pinion, the ring gear, the casing 74, and the first differential gear device 72 (the pinion gears 280, 281 and the side gear 77R), and the torque can be transmitted to the left and right front axle shafts through the casing 74, the first differential gear device 72 (the pinion gears 281, 282 and the side gears 77L, 77R), the case 78, and the second differential gear device 73 (the pinion gears 282, 283 and the side gears 79L, 79R).

In a case that an even load is applied to each wheel of front and rear sides on the left and right axle shafts, when the torque from the engine side of the vehicle is inputted to the casing 74, the pinion gears 280, 281 orbit on the side gears 77L, 77R, and the pinion gears 282, 283 also orbit on the side gears 79L, 79R, the pinion gears 280 to 283 and the side gears 77L, 77R 79L, 79R are rotated together with the casing 74 in an integrated condition so that the torque from the engine side of the vehicle is evenly transmitted to the left and right axle shafts of front and rear sides and the left and right wheels of front and rear sides are rotated at even revolutions.

On the other hand, in cases that for example the vehicle turns to the left during a drive, or the right wheel of front side falls in a mud, the pinion gears 280, 281 rotate on the side gears 77L, 77R, and the rotation driving force from the engine side of the vehicle is differentially distributed between the second differential gear device 73 and the rear axle shaft through the first differential gear device 72.

Further, in the second differential gear device 73 when the pinion gears 282, 283 rotate on the side gears 79L, 79R, and the rotation driving force is differentially distributed between the left and right wheels of the front axle shaft. Therefore, the left wheel of front side and the rear axle shaft (left and right wheels) are rotated at a lower revolving speed than a revolving speed of the casing 74 and the right wheel of front side is rotated at a higher revolving speed than the revolving speed of the casing 74.

In this case, the pinion gears 280, 281 of the first differential gear device 72 input the rotation driving force from an engine side, the force defined by multiplying a torque bias proportion of the side gears 77L, 77R by a torque bias proportion of the side gears 79L, 79R, to the side gears 77L, 77R, and the pinion gears 282, 283 of the second differential gear device 73 input the rotation driving force from the side gears 77R, the force defined by a torque bias proportion of the side gears 79L, 79R, to the side gears 79L, 79R.

Figure 39:
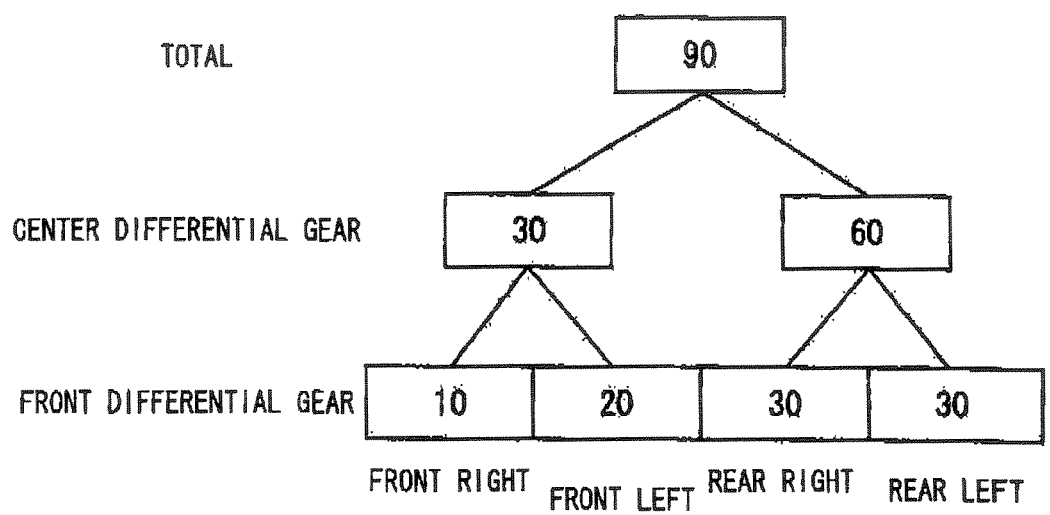
FIG. 39 is a schematic diagram showing a multiplication effect of a torque bias proportion.

Therefore, a large rotation driving force can be moved from a high speed (a low load) side to a low speed (a high load) side at a differential rotation by a multiplication effect of the torque bias proportion, so that the rotation driving force as a whole can be increased. As an example case, a case that the torque bias proportion a of the side gears 77L, 77R and the torque bias proportion b of the side gears 79L, 79R are together determined to 2 (a, b=2), and a torque $T_1$ of the right wheel of front side is decreased to 10 ($T_1$=10) will be explained. In this case, as shown in FIG. 39, a torque $T_2$ of the left wheel of front side becomes 20 ($T_2=T_1 \times b=20$), so that a torque $T_3$ inputted to the second differential gear device 73 becomes 30 ($T_3=T_1+T_2=30$), and a torque $T_4$ inputted to the first differential gear device 72 becomes 60 ($T_4=T_3 \times a=60$). Therefore, a torque $T_5$ from an engine side becomes 90 ($T_5=T_3+T_4=90$) so that the torque from an engine side can be increased.

Advantages of Seventh Embodiment

According to the seventh preferred embodiment, the following advantages are achieved in addition to the advantages (1) to (7) of the first preferred embodiment.

(1) the pinion gears 280, 281 of the first differential gear device 72 input the rotation driving force from an engine side, the force defined by multiplying a torque bias proportion of the side gears 77L, 77R by a torque bias proportion of the side gears 79L, 79R, to the side gears 77L, 77R, and the pinion gears 282, 283 of the second differential gear device 73 input the rotation driving force from the side gears 77R, the force defined by a torque bias proportion of the side gears 79L, 79R, to the side gears 79L, 79R, so that a large rotation driving force can be moved from a high speed (a low load) side to a low speed (a high load) side at a differential rotation by a multiplication effect of the torque bias proportion, so that the rotation driving force as a whole can be increased.

(2) The first differential gear device 72 and the second differential gear device 73 comprise a torque bias function, so that it is not required to add to a differential restriction device separately and the rotation driving force as a whole can be increased.

For example, the following modifications and alternative constructions can be adopted.

Figure 40:
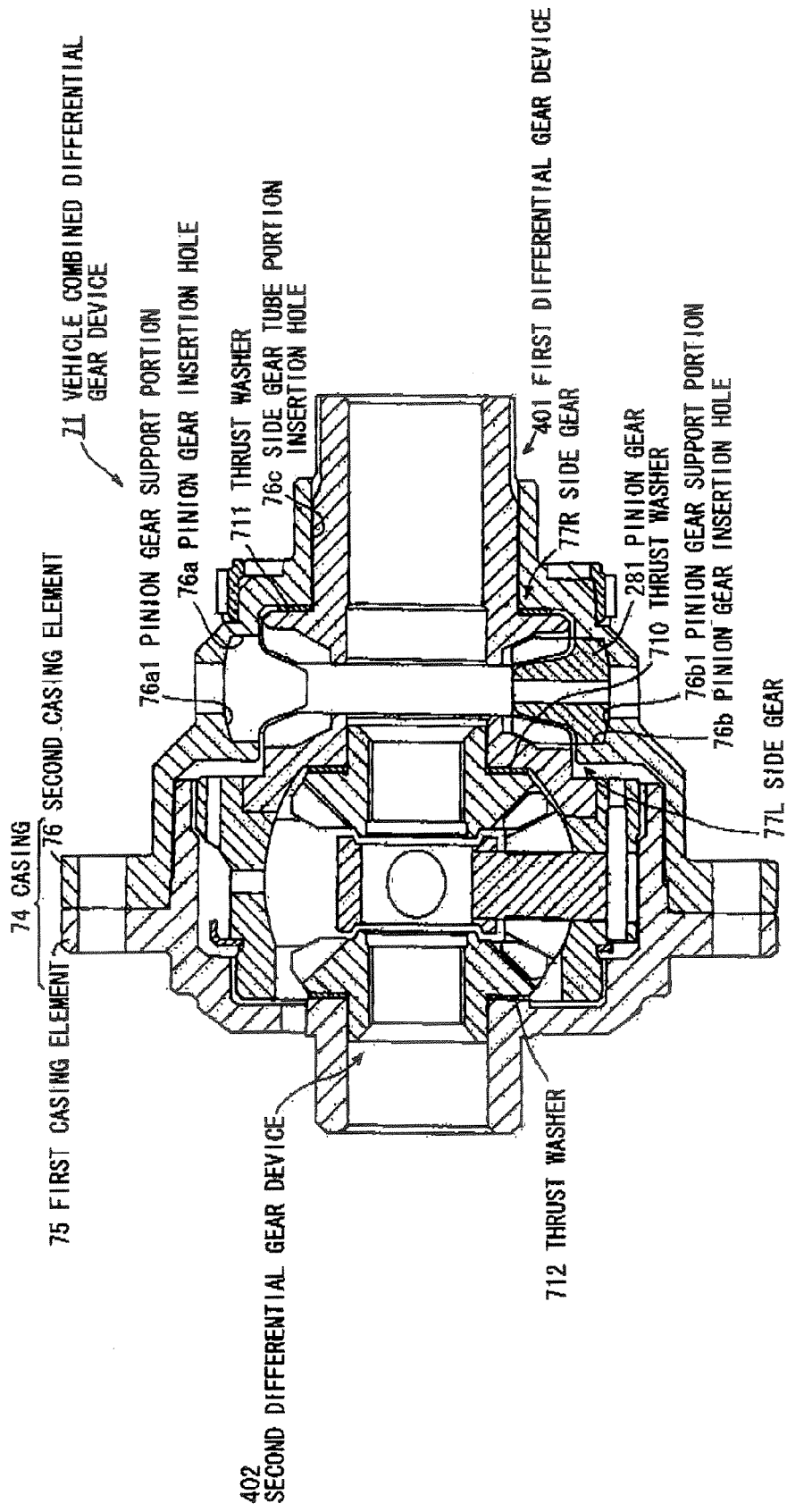
FIG. 40 is a cross sectional view showing a modified embodiment (1) of a vehicle combined differential gear device in a seventh preferred embodiment according to the invention.
Figure 41:
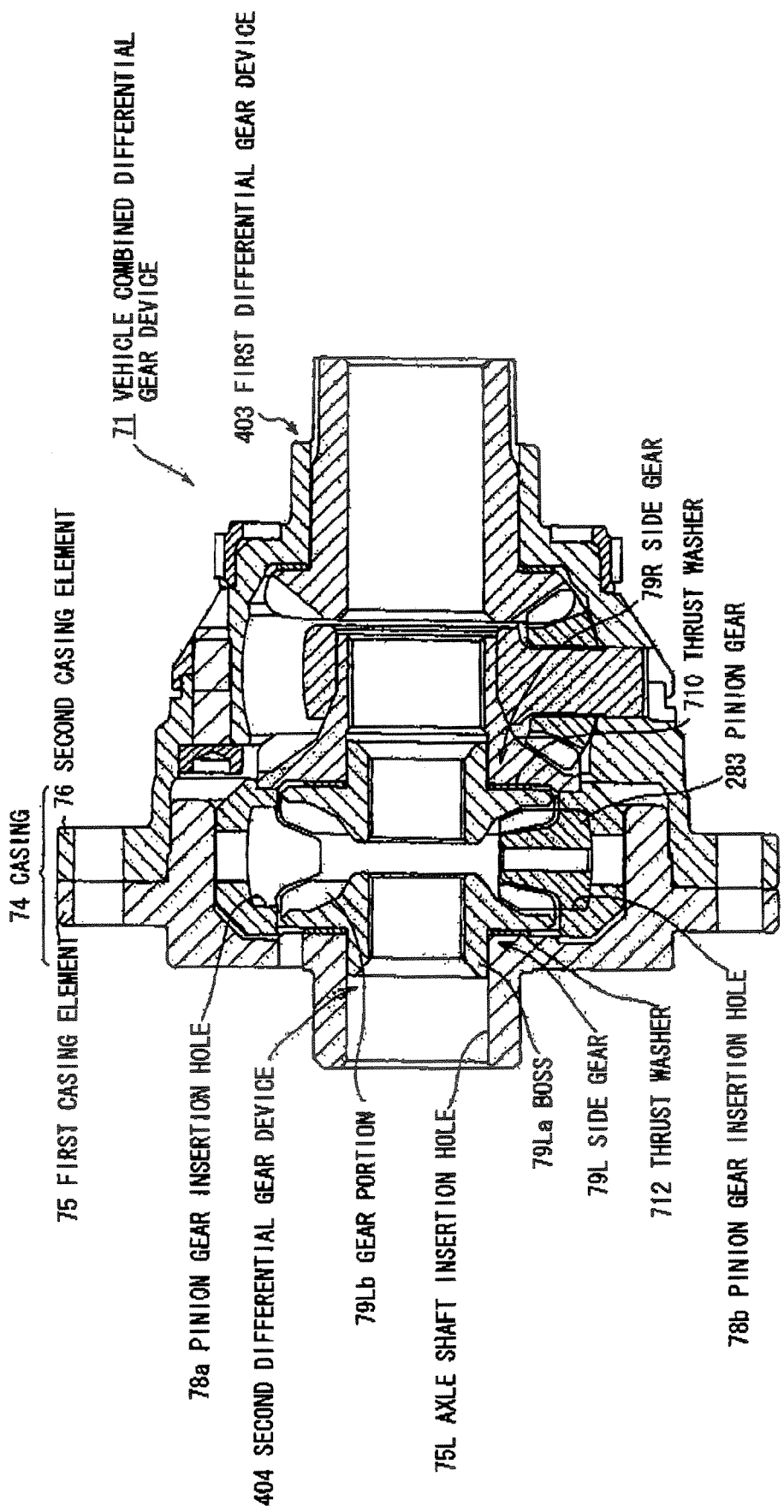
FIG. 41 is a cross sectional view showing a modified embodiment (2) of a vehicle combined differential gear device in a seventh preferred embodiment according to the invention.

(1) In the preferred embodiment, a case that a bevel gear-system differential gear device (a vehicle differential gear device comprising a shaftless-type pinion gear) is adopted respectively as the first differential gear device 72 and the second differential gear device 73 is explained, but the invention is not limited to the case, as shown in FIG. 40, a case that a vehicle differential gear device comprising a shaftless-type pinion gear is adopted as a first differential gear device 401 and the other bevel gear-system differential gear device is adopted as a second differential gear device 402 can be adopted.

(2) In the preferred embodiment, a case that the first differential gear device 72 functions as a center differential gear device and the second differential gear device 73 functions as a front differential gear device is explained, but the invention is not limited to the case, a case that the first differential gear device 72 functions as a center differential gear device and the second differential gear device 73 functions as a rear differential gear device can be adopted.

Eighth Embodiment

Figure 42:
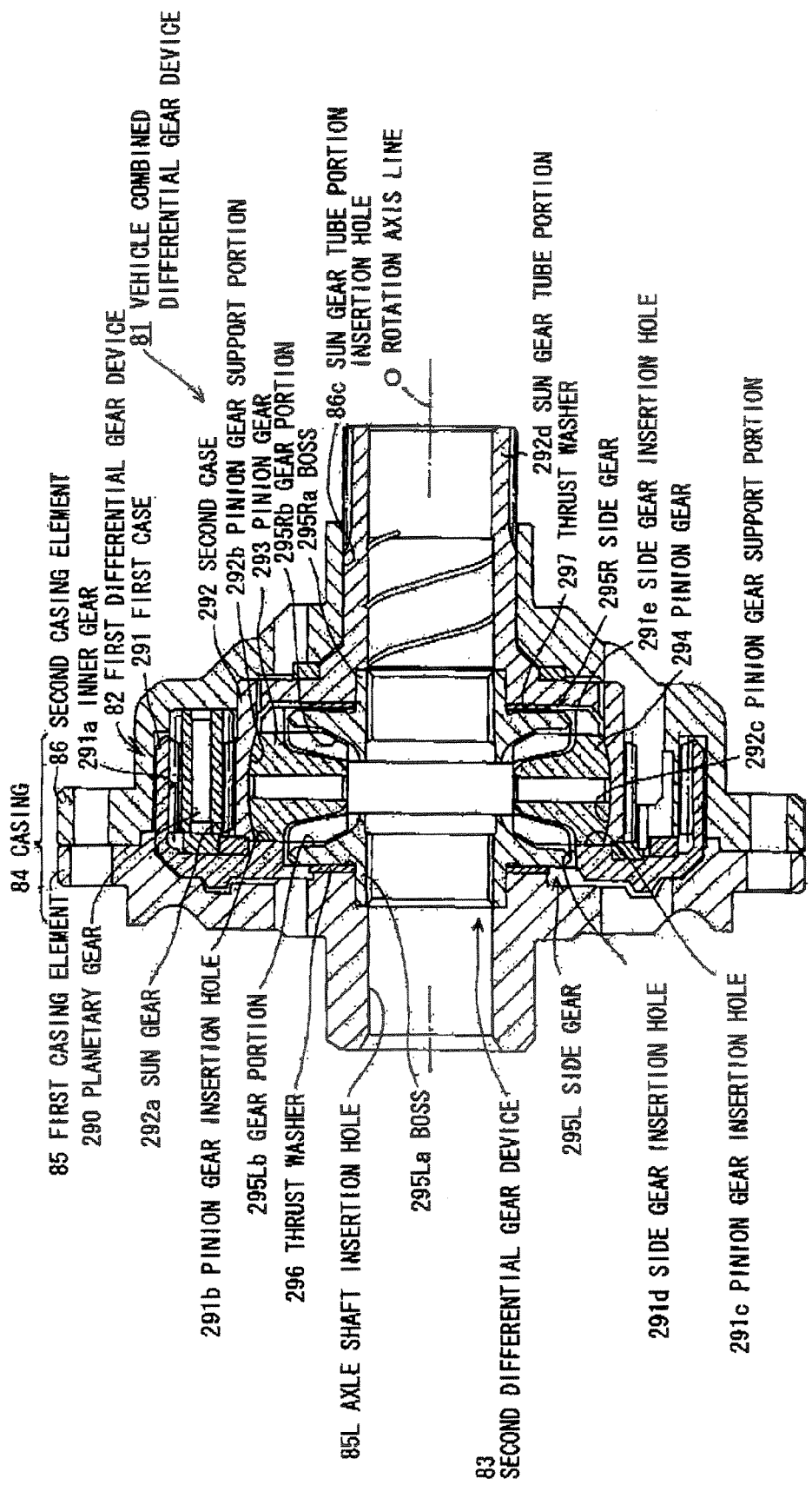
FIG. 42 is a cross sectional view showing a vehicle combined differential gear device in an eighth preferred embodiment according to the invention.

FIG. 42 is a cross sectional view showing a vehicle combined differential gear device in an eighth preferred embodiment according to the invention. In FIG. 42, as to components identical or equivalent to the components used in FIGS. 1 to 37 the same references are used, and detail explanation is omitted.

As shown in FIG. 42, a vehicle combined differential gear device 81 in an eighth preferred embodiment is characterized in comprising a planetary gear-system differential gear device is adopted as a first differential gear device 82 and a bevel gear-system differential gear device (a vehicle differential gear device comprising a shaftless-type pinion gear) is adopted as a second differential gear device 83 and the first differential gear device 82 and the second differential gear device 83 are juxtaposed along a direction perpendicular to an axis line O of a casing 84.

Therefore, the casing 84 comprises a first casing element 85 comprising a axle shaft insertion hole 85L, and a second casing element 86 comprising a sun gear tube portion insertion hole 86c, so as to house the first differential gear device 82 and the second differential gear device 83.

The first differential gear device 82 comprises a planetary gear 290 located on the rotation axis line O, a first case 291 with an inner gear located in an outside of the planetary gear 290, and a second case 292 with a sun gear opposite to the first case 291, so as to function as a center differential gear device.

The planetary gear 290 functions as a first input member and is supported in the casing 84 (a second casing element 86) rotatably. And, when a rotation driving force of any one of wheels in a vehicle is decreased, a rotation driving force defined by multiplying a torque bias proportion of the first case 291 (an inner gear 291a) and the second case 292 (sun gear 292a) by a torque bias proportion of the side gears 295L, 295R (to be hereinafter described) is inputted to the second differential gear device 83 (pinion gears 293, 294).

The first case 291 comprises the inner gear 291a engaging with the planetary gear 290 and receives a rotation force from the planetary gear 290 so as to output to the second differential gear device 83 as the first output member. In the first case 291, pinion gear insertion holes 291b, 291c opening in a direction perpendicular to the rotation axis line O are formed. Further, in the first case 291, side gear insertion holes 291d, 291e opening in a direction of the rotation axis line O are formed.

The second case 292 comprises a sun gear 292a engaging with a sun gear 290b on an outer surface thereof, and receives a rotation force from the planetary gear 290 so as to output to the rear axle shaft as the second output member. On an inner surface of second case 292, pinion gear support portions (top portion) 292b, 292c supporting the pinion gears 293, 294 (to be hereinafter described) stressed by a centrifugal force and comprising a spherical surface formed to a predetermined curvature are formed. And, in the second case 292, a sun gear tube portion 292d inserting to a sun gear tube portion insertion hole 86c is formed.

The second differential gear device 83 comprises two pieces of pinion gears 293, 294 juxtaposed mutually along an axis line direction perpendicular to a rotation axis line O of the casing 84, and left and right side gears 295L, 295R engaging with the pinion gears 293, 294, so as to function as a front differential gear device.

The pinion gears 293, 294 function as a second input member and are supported in the pinion gear insertion holes 291b, 291c, and the extended portions (not shown) rotatably. And, when a rotation driving force of any one of wheels in a vehicle (a four wheels vehicle) is decreased, the pinion gears 293, 294 receive the rotation driving force in an engine side, the force defined by a torque bias proportion of the side gears 295L, 295R from the first differential gear device 82 (the first case 291) so as to input to the side gears 295L, 295R.

The side gears 295L, 295R comprise bosses 295La, 295Ra comprising a different outer diameter mutually and an approx. annular bevel gear comprising gear portions 295Lb, 295Rb, engage with the pinion gears 293, 294, and are supported in the casing 84 rotatably, while the bosses 295La, 295Ra are respectively inserted to the axle shaft insertion holes 85L, 85R partially. To the side gears 295L, 295R, left and right front axle shafts (not shown) are joined by a spline fitting respectively. And, the side gear 295L functions as a third output member and the side gear 295R functions as a fourth output member respectively. A thrust washer 296 is sandwiched between a back surface of the side gear 295L and an inner opening circumferential edge of the axle shaft insertion holes 85L, and a thrust washer 297 is sandwiched between the back surface of the side gear 295L and an inner surface of the second case 292.

Operation of the Combined Differential Gear Device

First, when a torque from an engine side of a vehicle is inputted to the casing 84 through a drive pinion and a ring gear, the casing 84 is rotated around the rotation axis line O. Next, when the casing 84 is rotated, the rotation force is transmitted to the planetary gear 290, and subsequently is transmitted through the planetary gear 290 to the inner gear 291a of the first case 291 and the sun gear 292a of the second case 292. Therefore, the inner gear 291a and the sun gear 292a are rotated and the rotation force is transmitted to the pinion gears 293, 294 through the first case 291. After that, the pinion gears 293, 294 are rotated and the rotation force is transmitted to the side gears 295L, 295R.

In this case, to the second case 292 (a sun gear tube portion 292d), a rear axle shaft is joined and to the side gears 295L, 295R, the left and right front axle shafts are joined by a spline fitting respectively, so that the torque from the engine side of the vehicle can be transmitted to the rear axle shaft through the drive pinion, the ring gear, the casing 84, and the first differential gear device 82 (the planetary gear 290, the first case 291, and the second case 292), and the torque can be transmitted to the left and right front axle shafts through the casing 84, the first differential gear device 82 (the planetary gear 290, the first case 291, and the second case 292), and the second differential gear device 83 (the pinion gears 293, 294 and the side gears 295L, 295R).

In a case that an even load is applied to each wheel of front and rear sides on the left and right axle shafts, when the torque from the engine side of the vehicle is transmitted to the casing 84, the planetary gear 290 receives the rotation driving force and the planetary gear 290 is rotated together with the first case 291 and the second case 292. Of the rotation driving forces, the rotation driving force from the second case 292 is received by the rear axle shaft so that the rear axle shaft is rotated. Further, the pinion gears 293, 294 receive the rotation driving force from the first case 291 and orbit on the side gears 295L, 295R, and the pinion gears 293, 294 and the side gears 295L, 295R are rotated together with the casing 84 in an integrated condition. Therefore, the torque from the engine side of the vehicle is evenly transmitted to the left and right axle shafts of front and rear sides and the left and right wheels of front and rear sides are rotated at even revolutions.

On the other hand, in cases that for example the vehicle turns to the left during a drive, or the right wheel of front side falls in a mud, a torque from the engine side of the vehicle is differentially distributed between the second differential gear device 83 and the rear axle shaft through the first differential gear device 82. Further, in the second differential gear device 83 the pinion gears 293, 294 rotate on the side gears 295L, 295R, and the rotation driving force is differentially distributed between the left and right wheels of the front axle shaft. Therefore, the left wheel of front side and the rear axle shaft (left and right wheels) are rotated at a lower revolving speed than a revolving speed of the casing 84 and the right wheel of front side is rotated at a higher revolving speed than the revolving speed of the casing 84.

In this case, the planetary gear 290 of the first differential gear device 82 inputs the rotation driving force from an engine side, the force defined by multiplying a torque bias proportion of the inner gear 291a and the sun gear 292a by a torque bias proportion of the side gears 295L, 295R, to the pinion gears 293, 294, and the pinion gears 293, 294 of the second differential gear device 83 input the rotation driving force from the inner gear 291a, the force defined by a torque bias proportion of the side gears 295L, 295R, to the side gears 295L, 295R.

Therefore, as well as the seventh preferred embodiment, a large rotation driving force can be moved from a high speed (a low load) side to a low speed (a high load) side at a differential rotation by a multiplication effect of the torque bias proportion, so that the rotation driving force as a whole can be increased.

Advantages of Eighth Embodiment

According to the eighth preferred embodiment, the following advantages are achieved in addition to the advantages (1) to (7) of the first preferred embodiment.

(1) The planetary gear 290 inputs the rotation driving force from an engine side, the force defined by multiplying a torque bias proportion of the inner gear 291a and the sun gear 292a by a torque bias proportion of the side gears 295L, 295R, to the pinion gears 293, 294, and the pinion gears 293, 294 of the second differential gear device 83 input the rotation driving force from the pinion gears 293, 294, the force defined by a torque bias proportion of the side gears 295L, 295P, to the side gears 295L, 295R, so that a large rotation driving force can be moved from a high speed (a low load) side to a low speed (a high load) side at a differential rotation by a multiplication effect of the torque bias proportion, so that the rotation driving force as a whole can be increased.

(2) The first differential gear device 82 and the second differential gear device 83 comprise a torque bias function, so that it is not required to add to a differential restriction device separately and the rotation driving force as a whole can be increased.

For example, the following modifications and alternative constructions can be adopted.

Figure 43:
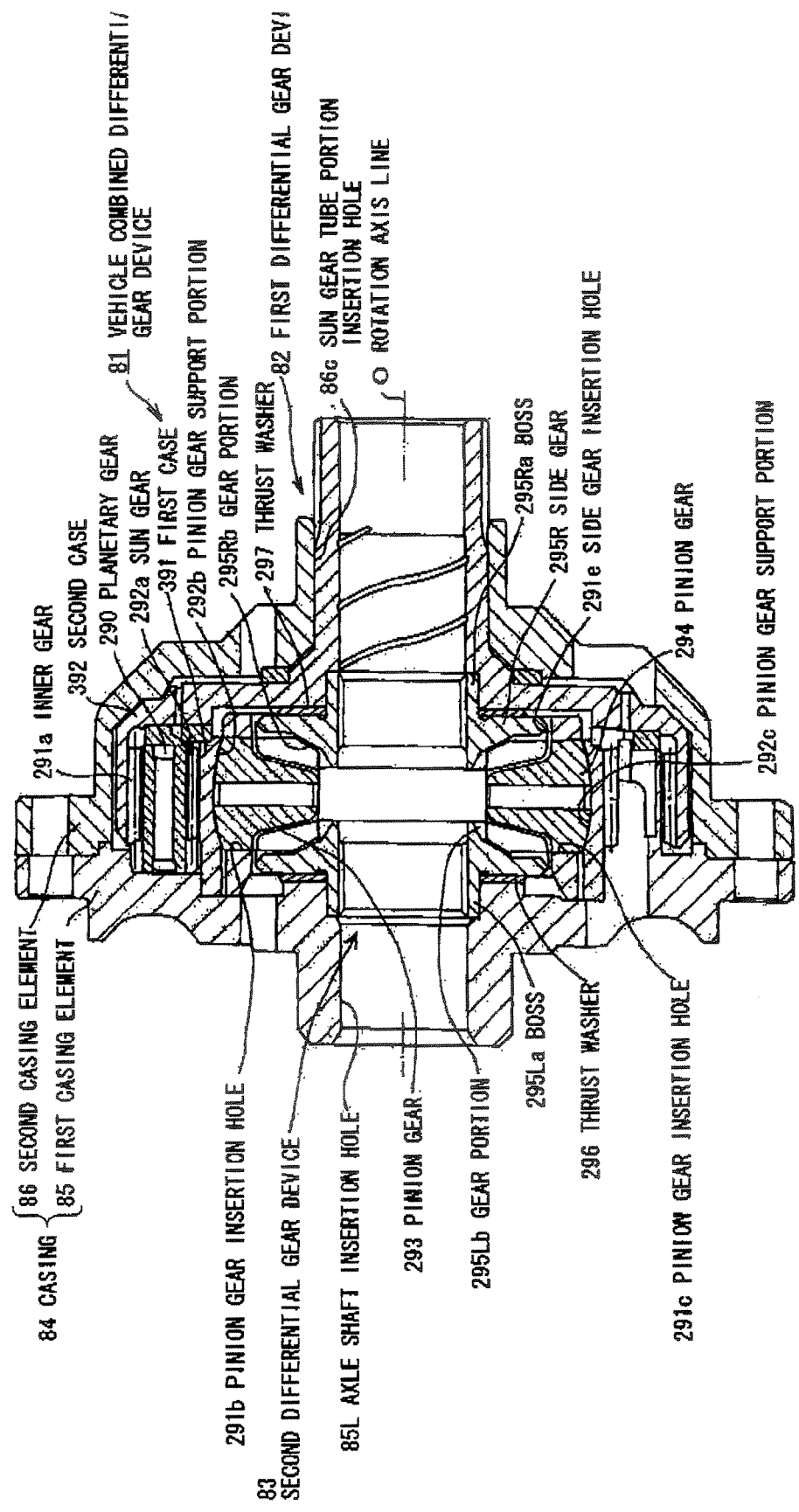
FIG. 43 is a cross sectional view showing a modified embodiment (1) of a vehicle combined differential gear device in an eighth preferred embodiment according to the invention.

(1) In the preferred embodiment, a case that the first case 291 with the inner gear is used as the first output member and the second case 292 with the sun gear is used as the second output member is explained, but the invention is not limited to the case, as shown in FIG. 43, a case that the first case 391 with the sun gear is used as the first output member and the second case 392 with the inner gear is used as the second output member can be adopted.

Figure 44:
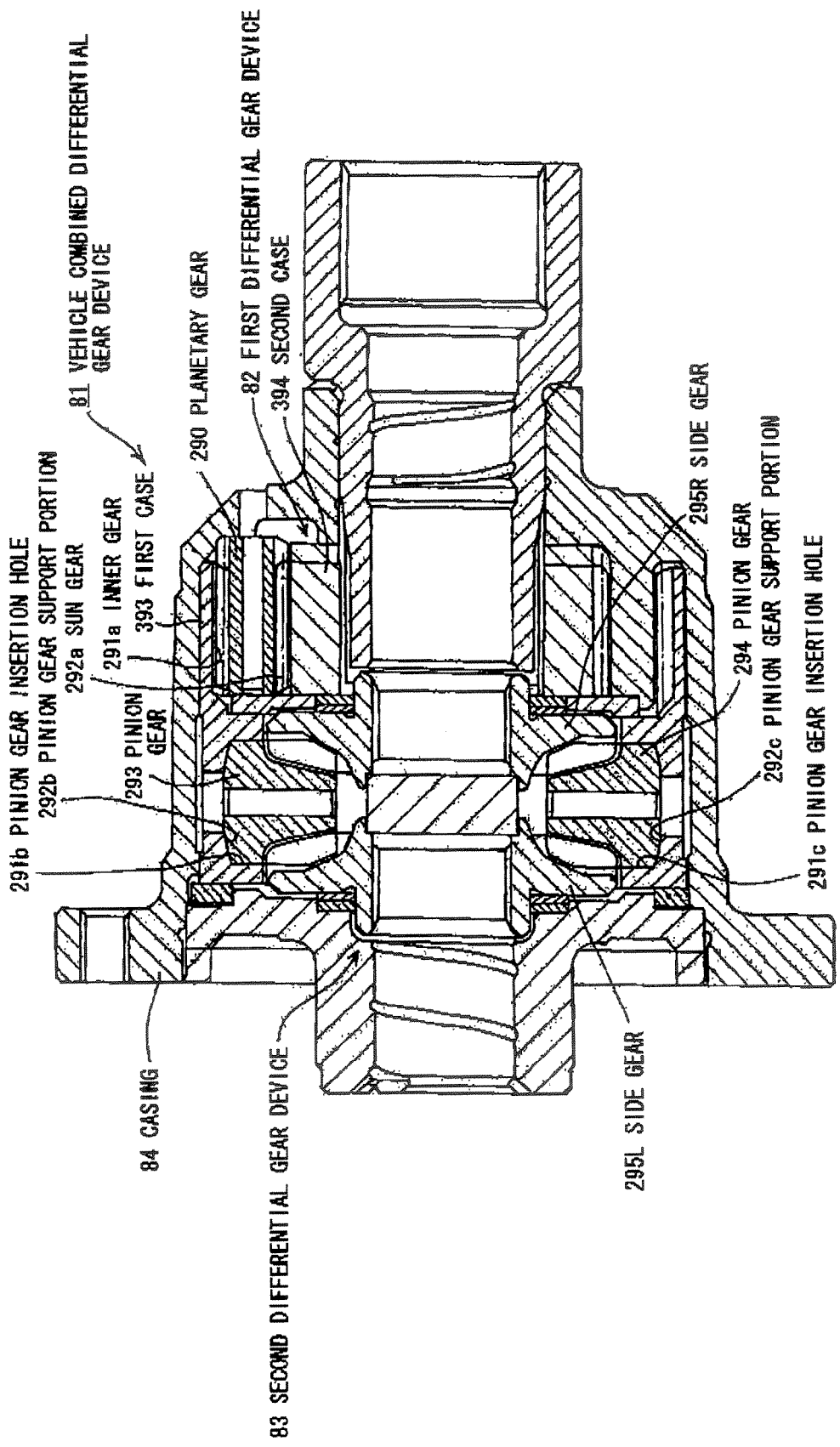
FIG. 44 is a cross sectional view showing a modified embodiment (2) of a vehicle combined differential gear device in an eighth preferred embodiment according to the invention.
Figure 45:
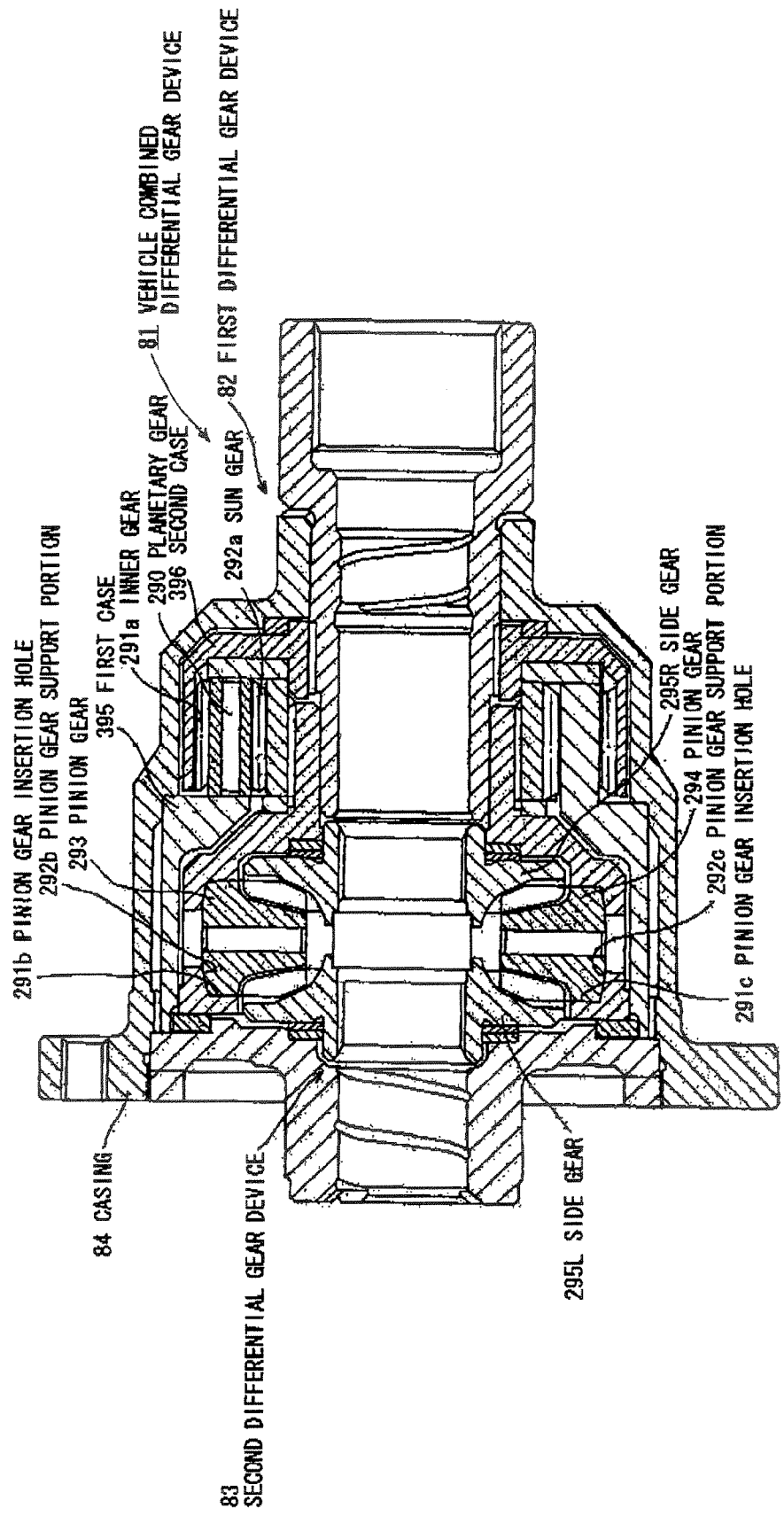
FIG. 45 is a cross sectional view showing a modified embodiment (3) of a vehicle combined differential gear device in an eighth preferred embodiment according to the invention.
Figure 46:
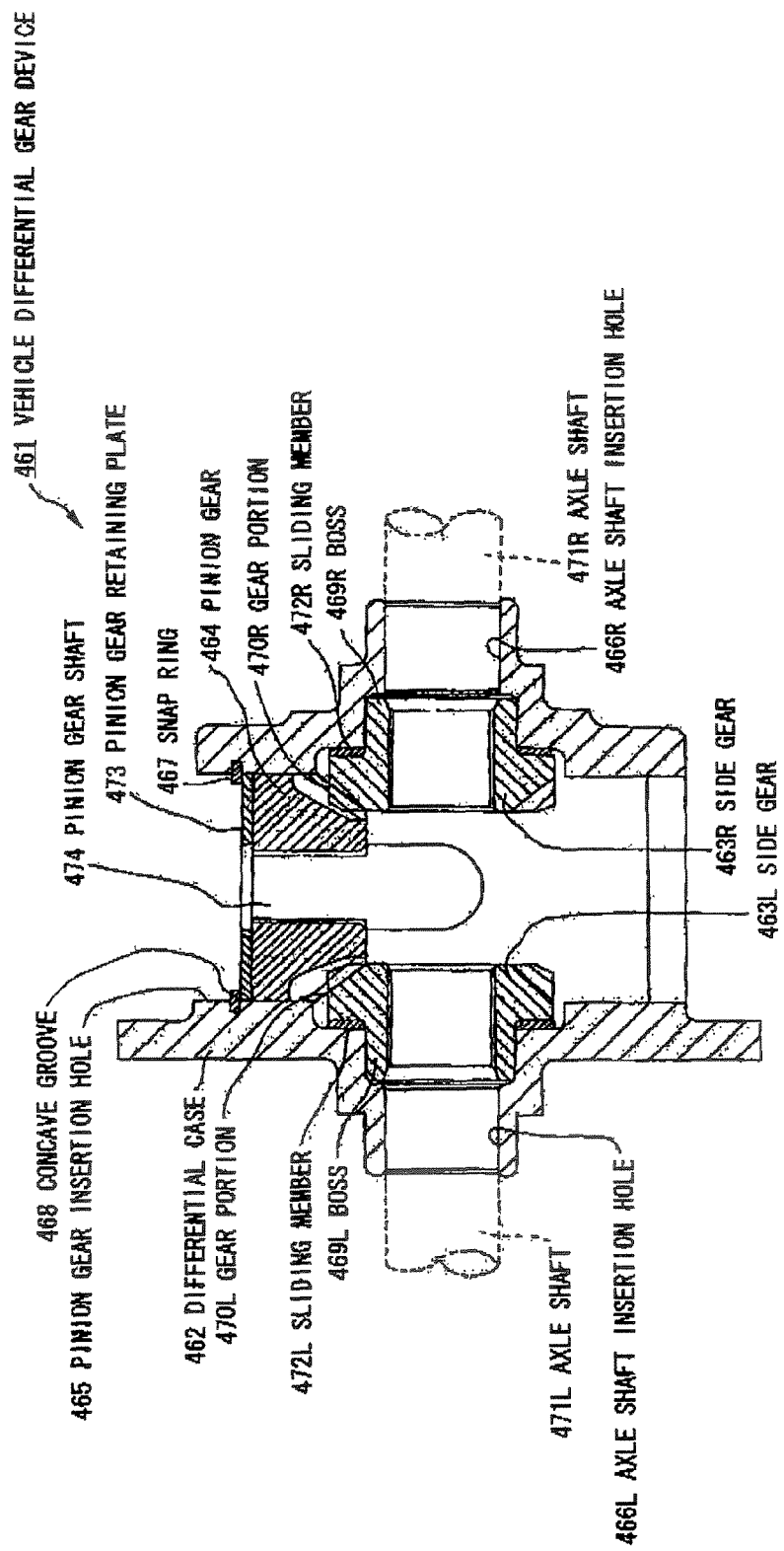
FIG. 46 is a cross sectional view showing a conventional vehicle differential gear device.

(2) In the preferred embodiment, a case (a radial type) that the first differential gear device 82 and the second differential gear device 83 are juxtaposed along a direction perpendicular to an axis line O of a casing 84 is explained, but the invention is not limited to the case, as shown in FIGS. 44 and 45, a case (an axial type) that the first differential gear device 82 and the second differential gear device 83 are juxtaposed along a direction of the axis line O can be adopted In this case in FIG. 44 the first output member comprises the first case 393 with the inner gear and the second output member comprises the second case 394 with the sun gear. Further, in FIG. 45 the first output member comprises the first case 395 with the sun gear and the second output member comprises the second case 396 with the inner gear.

(3) In the preferred embodiment, a case that the first differential gear device 82 functions as a center differential gear device and the second differential gear device 83 functions as a front differential gear device is explained, but the invention is not limited to the case, a case that the first differential gear device 82 functions as a center differential gear device and the second differential gear device 83 functions as a rear differential gear device can be adopted.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A vehicle differential case, comprising:
an integral structure comprising:
a plurality of pinion gear insertion holes to rotatably support a plurality of shaftless pinion gears; and
a side gear passage hole that allows passage of a side gear comprising an outer diameter greater than that of the plurality of shaftless pinion gears,
wherein the plurality of pinion gear insertion holes each comprises a plurality of extended portions extending inside from an inside surface of the case and juxtaposed at even intervals in a circumferential direction of the respective pinion gear insertion hole,
the plurality of shaftless pinion gears each comprise a retained portion on a side face thereof, and
the extended portion is formed to support the retained portion.

2. The vehicle differential case according to claim 1, wherein:
the plurality of pinion gear insertion holes comprise a top portion to support the plurality of shaftless pinion gears being subjected to centrifugal force.

3. A vehicle differential case, comprising:
an integral structure comprising:
a plurality of pinion gear insertion holes to rotatably support a plurality of shaftless pinion gears; and
a side gear passage hole that allows passage of a side gear comprising an outer diameter greater than that of the plurality of shaftless pinion gears,
wherein the plurality of pinion gear insertion holes each comprise an extended portion extending inside from an inside surface of the case,
the plurality of shaftless pinion gears each comprise a retained portion on a side face thereof, and
the extended portion is formed to support the retained portion, wherein:
the plurality of pinion gear insertion holes are formed such that a narrow interval region and a wide interval region are generated between two neighboring holes thereof, and the side gear passage hole is formed in the wide interval region.

4. A vehicle differential gear device, comprising:
a differential case comprising a plurality of pinion gear insertion holes and a side gear passage hole;
a plurality of shaftless pinion gears that are rotatably supported in the plurality of pinion gear insertion holes formed in the differential case; and
a pair of side gears that are rotatably supported in the differential case, engage with the plurality of shaftless pinion gears, and comprise an outer diameter greater than that of the plurality of shaftless pinion gears, the side gear passage hole allowing passage of the pair of side gears,
wherein the plurality of pinion gear insertion holes each comprise an extended portion extending inside from an inside surface of the case,
the plurality of shaftless pinion gears each comprise a retained portion on a side face thereof, and
the extended portion is formed to support the retained portion.

5. The vehicle differential gear device according to claim 4, wherein:
the differential case further comprises an integral structure.

6. The vehicle differential gear device according to claim 4, wherein:
the plurality of pinion gear insertion holes comprise a top portion to support the plurality of shaftless pinion gears being subjected to centrifugal force generated by a rotation of the differential case.

7. A vehicle combined differential gear device, comprising:
a first differential gear device comprising a first rotatable input member, and first and second output members for a front axle and a rear axle, respectively, to be rotated by a rotation of the first input member;
a second differential gear device comprising a second input member to be rotated by a rotation of the first or second output member, and
third and fourth output members for a left axle shaft and a right axle shaft, respectively, of the front axle or the rear axle to be rotated by a rotation of the second input member; and a casing that houses the first and second differential gear devices and is operable to rotate the first input member;
wherein the first differential gear device comprises:
a differential case comprising a plurality of pinion gear insertion holes and a side gear passage hole;
the first input member comprising a plurality of shaftless pinion gears that are rotatably supported in the plurality of pinion gear insertion holes formed in the differential case; and
the first and second output members comprising a pair of side gears that are rotatably supported in the differential case, engage with the plurality of shaftless pinion gears, and comprise an outer diameter greater than that of the plurality of shaftless pinion gears the side gear passage hole allowing passage of the pair of side gears,
wherein the plurality of pinion gear insertion holes each comprise an extended portion extending inside from an inside surface of the case,
the plurality of shaftless pinion gears each comprise a retained portion on a side face thereof, and
the extended portion is formed to support the retained portion.

8. The vehicle combined differential gear device according to claim 7, wherein:
the first input member of the first differential gear device inputs, when a rotational driving force of any one of wheels lowers, a rotational driving force determined by multiplying a torque bias ratio of the first and second output members and a torque bias ratio of the third and fourth output members, and the second input member of the second differential gear device inputs a rotational driving force determined by the torque bias ratio of the third and fourth output members.

9. A vehicle combined differential gear device, comprising:
a first differential gear device comprising a first rotatable input member, and first and second output members for a front axle and a rear axle, respectively, to be rotated by a rotation of the first input member;
a second differential gear device comprising a second input member to be rotated by a rotation of the first or second output member, and third and fourth output members for a left axle shaft and a right axle shaft, respectively, of the front axle or the rear axle to be rotated by a rotation of the second input member; and a casing that houses the first and second differential gear devices and is operable to rotate the first input member;

wherein the second differential gear device comprises:

a differential case comprising a plurality of pinion gear insertion holes and a side gear passage hole;

the second input member comprising a plurality of shaftless pinion gears that are rotatably supported in the plurality of pinion gear insertion holes formed in the differential case; and the third and fourth output members comprising a pair of side gears that are rotatably supported in the differential case, engage with the plurality of shaftless pinion gears, and comprise an outer diameter greater than that of the plurality of shaftless pinion gears, the side gear passage hole allowing passage of the pair of side gears, wherein the plurality of pinion gear insertion holes each comprise an extended portion extending inside from an inside surface of the case, the plurality of shaftless pinion gears each comprise a retained portion on a side face thereof, and the extended portion is formed to support the retained portion.

10. The vehicle combined differential gear device according to claim 9, wherein:

the first input member of the first differential gear device inputs, when a rotational driving force of any one of wheels lowers, a rotational driving force determined by multiplying a torque bias ratio of the first and second output members and a torque bias ratio of the third and fourth output members, and the second input member of the second differential gear device inputs a rotational driving force determined by the torque bias ratio of the third and fourth output members.

11. A vehicle combined differential gear device, comprising:

a first differential gear device comprising a first rotatable input member, and first and second output members for a front axle and a rear axle, respectively, to be rotated by a rotation of the first input member;

a second differential gear device comprising a second input member to be rotated by a rotation of the first or second output member, and third and fourth output members for a left axle shaft and a right axle shaft, respectively, of the front axle or the rear axle to be rotated by a rotation of the second input member; and a casing that houses the first and second differential gear devices and is operable to rotate the first input member;

wherein the first and second differential gear devices each comprise:

a differential case comprising a plurality of pinion gear insertion holes and a side gear passage hole;

the first and second input members each comprising a plurality of shaftless pinion gears that are rotatably supported in the plurality of pinion gear insertion holes formed in the differential case; and the first and second output members and the third and fourth output members each comprising a pair of side gears that are rotatably supported in the differential case, engage with the plurality of shaftless pinion gears, and comprise an outer diameter greater than that of the plurality of shaftless pinion gears, the side gear passage hole allowing passage of the pair of side gears, wherein the plurality of pinion gear insertion holes each comprise an extended portion extending inside from an inside surface of the case, the plurality of shaftless pinion gears each comprise a retained portion on a side face thereof, and the extended portion is formed to support the retained portion.

12. The vehicle combined differential gear device according to claim 11, wherein:

the first input member of the first differential gear device inputs, when a rotational driving force of any one of wheels lowers, a rotational driving force determined by multiplying a torque bias ratio of the first and second output members and a torque bias ratio of the third and fourth output members, and the second input member of the second differential gear device inputs a rotational driving force determined by the torque bias ratio of the third and fourth output members.

13. The vehicle differential case according to claim 1, wherein the retained portion extends to a region where the plurality of shaftless pinion gears each engage with the side gear, and the extended portion is disposed in a circumferential direction of the case.

14. The vehicle differential gear device according to claim 4, wherein the retained portion extends to a region where the plurality of shaftless pinion gears each engage with the side gear, and the extended portion is disposed in a circumferential direction of the case.

15. The vehicle combined differential gear device according to claim 7, wherein the retained portion extends to a region where the plurality of shaftless pinion gears each engage with the side gear, and the extended portion is disposed in a circumferential direction of the case.

16. The vehicle combined differential gear device according to claim 9, wherein the retained portion extends to a region where the plurality of shaftless pinion gears each engage with the side gear, and the extended portion is disposed in a circumferential direction of the case.

17. The vehicle combined differential gear device according to claim 11, wherein the retained portion extends to a region where the plurality of shaftless pinion gears each engage with the side gear, and the extended portion is disposed in a circumferential direction of the case.

* * * * *